(12) United States Patent  (10) Patent No.: US 8,653,786 B2
Baetica et al.  (45) Date of Patent: Feb. 18, 2014

(54) CORDLESS MOWER INCLUDING BATTERY WITH TWO CHARGING CONNECTORS

(75) Inventors: Florin Baetica, Brockville (CA); Richard P. Rosa, Kingston (CA); P. Wade Mooney, Brockville (CA)

(73) Assignee: Black & Decker Inc., Newark, DE (US)

( * ) Notice: Subject to any disclaimer, the term of this patent is extended or adjusted under 35 U.S.C. 154(b) by 208 days.

(21) Appl. No.: 12/838,898

(22) Filed: Jul. 19, 2010

(65) Prior Publication Data

US 2010/0275564 A1    Nov. 4, 2010

Related U.S. Application Data

(63) Continuation-in-part of application No. 29/361,418, filed on May 11, 2010, now Pat. No. Des. 642,119, and a continuation-in-part of application No. 12/426,499, filed on Apr. 20, 2009, now abandoned.

(60) Provisional application No. 61/048,002, filed on Apr. 25, 2008.

(51) Int. Cl.
    *H01M 6/50* (2006.01)
(52) U.S. Cl.
    USPC ............. 320/104; 320/115; 320/137; 56/11.9
(58) Field of Classification Search
    USPC .......... 320/137, 115, 107, 104; 318/599, 139; 429/96, 1, 178, 187, 123; 56/11.9, 56/10.1; 180/68.5
    See application file for complete search history.

(56) References Cited

U.S. PATENT DOCUMENTS

| 3,536,051 | A | * | 10/1970 | Hamman | ................. 123/179.26 |
| 3,550,714 | A |   | 12/1970 | Bellinger | |
| 3,581,480 | A | * | 6/1971  | O'Connor et al. | ............. 56/11.9 |
| 3,909,099 | A | * | 9/1975  | Winkler | ........................ 439/295 |
| 4,435,486 | A | * | 3/1984  | Pomaro et al. | .................... 429/1 |
| 4,753,062 | A |   | 6/1988  | Roelle | |

(Continued)

FOREIGN PATENT DOCUMENTS

| EP | 1584224 A1 | 10/2005 |
| EP | 1698221 A1 | 9/2006 |
| EP | 2374346 A1 | 10/2011 |
| WO | WO-2008015479 A2 | 2/2008 |

OTHER PUBLICATIONS

International Search Report and Written Opinion dated Mar. 8, 2012 for PCT International Application No. PCT/US2011/044336, 8 pages.

(Continued)

*Primary Examiner* — Árpád Fábián-Kovács
(74) *Attorney, Agent, or Firm* — Harness, Dickey & Pierce, P.L.C.

(57) ABSTRACT

A battery-powered lawn mower includes a deck, a latch assembly, a battery, a motor and a blade. The deck is supported by wheels and defines a pocket. The latch assembly is coupled to the deck and is movable between a locked position and a fully opened position. The battery is secured within the pocket by the latch assembly in a first configuration and is removable from the pocket in a second configuration. The motor is supported by the deck and electrically coupled to the battery in the first configuration. The blade is coupled to the deck and driven by the motor. During operation, the battery powers the motor to drive the blade.

24 Claims, 53 Drawing Sheets

(56) References Cited

U.S. PATENT DOCUMENTS

| | | | |
|---|---|---|---|
| 4,756,978 A * | 7/1988 | Nitcher et al. | 429/1 |
| D300,132 S | 3/1989 | Culbertson et al. | |
| D301,228 S | 5/1989 | Culbertson et al. | |
| 4,847,513 A | 7/1989 | Katz et al. | |
| 4,930,300 A * | 6/1990 | Benter et al. | 56/16.7 |
| D320,379 S | 10/1991 | Culbertson | |
| D320,974 S | 10/1991 | Culbertson | |
| D321,680 S | 11/1991 | Blount et al. | |
| 5,085,043 A | 2/1992 | Hess et al. | |
| 5,163,273 A | 11/1992 | Wojtkowski et al. | |
| 5,301,494 A * | 4/1994 | Peot et al. | 56/10.5 |
| 5,402,626 A * | 4/1995 | Zinck | 56/11.9 |
| 5,490,370 A | 2/1996 | McNair et al. | |
| 5,606,851 A | 3/1997 | Bruener et al. | |
| 5,619,845 A * | 4/1997 | Bruener et al. | 320/137 |
| 5,633,095 A * | 5/1997 | Ishikawa et al. | 429/1 |
| D387,329 S | 12/1997 | Jung et al. | |
| 5,727,372 A * | 3/1998 | Kanitz et al. | 56/11.9 |
| 5,736,837 A * | 4/1998 | Noda | 320/104 |
| 5,819,513 A * | 10/1998 | Braun et al. | 56/11.9 |
| RE36,250 E * | 7/1999 | Hess et al. | 56/10.5 |
| 5,928,020 A * | 7/1999 | Bishop et al. | 439/188 |
| 5,937,622 A | 8/1999 | Carrier et al. | |
| 5,937,623 A * | 8/1999 | Wolf | 56/11.9 |
| 6,035,561 A * | 3/2000 | Paytas et al. | 37/246 |
| 6,170,179 B1 * | 1/2001 | Paytas et al. | 37/246 |
| 6,404,078 B1 | 6/2002 | Thomas et al. | |
| D460,083 S * | 7/2002 | Rosse | D15/14 |
| 6,487,837 B1 * | 12/2002 | Fillman et al. | 56/11.9 |
| 6,523,334 B1 * | 2/2003 | Dettmann | 56/11.9 |
| 6,666,008 B2 * | 12/2003 | Iida et al. | 56/11.9 |
| 6,758,030 B2 * | 7/2004 | Dettmann | 56/11.9 |
| 6,802,175 B2 * | 10/2004 | Fillman et al. | 56/11.9 |
| D499,070 S | 11/2004 | Lavington | |
| 6,826,895 B2 | 12/2004 | Iida et al. | |
| 7,007,446 B2 * | 3/2006 | Dettmann | 56/11.9 |
| 7,111,443 B2 * | 9/2006 | Anderson et al. | 56/10.8 |
| 7,161,253 B2 * | 1/2007 | Sodemann et al. | 290/1 A |
| 7,328,563 B1 * | 2/2008 | Anderson et al. | 56/11.9 |
| 7,413,045 B2 * | 8/2008 | Tien | 180/68.5 |
| 7,434,642 B2 * | 10/2008 | Dettmann | 180/68.5 |
| 7,479,754 B2 * | 1/2009 | Lucas et al. | 318/599 |
| 7,540,132 B2 * | 6/2009 | Shimada et al. | 56/11.9 |
| D604,235 S | 11/2009 | Tarter | |
| D614,125 S | 4/2010 | Tinius | |
| 7,728,534 B2 * | 6/2010 | Lucas et al. | 318/139 |
| 7,741,793 B2 * | 6/2010 | Lucas et al. | 318/139 |
| 7,762,049 B2 | 7/2010 | Eaton et al. | |
| 7,963,344 B2 * | 6/2011 | Marcil et al. | 172/43 |
| 8,097,359 B2 * | 1/2012 | Gau et al. | 429/187 |
| 8,162,072 B2 * | 4/2012 | Marcil et al. | 172/42 |
| 2006/0059880 A1 | 3/2006 | Angott | |
| 2006/0090439 A1 * | 5/2006 | Anderson et al. | 56/10.2 G |
| 2008/0098703 A1 * | 5/2008 | Lucas et al. | 56/11.9 |
| 2009/0266042 A1 | 10/2009 | Mooney et al. | |
| 2009/0296442 A1 * | 12/2009 | Chang et al. | 363/142 |
| 2010/0162674 A1 | 7/2010 | Eaton et al. | |
| 2011/0285358 A1 * | 11/2011 | Grant et al. | 320/150 |
| 2012/0104991 A1 * | 5/2012 | Suzuki et al. | 320/103 |

OTHER PUBLICATIONS

European Search Report dated Apr. 4, 2012 for European Application No. 11193653.0, 5 pgs.

European Search Report dated Jul. 16, 2009 for European Application No. 09158635.4, 6 pgs.

* cited by examiner

US 8,653,786 B2

CORDLESS MOWER INCLUDING BATTERY WITH TWO CHARGING CONNECTORS

CROSS-REFERENCE TO RELATED APPLICATIONS

This application is a continuation-in-part of U.S. Design application Ser. No. 29/361,418, filed on May 11, 2010 and a continuation-in-part of U.S. application Ser. No. 12/426,499, filed Apr. 20, 2009, which claims the benefit and priority of U.S. Provisional Application No. 61/048,002, filed Apr. 25, 2008. The entire disclosure of each of the above applications is incorporated herein by reference.

FIELD

The present disclosure relates to lawn mowers and more specifically to a cordless electric lawn mower.

BACKGROUND

Due to concerns regarding urban air pollution, as well as other factors, electric lawn mowers are gaining in popularity. Moreover, due to the inconveniences and operating limitations of corded electric mowers, battery operated cordless electric mowers can be preferred. As described herein however, such electric and/or battery operated mowers can have drawbacks.

By way of example, some of these drawbacks can be associated with the functionality of the battery. Such drawbacks can include insufficient battery life, and inconvenient battery manipulation (i.e., such as during installation and removal of the battery from the mower). Other drawbacks can be associated with self-drive transmissions. Some electric and/or battery operated mowers can incorporate a belt-tensioning drive system, whereby the tension on a set of variable stepped sheaves can be configured to control the speed of a drive axle from a continuous speed motor. Such a system however can be inefficient because the self-drive motor must run constantly at high speed, thereby constantly drawing maximum power. Furthermore, as is known in the art, efficiency losses can be observed in such a slipping belt system. According to other drawbacks associated with battery operated mowers, in some instances during high-load grass cutting (i.e., wet, and/or thick grass), the cutting motor(s) can reduce in operating speed. Typically however, the output speed of a self-drive motor is unchanged regardless of the high-load grass cutting. In this way, cutting performance as a whole can degrade because the speed of the self-drive motor is not adjusted in view of a given cutting condition.

According to some other drawbacks associated with electric and/or battery operated mowers, a mulching mode can be incorporated that is generally inefficient. Additionally, such mowers may require a switching process between a mulching mode and a discharge mode that can be cumbersome and present other performance drawbacks. Some other drawbacks associated with battery operated mowers can include inadequate driver feedback information. For example, it may be desirable for an operator to easily obtain information relating to battery-power, mower blade operation, self-drive motor operation and/or other information, such as operational faults associated with the mower.

SUMMARY

A battery-powered lawn mower includes a deck supported by wheels on a first side and a cutting mechanism having a first motor, including a first output member. A first cutting blade is driven by the first output member. A self-drive transmission has a second motor that selectively communicates an output to a drive axle. A force feedback controller measures a load on the first motor and changes an output voltage to the second motor based on the measured load.

According to other features, the force feedback controller compares the load to a threshold. The force feedback controller reduces the output voltage to the second motor based on the load being greater than the threshold. The load is measured by detecting a current through a shunt associated with the first motor. A voltage on the shunt is compared to a threshold voltage through one of an analog and digital component. The component is operable to change a resistor divider value in the second motor based on the comparison. The force feedback controller proportionally varies the output voltage on the second motor based on the measured load. The force feedback controller determines an output of amps of current that are withdrawn by the first motor and pulse width modulates the second motor by a varying duty cycle based on the determination.

A battery-powered lawn mower includes a battery and a deck supported by wheels on a first side. A drive axle is coupled to the wheels. A self-drive transmission includes a motor and a clutch assembly. The motor is powered by the battery and has an output member. The clutch assembly has a driven transfer gear that is coupled for rotation with the output member, and a clutch cam that is mounted for rotation with a user input member. An input from the user input member urges the clutch cam to concurrently rotate about and translate along an axis, thereby locking the drive axle for concurrent rotation with the driven transfer gear and the motor output member.

According to additional features, the battery-powered lawn mower includes a variable speed circuit assembly that regulates a voltage delivered to the motor based on a position of the user input member. The input from the user input member comprises actuation of a self-drive bail handle. The clutch cam rotates in a first direction around and translates along a drive axle axis. A biasing member urges the clutch cam to rotate in a second direction opposite the first direction upon a release of the self-drive bail handle. Rotation of the clutch cam in the first direction causes the clutch cam to translate along the drive axle axis, whereby one of a tooth or pocket defined on the clutch cam nests with the other of the tooth or pocket provided on the driven transfer gear, thereby coupling the driven clutch for concurrent rotation with the driven transfer gear. The variable speed circuit assembly comprises a variable speed cam, a potentiometer, a switch and a variable speed circuit. The variable speed cam defines a recess and a plurality of cam gear teeth. The cam gear teeth are rotatably meshed with clutch cam teeth formed on the clutch cam and wherein rotation of the clutch cam by way of the clutch cam teeth and the cam gear teeth interaction urges a button extending from the switch to be actuated. No electricity is passed to the potentiometer until the switch is moved to a closed state. Rotation of the potentiometer passes an increasing signal to the variable speed circuit wherein as the signal increases the voltage out of the variable speed circuit is increased to the motor.

A battery-powered lawn mower includes a deck supported by wheels on a first side and a cutting mechanism having a first motor including a first output member. A first cutting blade is driven by the first output member. A self-drive transmission has a self-drive transmission motor that selectively communicates an output to a drive axle. A battery provides power to the cutting mechanism and the self-drive transmission. An LCD display is disposed on the deck and defines an indicator that corresponds to information relating to the battery, the cutting mechanism and the self-drive transmission. The LCD display provides information indicative of at least one of a power level of the battery, a status indicator of the first motor and a status indicator of the self-drive transmission motor. The power level of the battery is displayed as a series of illuminated bars. The indicator is operable to flash or illuminate in response to a fault detection from one of the cutting mechanism and the self-drive transmission. The LCD display is positioned on the deck.

A battery-powered lawn mower includes a battery, a deck supported by wheels on a first side, a self-drive transmission, a first handle portion and a second handle portion. One of the first or second handle portions is configured to move dynamically relative to the other handle portion. At least one force sensor is disposed adjacent to the first and second handle portions and is operable to sense a force based on dynamic movement of one of the first or second handles and communicate a signal to the self-drive transmission based on the force. The self-drive transmission is operable to proportionally vary an output to at least one of the wheels based on the signal.

According to additional features, the first handle portion is fixed within the second handle portion. The second handle portion includes a tubular member. At least one force sensor is selected from the group consisting of force sensing resistors, piezoelectric sensors and strain gauges. At least one force sensor comprises a pair of diametrically opposed force sensors that are arranged on the first handle portion. A pair of compliant pads are mounted on an inner diameter of the tubular member adjacent to the respective pair of diametrically opposed force sensors. The tubular member is operable to move relative to the first handle portion, whereby the force sensors communicate a total force to a controller. The controller communicates a signal to the self-drive transmission to vary the output to the at least one of the wheels based on the total force.

A battery-powered lawn mower includes a deck, a latch assembly, a battery, a motor and a blade. The deck is supported by wheels and defines a pocket. The latch assembly is coupled to the deck and is movable between a locked position and a fully opened position. The battery is secured within the pocket by the latch assembly in a first configuration and is removable from the pocket in a second configuration. The motor is supported by the deck and electrically coupled to the battery in the first configuration. The blade is coupled to the deck and driven by the motor. During operation, the battery powers the motor to drive the blade.

A battery-powered lawn mower includes a deck, a mower connector, a battery, a motor and a blade. The deck defines a pocket in which the mower connector is arranged. The battery is secured within the pocket in a first configuration and is removable from the pocket in a second configuration. The battery includes a first battery connector for mating with the mower connector and a second battery connector for mating with a charger cable. The motor is supported by the deck and is electrically coupled to the battery in the first configuration. The blade is coupled to the deck and driven by the motor. During operation, the battery powers the motor to drive the blade. The first battery connector automatically mates with the mower connector as the battery is inserted within the pocket.

A removable battery for use with a battery-powered lawn mower includes a battery housing, at least one cell and first and second battery connectors. The at least one cell is arranged within the battery housing. The first battery connector is electrically coupled with the at least one cell and is configured to mate with a mower connector of the battery-powered lawn mower. The second battery connector is electrically coupled with the at least one cell and is configured to mate with a charger cable.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
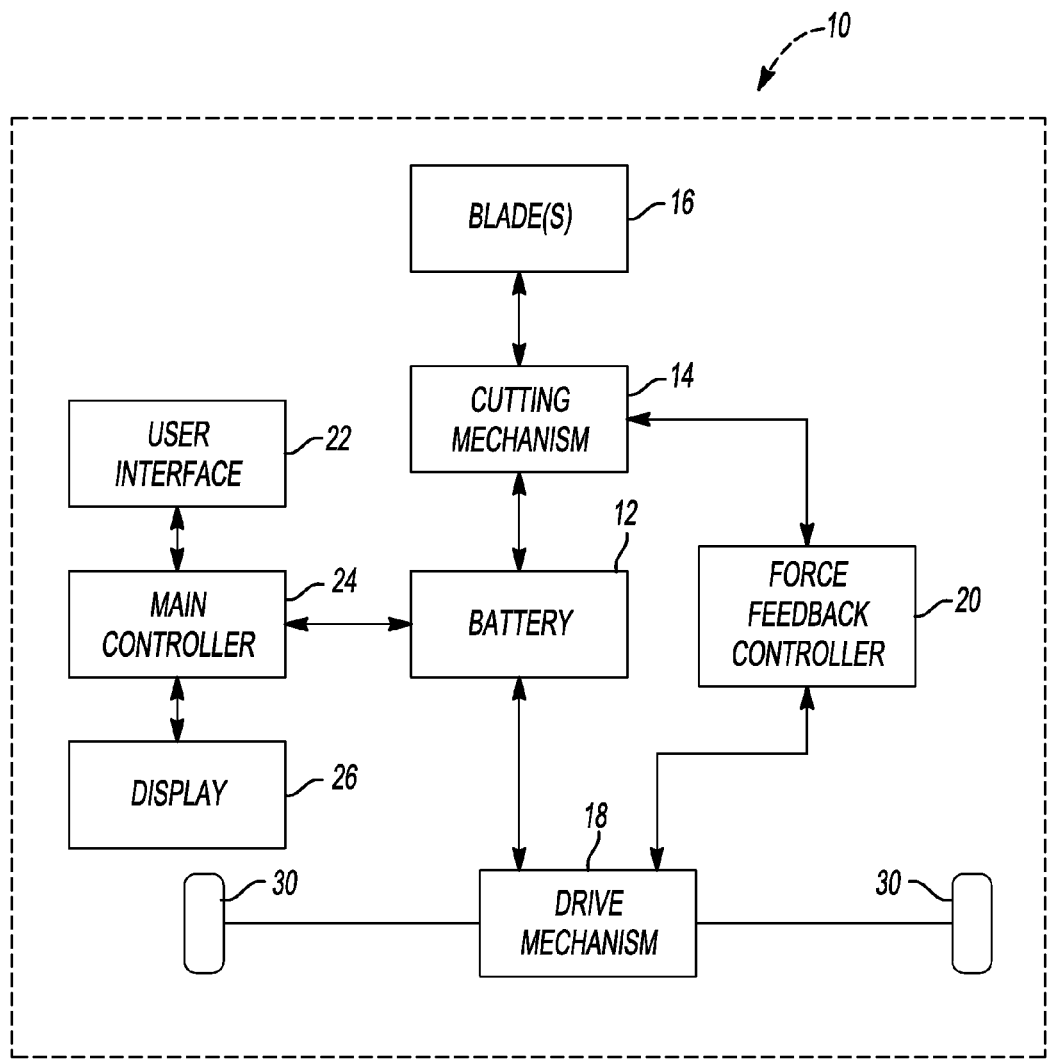
FIG. 1 is a schematic block diagram of the battery-powered mower according to one example of the present disclosure.

With initial reference to FIG. 1, an exemplary battery-powered lawn mower 10 (hereinafter, mower) is schematically illustrated. The mower 10 can include a battery 12, a cutting mechanism 14 for driving blade(s) 16, a drive mechanism 18, a force feedback controller 20, a user interface 22, a main controller 24 and a display 26. In general, the battery 12 can be adapted to power the cutting mechanism 14 and the drive mechanism 18. The cutting mechanism 14 can provide an output for imposing motion onto the driving blade(s) 16. The drive mechanism 18 can provide an output for imposing motion onto drive wheels 30.

The main controller 24 can control the application of power from the battery 12 to the cutting mechanism 14 and/or the drive mechanism 18 based on an input from the user interface 22. The user interface 22 can include any suitable device or mechanism such as a lever on a handle for example. In one example, actuation of a lever can move a switch between "ON" and "OFF" positions via a cable as is known in the art. The force feedback controller 20 can be configured to regulate an output speed of the drive mechanism 18 based on a load detected on the blade(s) 16.

The main controller 24 can be configured to communicate various electrical outputs to the display 26 representative of various operational information, such as but not limited to, the power level of the battery 12, the operational status of the blade(s) 16 and the drive mechanism 18. The display 26 therefore can provide visual feedback to a user of such operational information.

Battery

Figure 2:
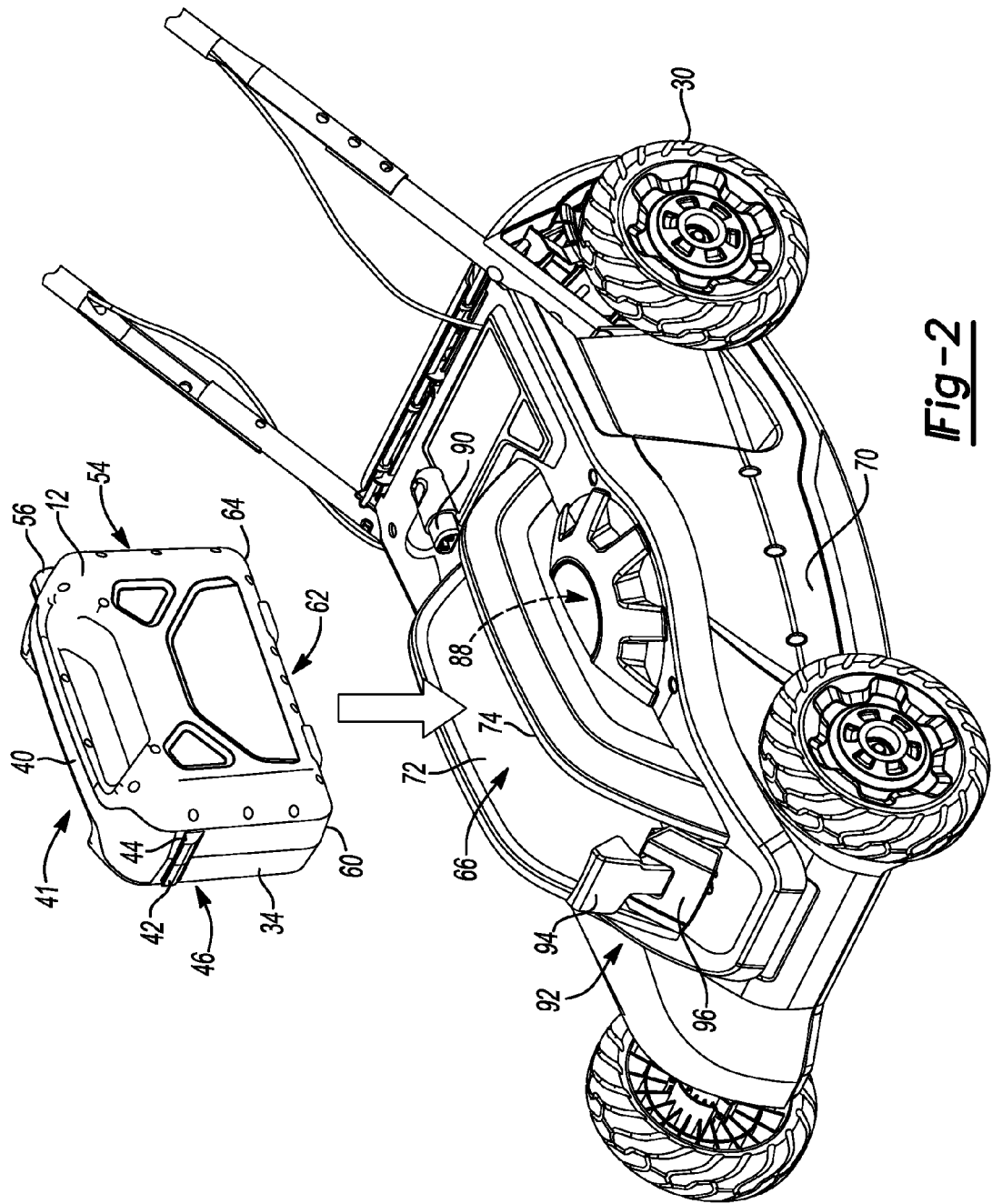
FIG. 2 is a front perspective view of an exemplary battery-powered mower shown with a battery being installed into a pocket defined on the mower.
Figure 3:
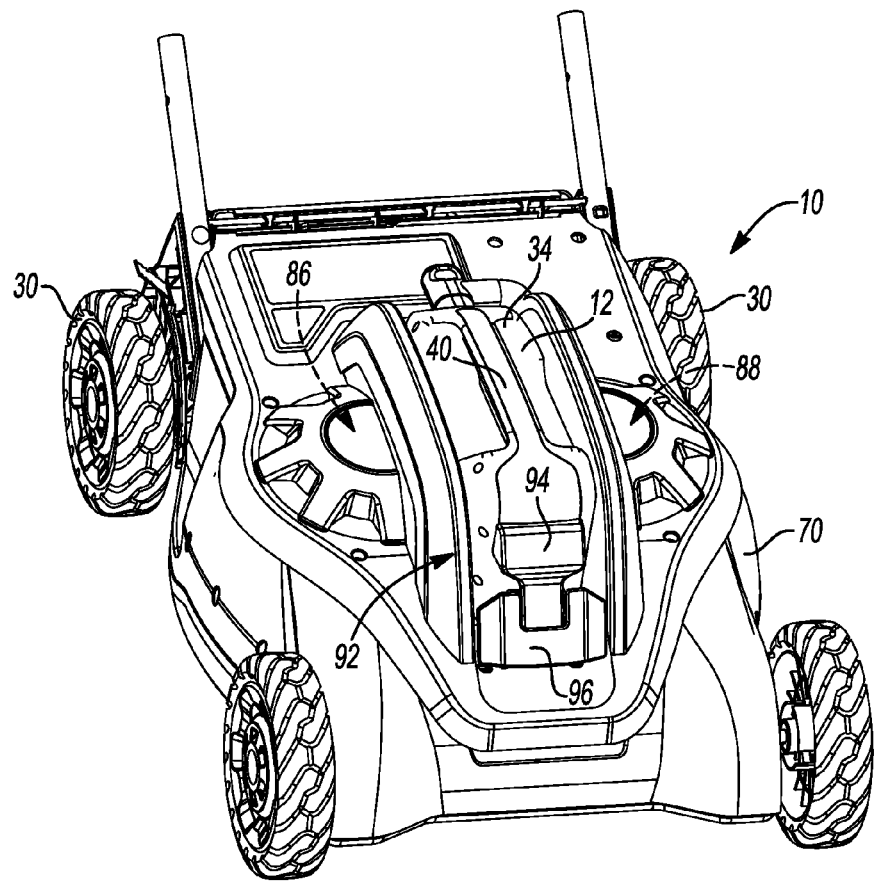
FIG. 3 is a front perspective view of the mower shown in FIG. 2 and with the battery shown in an installed position.
Figure 4:
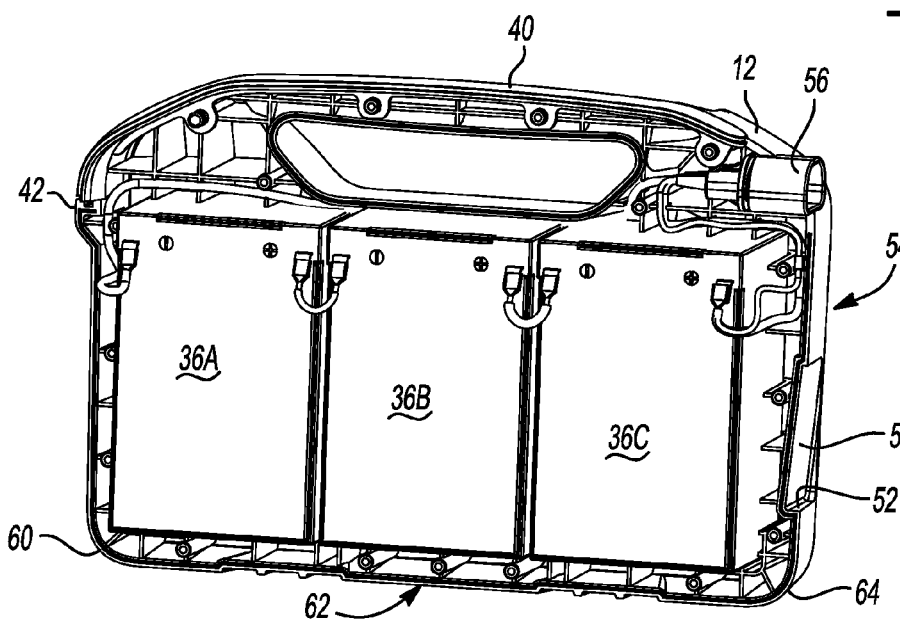
FIG. 4 is a front perspective view of an exemplary battery shown with a portion of the battery housing removed to illustrate a series of cells housed therein.

With continued reference to FIG. 1 and additional reference to FIGS. 2-12, the battery 12 will be described in greater detail. The battery 12 can generally include a battery housing 34 for retaining cells 36A, 36B and 36C (FIG. 4). In one example, the battery housing 34 can be formed of rigid plastic. In the particular example shown, three cells 36A, 36B and 36C are shown connected in series, however, other configurations are contemplated. The exemplary battery 12 can provide 36 volts direct current (DC). It is appreciated that the battery 12 can be configured to provide other voltages. A handle 40 can be formed at an upper side 41 of the battery housing 34. A catch 42 defining a groove 44 can be formed at a forward side 46 of the battery housing 34. A relief 50 (FIG. 4) defining a ledge 52 can be formed at a rearward side 54 of the battery housing 34. A first mating portion 56 can be formed at the rearward side 54 of the battery housing 34. A front heel 60 can be formed at a transition between the forward side 46 of the battery housing 34 and a bottom side 62 of the battery housing 34. A rear heel 64 can be formed at a transition between the rearward side 54 and the bottom side 62 of the battery housing 34.

Figure 5:
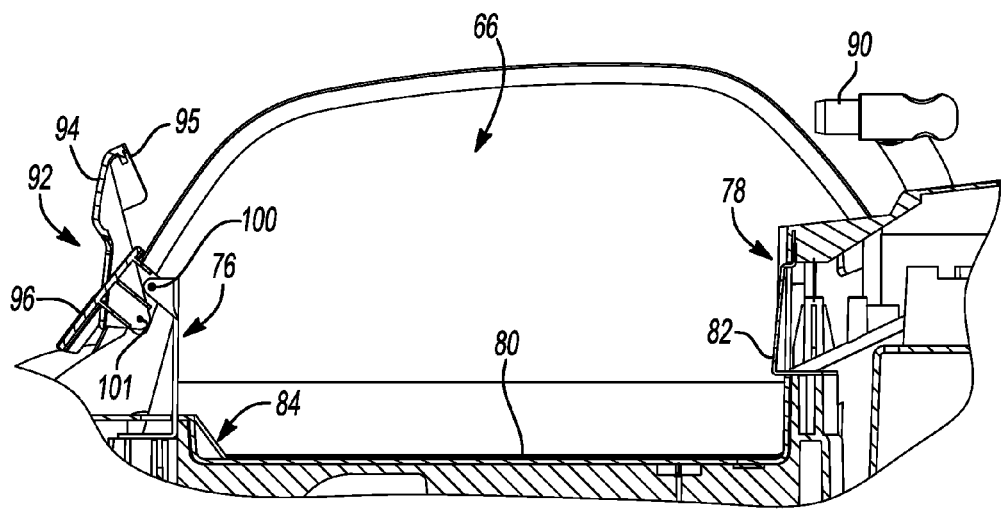
FIG. 5 is a partial sectional view taken through the pocket of the mower.

The battery 12 can be configured to selectively mate with a pocket 66 defined on the mower 10. Prior to describing the mating action of the battery 12 with the pocket 66, additional features of the mower 10 will be briefly described. The mower 10 can define a deck 70. The deck 70 can provide a mounting structure for various components of the mower as will be described and can generally form a barrier to the blade(s) 16. A pair of lateral walls 72 and 74 can extend upward from the deck 70. The pair of lateral walls 72 and 74 cooperate with a forward boundary 76 (FIG. 5), a rearward boundary 78, and a base 80 to form the pocket 66. The rearward boundary 78 can include a protrusion 82 that generally extends into the pocket 66. A ramp 84 can be formed at a transition between the forward boundary 76 and the base 80. The pocket 66 is generally centered between a first and second motor(s) 86 and 88 (FIG. 3) of the cutting mechanism 14. A second mating portion 90 can be defined on the mower 10 in an area generally adjacent to the rearward boundary 78 (FIG. 5).

Figure 6:
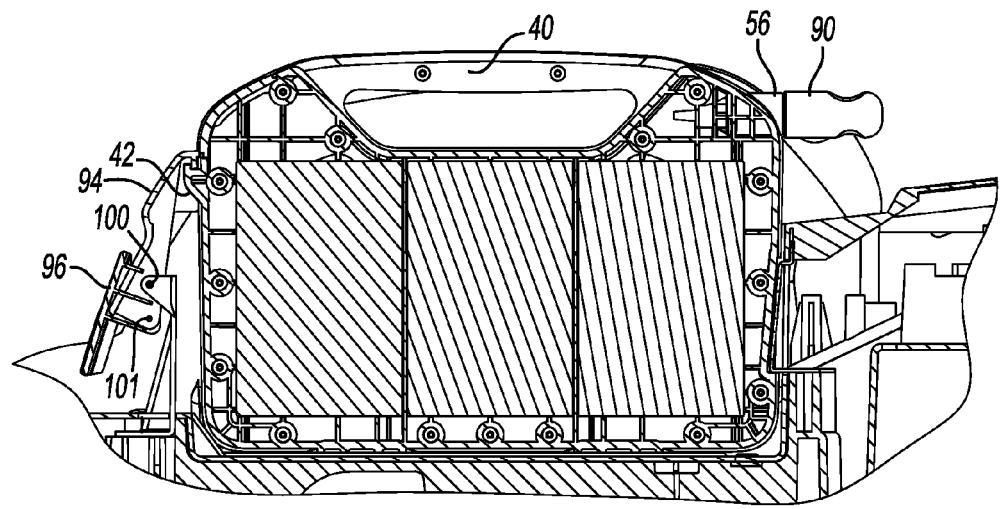
FIG. 6 is a sectional view taken through the pocket of the mower and shown with an exemplary battery in the installed position.
Figure 7:
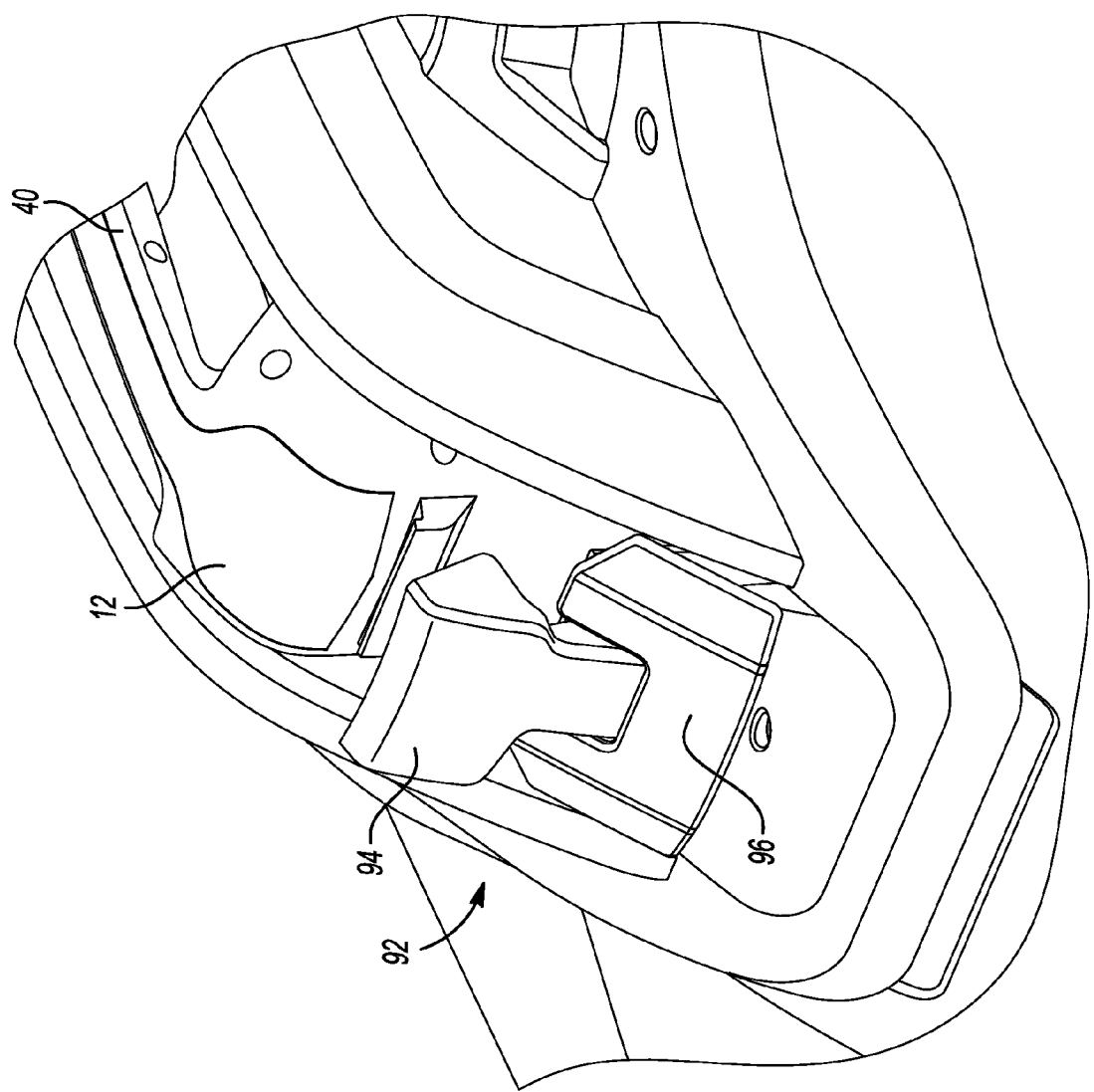
FIG. 7 is a partial perspective view of a lever and latch associated with the mower at the pocket.
Figure 8:
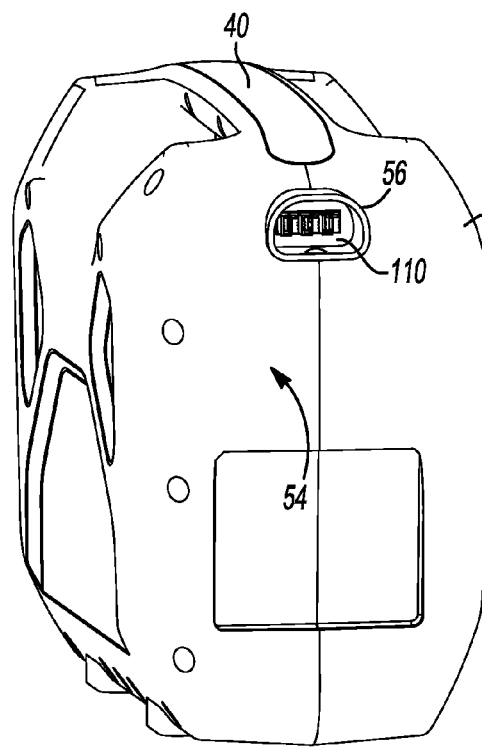
FIG. 8 is a rear perspective view of the battery illustrating a first mounting portion according to one example of the present disclosure.

A latch assembly 92 can be provided generally adjacent to the forward boundary 76. The latch assembly 92 can include a latch 94 and a lever 96. The latch 94 can define a lip 95. As will be described, the latch 94 can rotate about a latch pivot 100 and the lever 96 can rotate about a lever pivot 101 to cooperatively secure the battery 12 within the pocket 66 in an installed position (FIG. 6).

With specific reference now to FIGS. 2, 5 and 6, installation of the battery 12 into the pocket 66 will be described. At the outset, a user, while holding the handle 40 can generally advance the battery 12 downward into the pocket 66 (FIG. 2). As the battery 12 is progressively advanced downward (toward the base 80 of the pocket 66), the front heel 60 of the battery housing 34 rides along the ramp 84, thereby urging the battery 12 rearward (toward the rearward boundary 78 of the pocket 66). During such rearward movement, the protrusion 82 formed on the rearward boundary 78 can nest into the relief 50 defined in the rearward side 54 of the battery housing 34. Concurrently, the first mating portion 56 of the battery 12 can mate with the second mating portion 90 of the mower 10. Next, the latch 94 can be rotated about the latch pivot 100 in a direction clockwise as viewed in FIGS. 5 and 6 until the lip 95 nests within the groove 44 defined on the battery housing 34. Once the lip 95 is engaged to the groove 44, the lever 96 can be rotated about the lever pivot 101 in a direction counter-clockwise as viewed in FIGS. 5 and 6 to positively secure the latch assembly 92 in a secure position (FIG. 6). As best viewed in FIG. 3, the latch 94 can provide a wide gripping area along the catch 42 of the battery housing 34 for ease of use and sufficient retaining strength. While an over-center latch 94 is shown, other latching configurations are contemplated such as sliding latches or rotating latches for example. Furthermore, while the latch assembly 92 has been described near the front of the pocket 66 (e.g. at the front of the deck 70), the latch assembly 92 may be provided elsewhere on the deck 70 for communicating with the battery 12. Likewise, additional latch assemblies can be provided for cooperative retention of the battery 12.

As can be appreciated, the battery 12 can be secured to the deck 70 with one simple latching operation at a convenient location near the front of the deck 70. The battery 12 is positioned near the center of the deck 70 so that the mower 10 is well-balanced and stable. The battery 12 is made in a narrow shape, with the battery cells 36A, 36B and 36C standing on end (FIG. 4), so that the battery 12 can be positioned generally between the first and second motor(s) 86 and 88 of the cutting mechanism 14. The user can maneuver the mower 10 easily and the tipping over of the mower 10 is inhibited.

With reference now to FIGS. 8-12 additional features of the first mating portion 56 of the battery 12 will now be described. The mower 10 is electrically connected to the battery 12 by way of coupling the first and second mating portions 56 and 90 together (FIG. 6). The first mating portion 56 can define a recess 110 having various electrical battery connectors 112 positioned therein. In the particular example shown, three Anderson-type electrical connectors 112 are provided. Those skilled in the art will appreciate that other electrical connectors may be used. The electrical battery connectors 112 can include a first positive battery connector 114, a second positive battery connector 116 and a negative battery connector 118. The first positive battery connector 114 can be configured for powering the mower 10. The second positive battery connector 116 can be configured for charging the battery 12. The negative battery connector 118 can be configured for powering and charging. Other configurations are contemplated.

Figure 9:
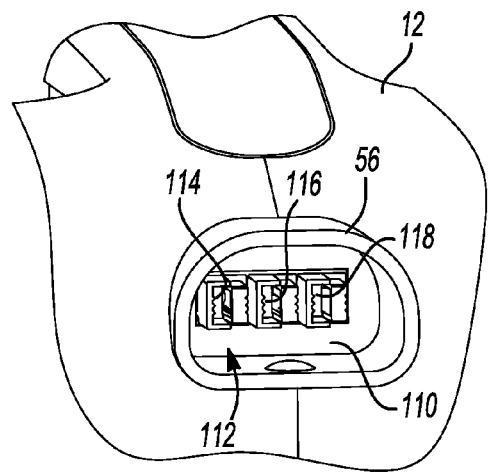
FIG. 9 is a detailed perspective view of the first mounting portion shown in FIG. 8.
Figure 11:
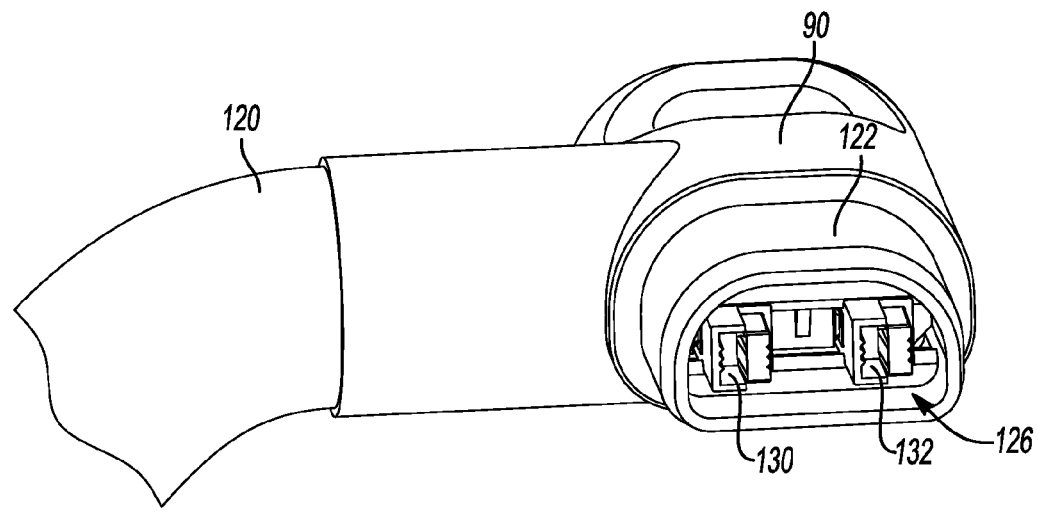
FIG. 11 is a perspective view of a mower cable according to one example of the present teachings.

The second mating portion 90 can extend from a mower cable 120 (FIG. 11). The second mating portion 90 can define an extension portion 122 for being received into the recess 110 of the first mating portion 56 (FIG. 9). The second mating portion 90 can define various electrical mower connectors 126 positioned thereon. Again, Anderson-type electrical connectors 112 are shown by way of example. The electrical mower connectors 126 can include a negative mower connector 130 and a positive power mower connector 132. As can be appreciated, in a mated position (FIG. 6), the negative battery connector 118 (FIG. 9) is electrically coupled to the negative mower connector 130 (FIG. 11) and the first positive battery connector 114 (FIG. 9) is electrically coupled to the positive power mower connector 132 (FIG. 11).

Figure 12:
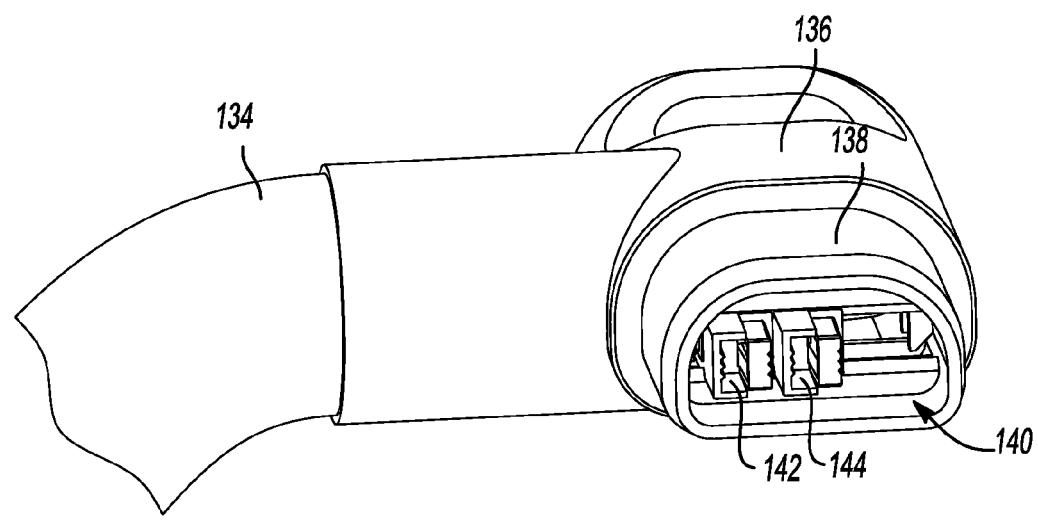
FIG. 12 is a perspective view of a charger cable according to one example of the present teachings.
Figure 13:
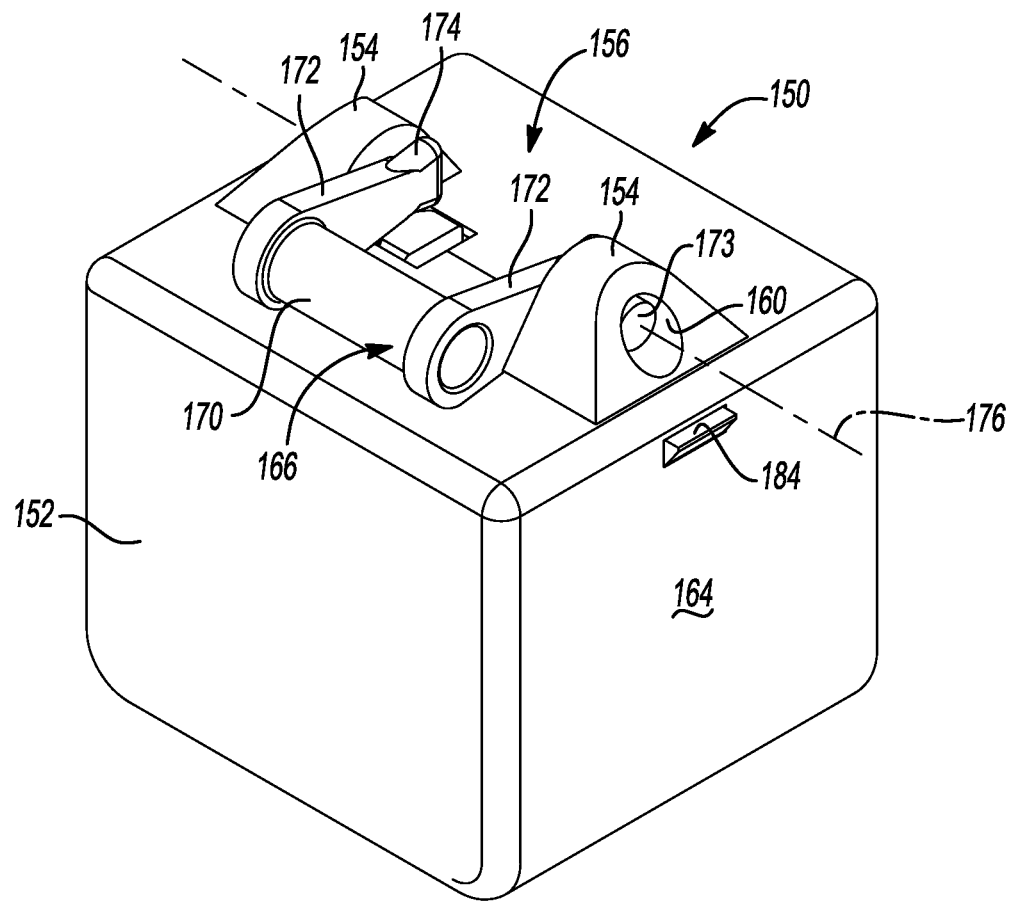
FIG. 13 is a front perspective view of a battery having a foldable handle according to additional features of the present disclosure.
Figure 14:
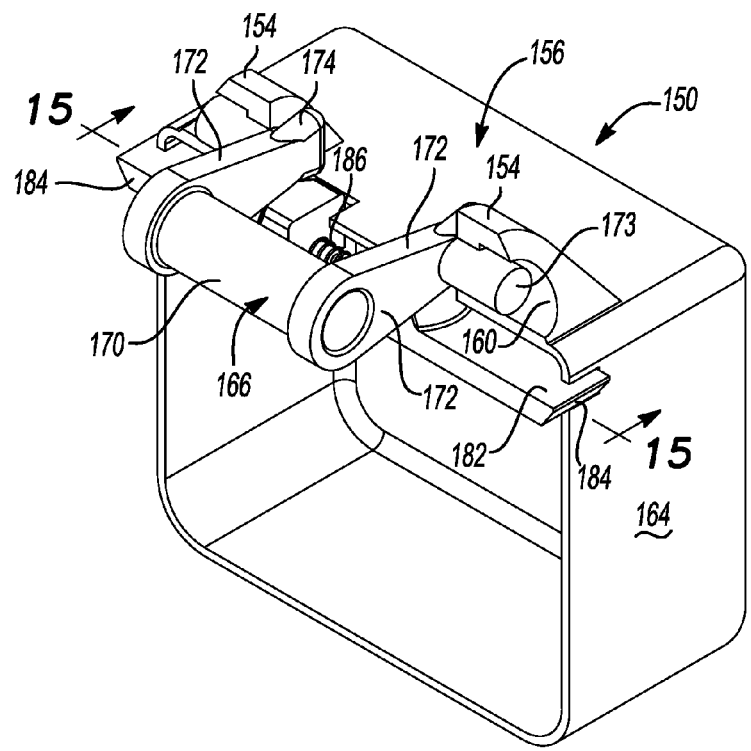
FIG. 14 is a perspective view of the battery shown in FIG. 13 with a portion of the housing removed to illustrate a battery retention feature shown in a locked position according to one example of the present teachings.

A charger cable 134 is shown in FIG. 12. The charger cable 134 can define a third mating portion 136 having an extension portion 138 for being received into the recess 110 of the first mating portion 56 of the battery 12. The third mating portion 136 can define various electrical charger connectors 140 positioned thereon. Again, Anderson-type electrical connectors 112 are shown by way of example. The electrical charger connectors 140 can include a negative charger connector 142 and a positive charger connector 144. As can be appreciated, in a mated position (not specifically shown), the negative battery connector 118 (FIG. 9) is electrically coupled to the negative charger connector 142 and the second positive battery connector 114 is electrically coupled to the positive charger connector 144. When the charger cable 134 is connected to the battery 12, the battery 12 can be charged.

The location of the electrical connectors 112 and the mating shapes of the first mating portion 56 on the battery 12 helps ensure that the cables (mower cable 120 and charger cable 134) cannot be connected in an incorrect location or orientation. The configuration further ensures reliable charging of the battery 12 and reliable power supply to the mower 10. Using the same opening on the battery housing 34 for the mower cable 120 and the charger cable 134 ensures that the mower 10 is unplugged while the battery 12 is being charged. The unique shape and configuration of the connections also helps to ensure that an inappropriate power supply or tool cannot be connected to the battery 12, the mower 10, or the charger (not specifically shown).

Figure 55:
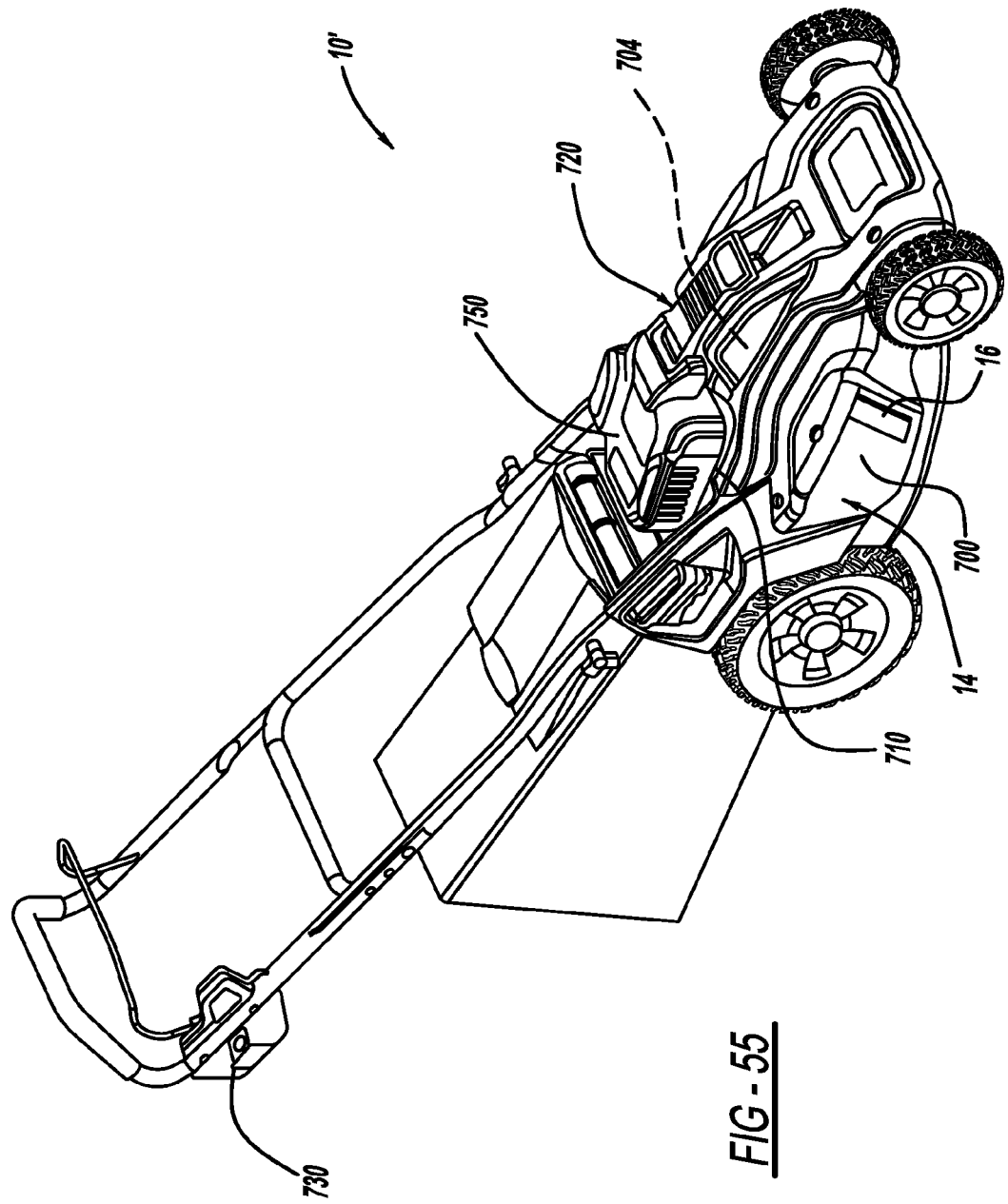
FIG. 55 is a perspective view of an exemplary battery-powered lawn mower shown with a battery installed into a pocket defined on the mower.

With reference to FIG. 55, an exemplary battery-powered lawn mower 10' will be described. The battery-powered lawn mower 10' is similar to and includes the features of mower 10 (FIG. 1) described herein, except as noted below. The mower 10' includes a deck 700. The deck 700 provides a mounting structure for various components of the mower 10' and can generally form a barrier to the blade(s) 16 coupled to the deck 700. The mower 10' includes a cutting mechanism 14 (FIG. 1) to drive blade(s) 16 (for example, a motor 704) that is supported by the deck 700. It is contemplated that the mower 10' may include more than one motor, as described above in regard to mower 10 and motors 86, 88 (FIG. 3). The deck 700 defines a pocket 710 that can receive a battery 750 (described below) that is similar to battery 12 (FIGS. 1 and 8-12). The battery 750 is electrically coupled to and provides the power to operate motor 704, which drives the blade(s) 16. The battery 750 has a shape that corresponds to the shape of the pocket 710 such that the battery 750 fits snugly within the pocket 710.

Figure 60:
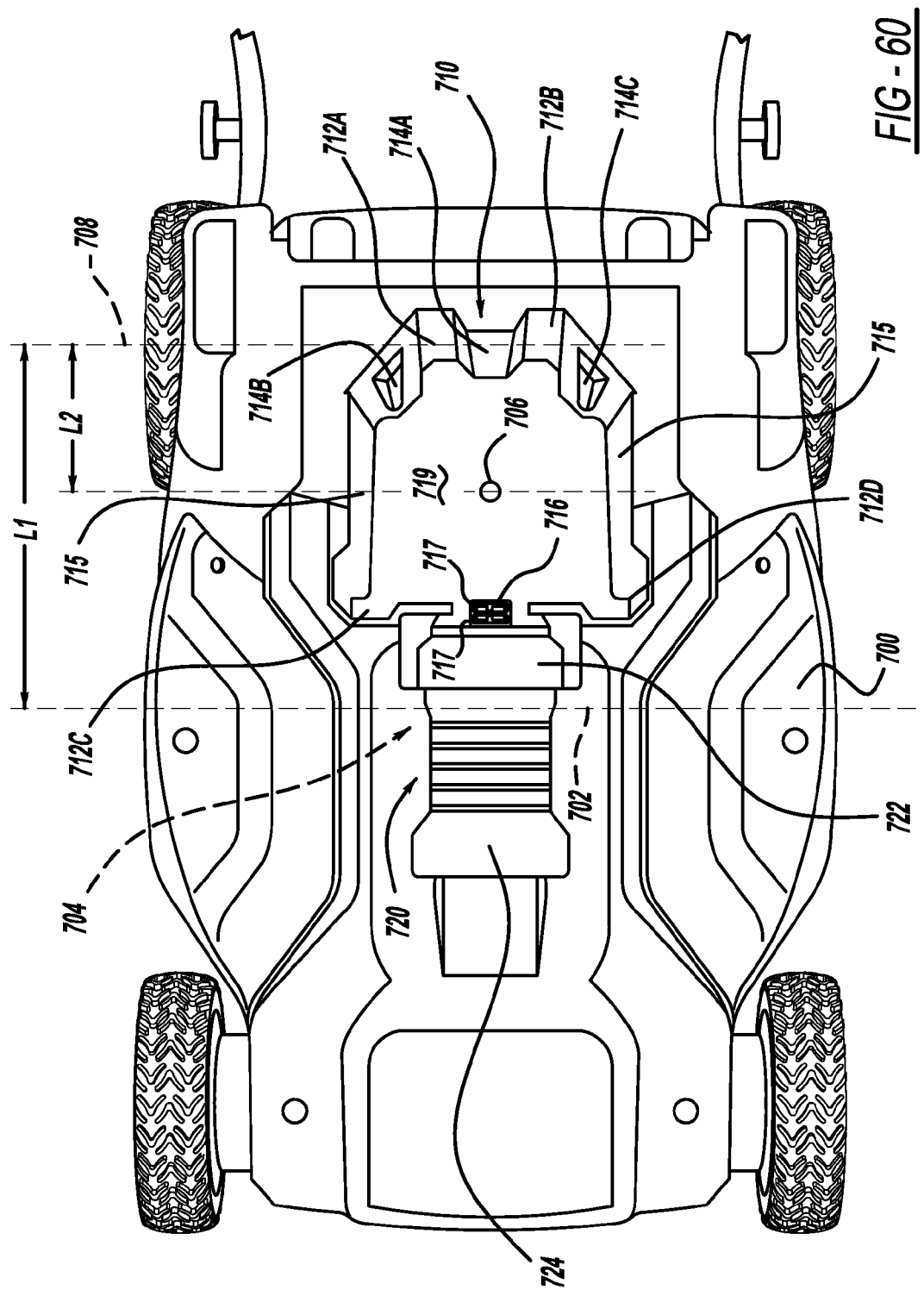
FIG. 60 is a partial perspective view of the exemplary battery-powered lawn mower shown in FIG. 55 with the battery removed to illustrate the pocket.
Figure 62:
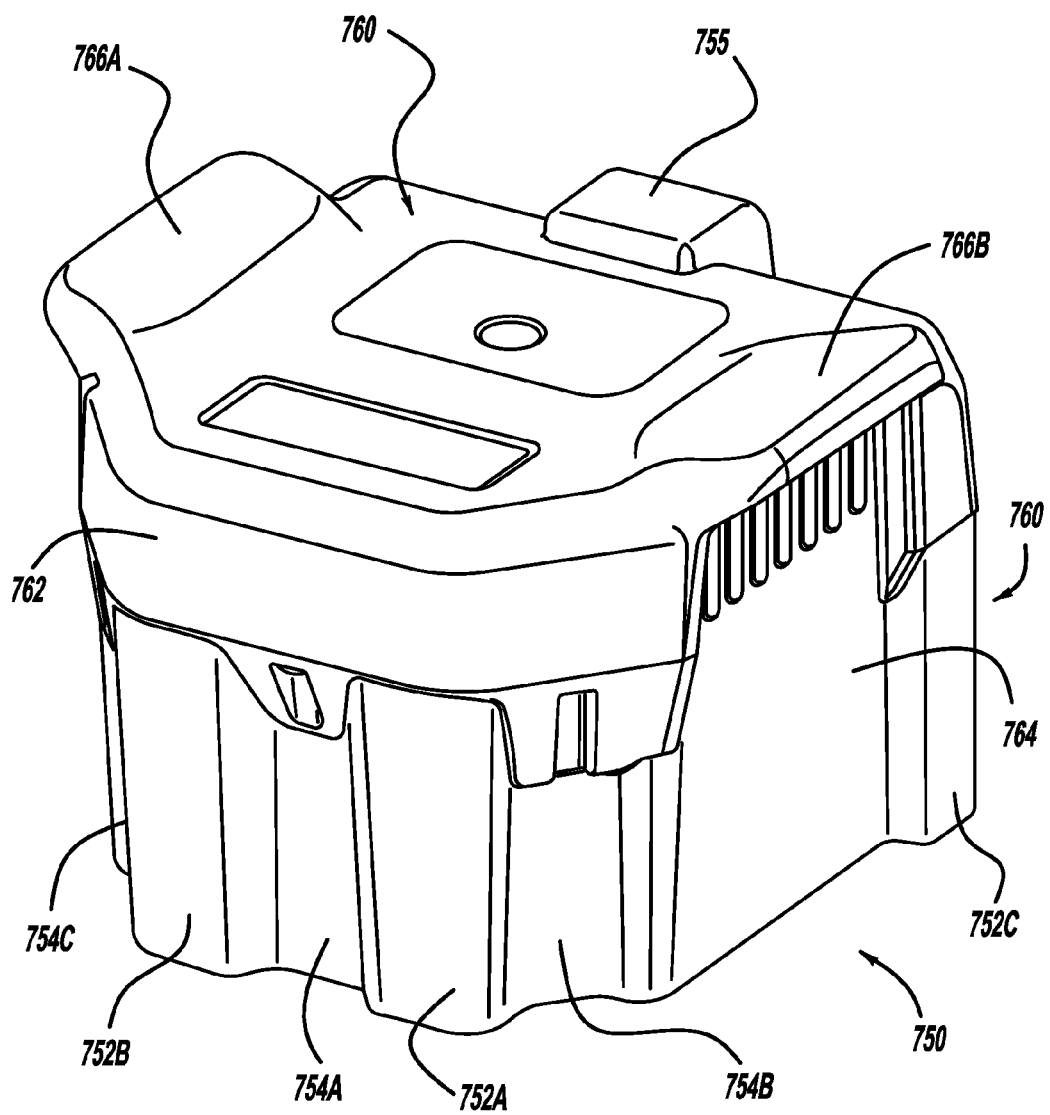
FIG. 62 is another perspective view of the battery of the exemplary battery-powered lawn mower shown in FIG. 55.

With additional reference to FIG. 60, the pocket 710 includes a base portion 719 with a plurality of walls 715 arranged substantially perpendicular to the base portion 719. In one embodiment, the shape of the battery 750 complements the shape of the pocket 710 such that the battery 750 can be inserted within the pocket in a single orientation. For example only, pocket 710 can define one or more recesses 712A-D (FIG. 60) that correspond to one or more projections 752A-D (FIGS. 62-63) on the battery 750. Additionally or alternatively, the pocket 710 can include one or more projections 714A-C that correspond to one or more recesses 754A-C defined by the battery 750. In this manner, the battery 750 can be inserted within the pocket 710 only when the projection(s) 752A-D, 714A-C and recess(es) 754A-C, 712A-D are properly aligned. Furthermore, the projection(s) 752A-D, 714A-C and recess(es) 754A-C, 712A-D can assist with guiding the battery 750 to the proper positioning within the pocket 710. Additionally or alternatively, the walls 715 of pocket 710 can be tapered to assist in guiding the battery 750 to the proper positioning within the pocket 710.

The battery 750 within pocket 710 is positioned such that the mower 10' is well-balanced and stable. The battery 750 (and pocket 710) is positioned rearward of the longitudinal center 702 of the deck 700 such that a user may more easily maneuver the mower 10'. Furthermore, in a non-limiting example, mower 10' can include a drive mechanism (such as drive mechanism 18 described herein) for propelling one or more of the wheels 30 at the rear of the mower, and the positioning of the battery 750 rearward of the longitudinal center 702 of the deck 700 can provide additional weight and traction to the rear wheels 30. The battery 750 and pocket 710 are also positioned frontward of the rear wheel axle axis 708 in order to reduce the overall length of the mower 10'. In addition, the battery 750 and pocket 710 may be positioned in the approximate center of the width of the deck 700 to increase stability and inhibit tipping.

In one embodiment, the motor 704 (and the axis of rotation of the blade 16) is arranged along the longitudinal center 702 of the deck 700. The center 706 of the battery 750/pocket 710 can be positioned rearward of the longitudinal center 702 by at least fifty percent of the distance L1 between the longitudinal center 702 and the rear wheel axle axis 708. In other words, the distance L1 between the longitudinal center 702 and the rear wheel axle axis 708 is at least twice the distance L2 between the center 706 of the battery 750/pocket 710. For example only, the distance L1 can be 380 millimeters and the distance L2 can be 160 millimeters such that the distance L1 is 2.375 times the distance L2.

In order to further increase stability and inhibit tipping of the mower 10', the depth of the pocket 710 can be increased. Increasing the depth of the pocket 710 reduces the overall height of the deck 700 with the battery 750 installed. Further, the battery 750 can comprise a large portion of the overall weight of the mower 10'. Thus, increasing the depth of the pocket 710 also lowers the center of gravity of the mower 10'.

Figure 56:
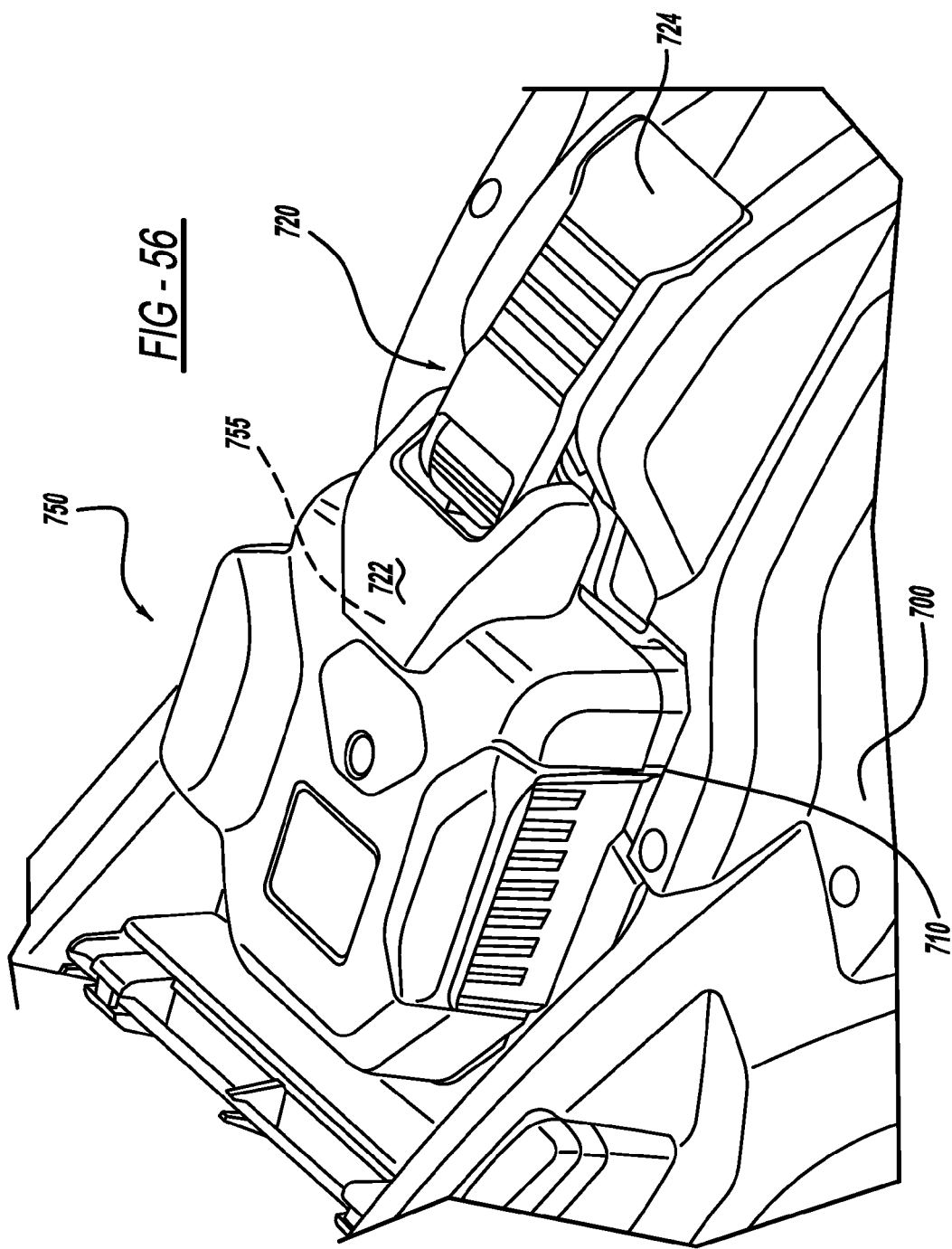
FIG. 56 is a partial perspective view of the exemplary battery-powered lawn mower shown in FIG. 55 in a first configuration.
Figure 57:
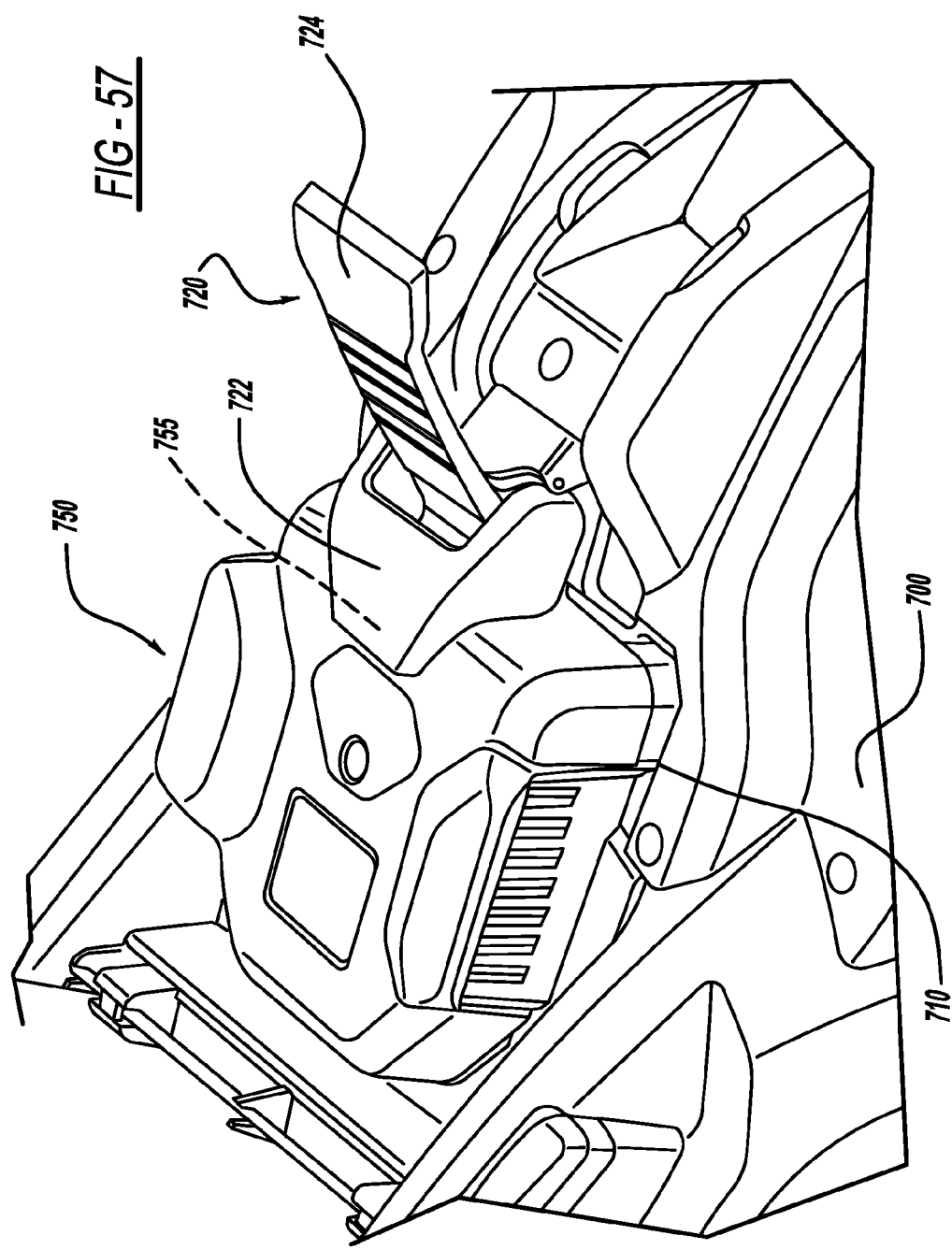
FIG. 57 is a partial perspective view of the exemplary battery-powered lawn mower shown in FIG. 55.
Figure 58:
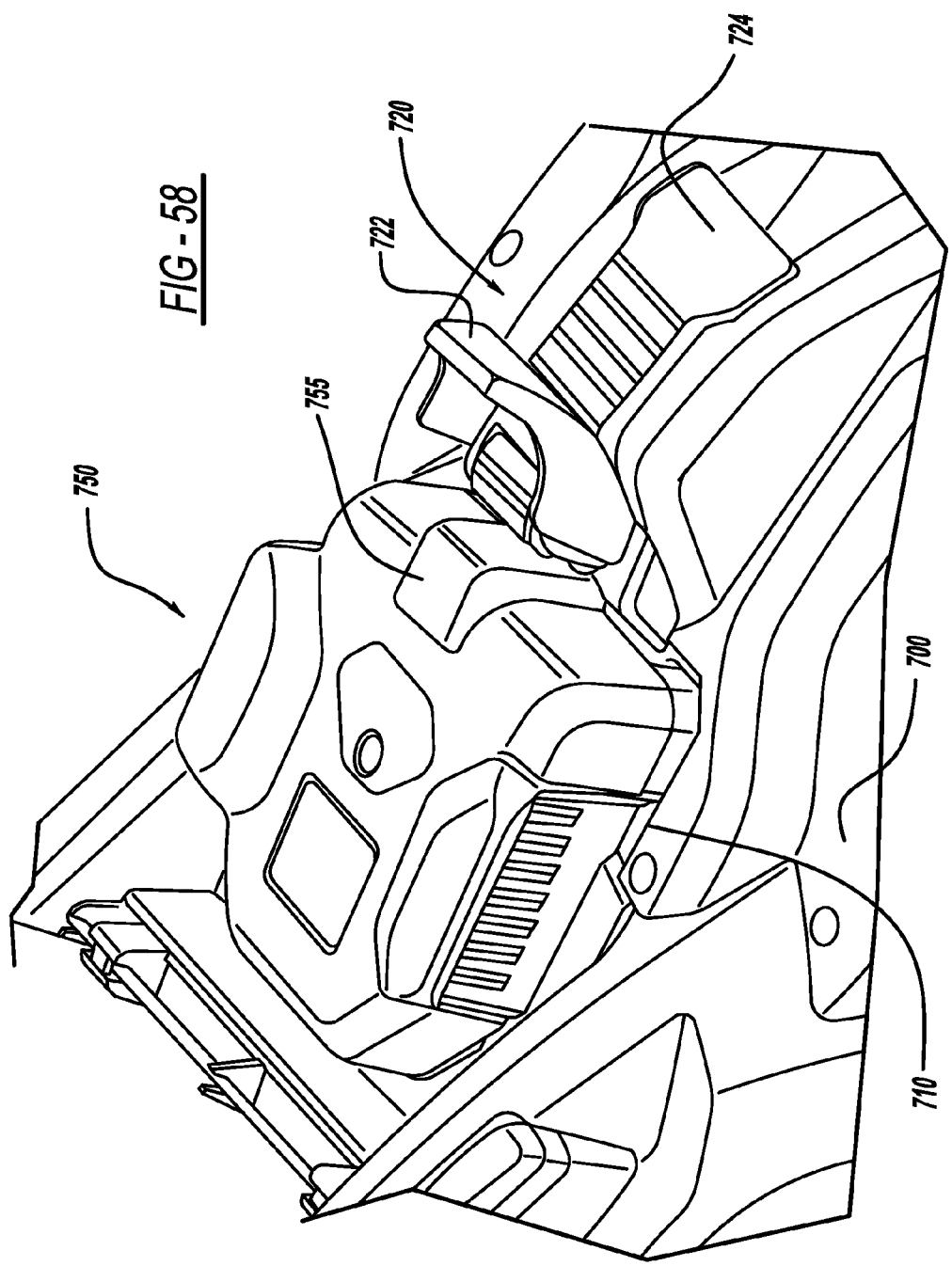
FIG. 58 is a partial perspective view of the exemplary battery-powered lawn mower shown in FIG. 55 in a second configuration.
Figure 59:
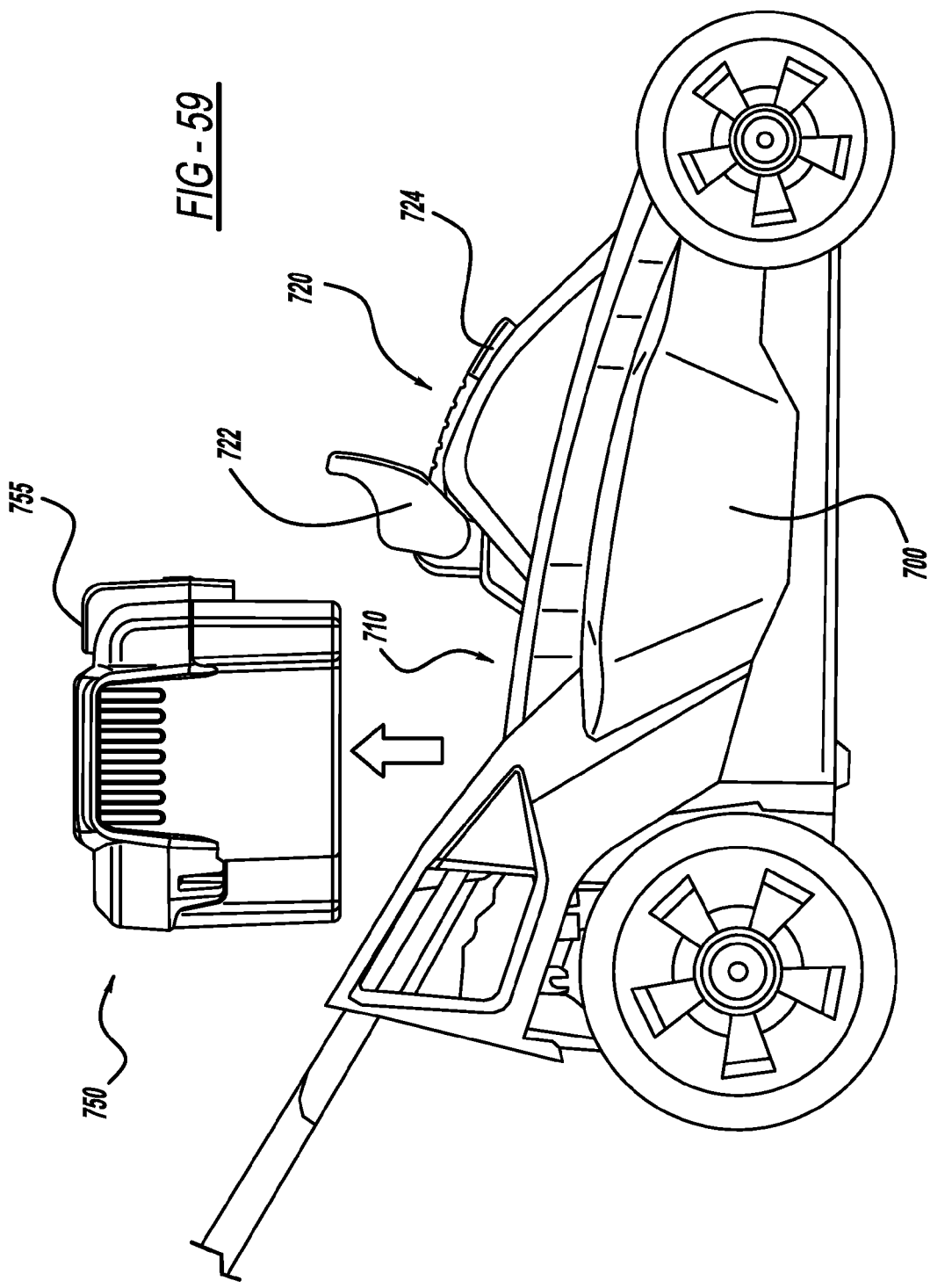
FIG. 59 is a perspective view of the exemplary battery-powered lawn mower shown in FIG. 55 with the battery being removed from the pocket.

With reference to FIGS. 55-58, a latch assembly 720 that is similar to latch assembly 92 (FIGS. 2-3 and 5-7) is coupled to the deck 700. While latch assembly 720 is an over-center type latch, other latching configurations are may be substituted therefor, such as sliding latches or rotating latches. The latch assembly 720 includes a latch 722 and lever 724. The latch 724 engages a latch catch 755 formed on the battery 750 to secure the battery 750 within the pocket 710 in a first configuration, as shown in FIG. 56. The lever 724 is rotated, as shown in FIG. 57, to disengage the latch 724 from the latch catch 755. In a second configuration shown in FIG. 58, the latch 722 is fully opened and completely disengaged from the battery 750 such that the battery 750 can be freely removed from the pocket 710. As more fully described below, the battery 750 can be removed from the pocket 710 by moving the battery 750 in the direction of the arrow shown in FIG. 59.

For example only, the latching assembly 720 may further include a biasing member, e.g., a spring that biases the latching assembly 720 to be in the second configuration. Upon releasing the latch 722 from engagement with the latch catch 755, the biasing member may automatically move the latch 722 to the fully opened position shown in FIG. 58. In this manner, the latching assembly 720 may be easily moved from the first configuration (FIG. 56) to the second configuration (FIG. 58) by a user utilizing one hand. In order to secure the battery 750 within the pocket 710, a user manually engages the latch 722 with the latch catch 755 while rotating the lever 724. Then, the lever 724 is moved to the lock position while the latch 722 is engaged with the latch catch 755 (FIG. 56).

Figure 63:
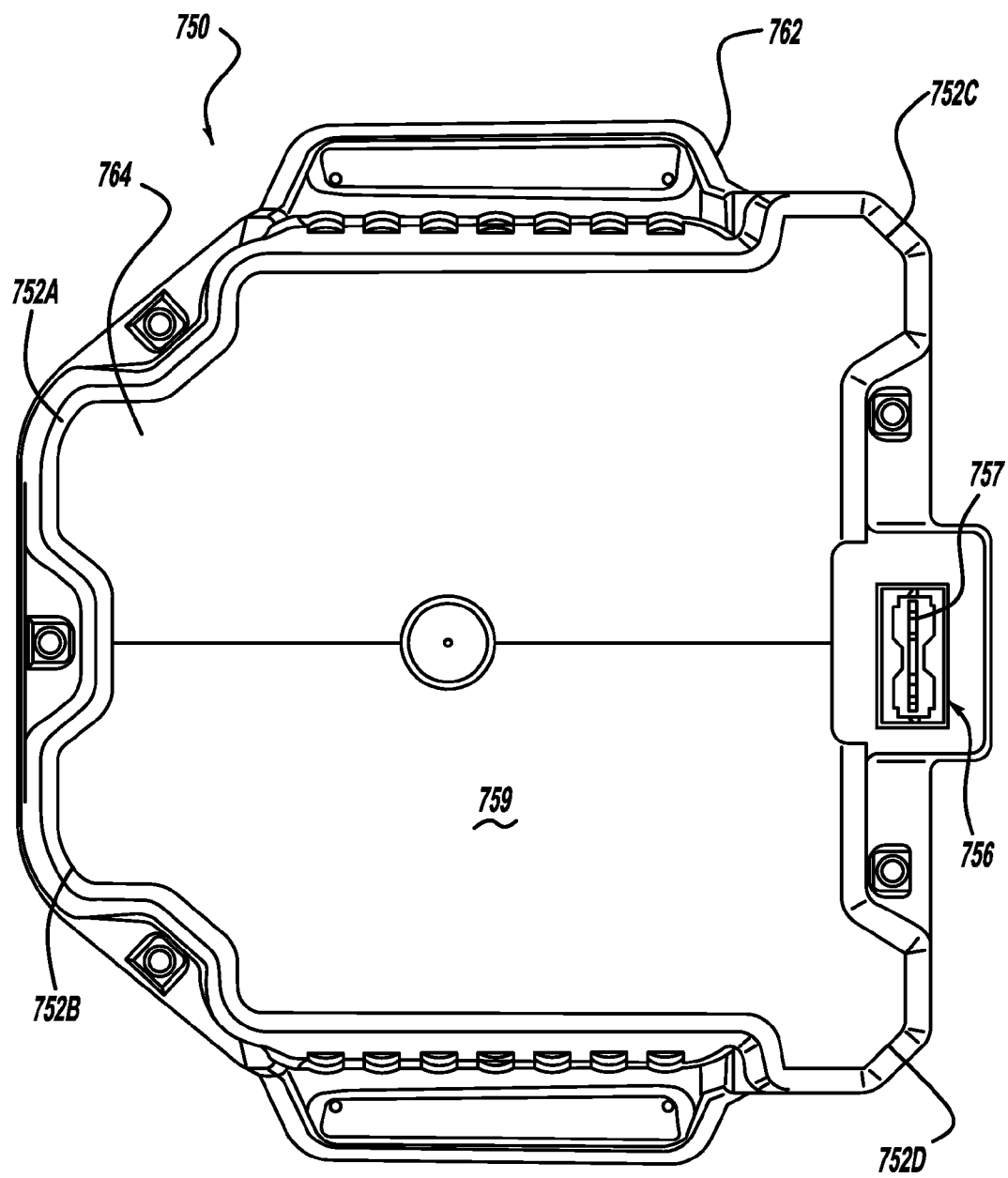
FIG. 63 is another perspective view of the battery of the exemplary battery-powered lawn mower shown in FIG. 55.
Figure 64:
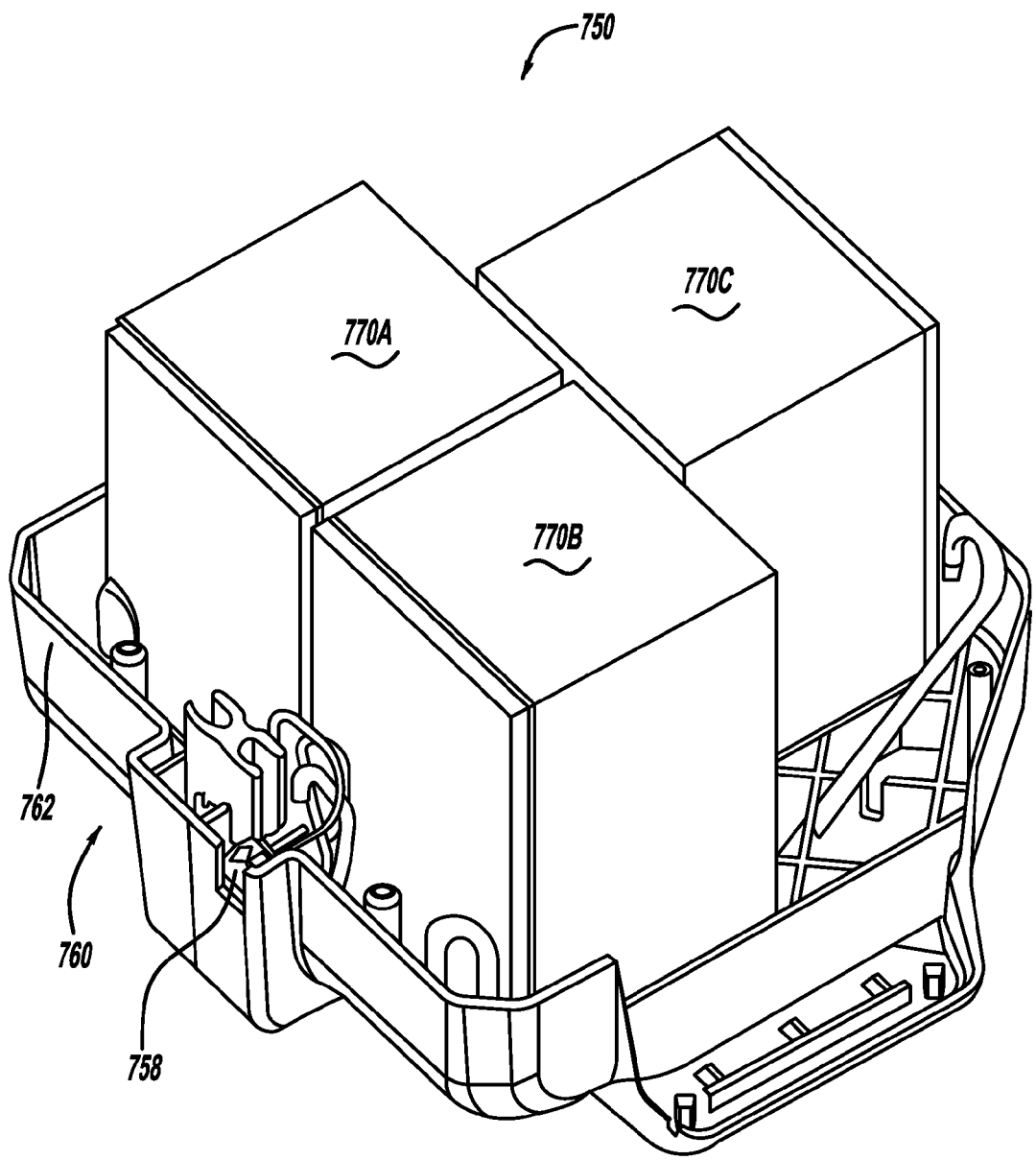
FIG. 64 is a partial perspective view of the battery of the exemplary battery-powered lawn mower shown in FIG. 55 with a portion of the battery housing removed to illustrate a series of cells housed therein.

With reference to FIGS. 55, 60 and 63, in order to electrically couple the battery 750 with the other components of the mower 10', a mower connector 716 is provided within the pocket 710. The mower connector 716 can include one or more projections 717 extending into the pocket 710 that are configured to mate with corresponding recess(es) 757 of a first battery connector 756 in a male-female connector configuration. Additionally or alternatively, the mower connector 716 can define one or more recess(es) that are configured to mate with corresponding projections of the first battery connector 756. The projection(s) 717 and recess(es) 757 may act as guide features that assist in positioning the battery 750 within the pocket 710. The mower connector 716 and/or the first battery connector 756 can be movably mounted to the pocket 710 and battery 750, respectively, to be self-aligning and ensure a proper connection between the mower 10' and battery 750. In some embodiments, the latching assembly 720 is used to fully secure and couple the mower connector 716 with the first battery connector 756.

Figure 61:
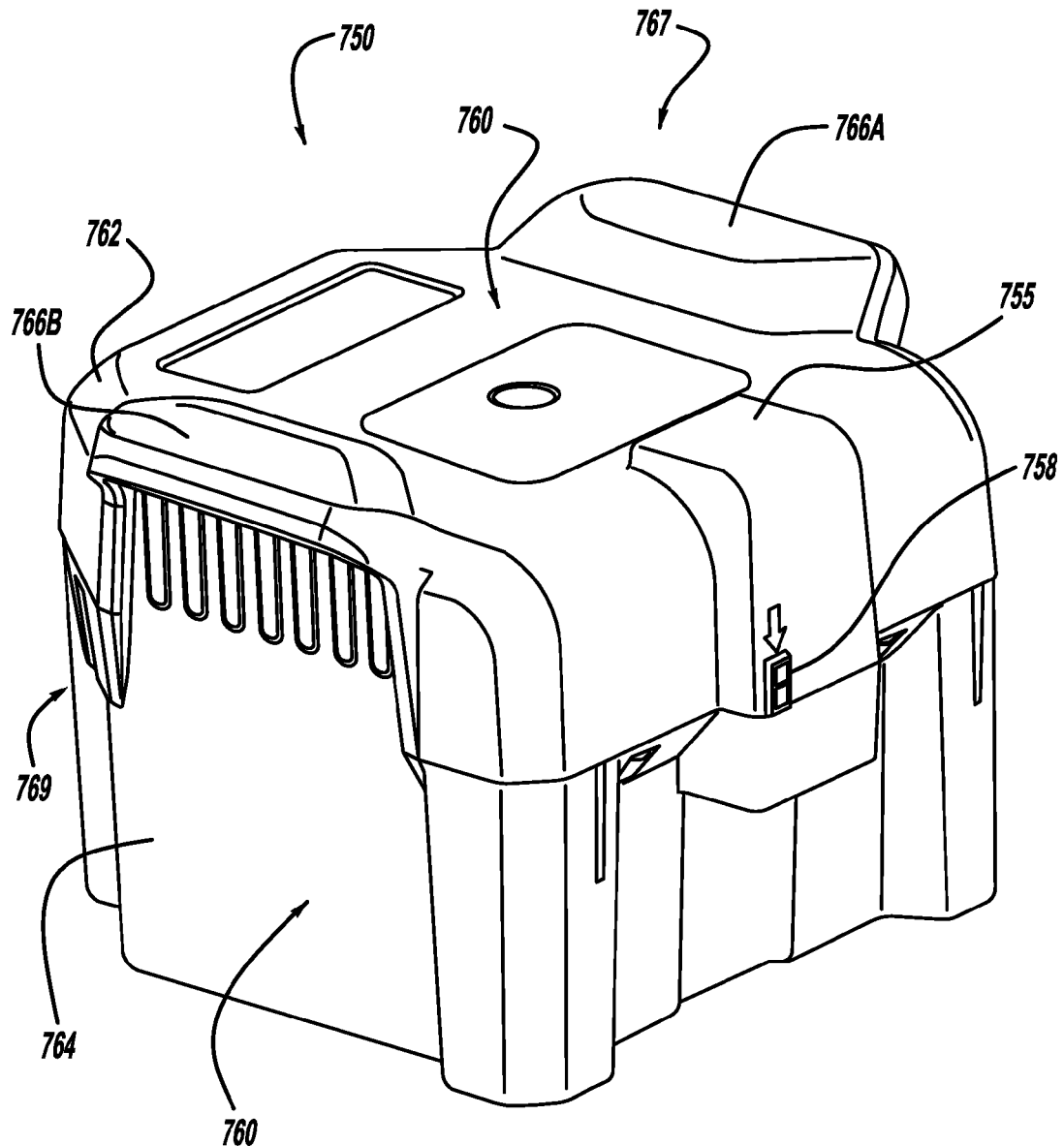
FIG. 61 is a perspective view of the battery of the exemplary battery-powered lawn mower shown in FIG. 55.

With additional reference to FIG. 61, the mower connector 716 can be arranged within the pocket 710 such that the first battery connector 756 automatically mates with the mower connector 716 as the battery 750 is inserted within the pocket 710. For example only, the mower connector 716 can be arranged upon the base portion 719 of pocket 710 and the first battery connector 756 can be located on a side 759 of the battery 750 that contacts base portion 719 in the first configuration.

Figure 68:
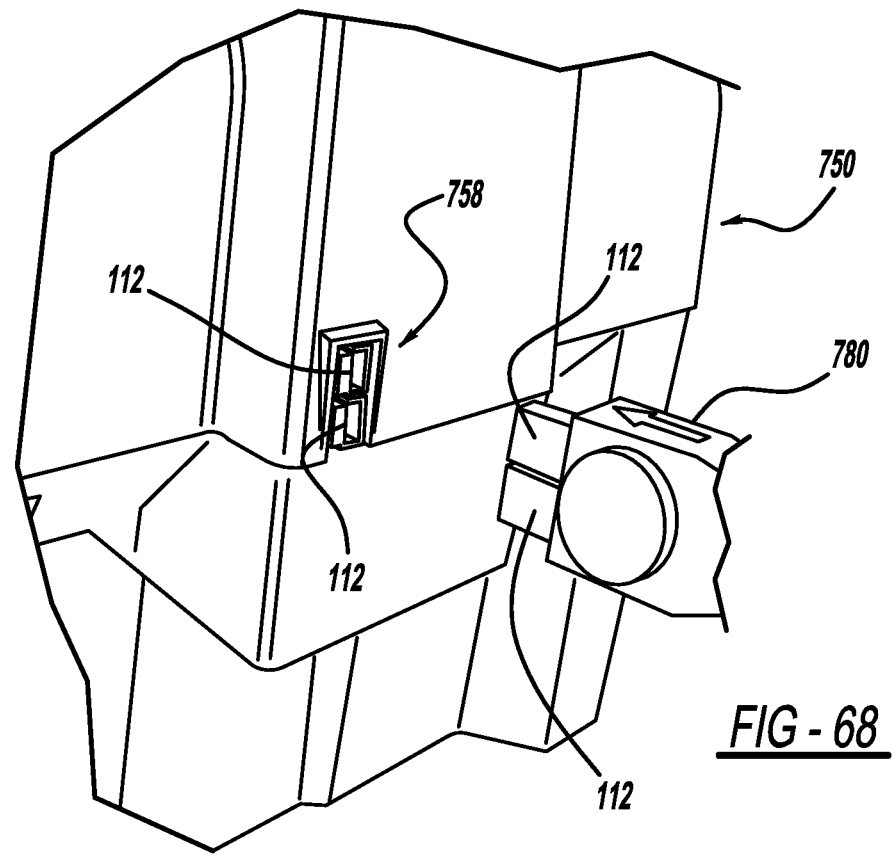
FIG. 68 is a partial perspective view of the battery of the exemplary battery-powered lawn mower shown in FIG. 55 with an exemplary charger cable.

In various embodiments, the battery 750 further includes a second battery connector 758 (FIGS. 61 and 68), e.g., for connection with a charger cable 780 (FIG. 68). The second battery connector 758 (FIG. 61) can be present on a portion of the battery 750 that is inaccessible to a user when the battery 750 is in the first configuration, i.e., secured within pocket 710, such that the battery 750 cannot be charged through the second battery connector 758 when the mower 10' is operating. Similar to the first and second mating portions 56 and 90 (FIGS. 8-12), any or all of the mower connector 716, first battery connector 756 and second battery connector 758 can include one or more Anderson-type electrical connectors 112 to ensure proper electrical connections.

The first battery connector 756 is utilized to provide power to the mower 10' and also to charge the battery 750, while the second battery connector 758 is used to charge the battery 750. A charger cable 780 is connected directly to second battery connector 758 to charge the battery 750 when the battery 750 is removed from pocket 710. With reference to FIG. 68, the charger cable 780 can be constructed to engage with the second battery connector 758 in a single orientation. While the battery 750 is secured within pocket 710, the charger cable 780 is connected to an electrical connector portion 732 associated with user interface 730, as is described more fully below. User interface 730 may be similar to user interface 22 (FIG. 1) described herein. Further, user interface 730 is electrically coupled to the mower connector 716 such that power may be provided to the battery 750 when coupled with mower connector 716 as described above. In this manner, battery 750 may be charged whether or not battery 750 is coupled to mower 10'.

Figure 10:
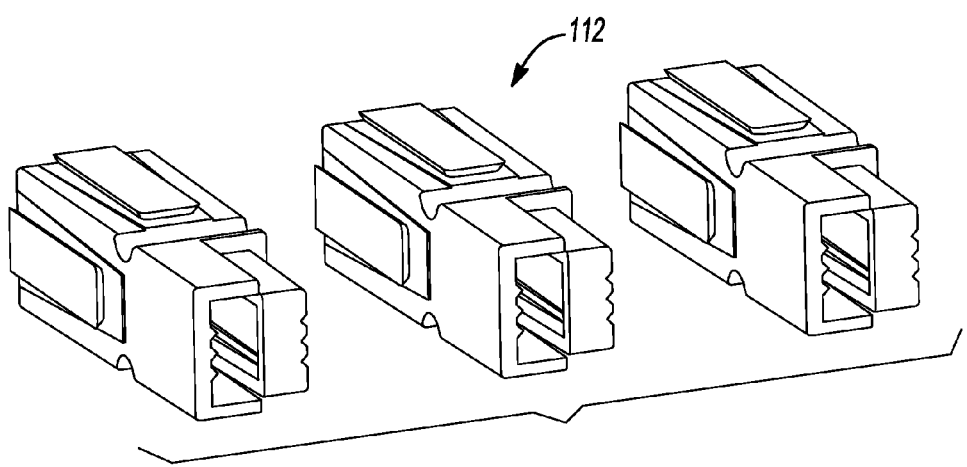
FIG. 10 is a perspective view of exemplary electrical connectors according to one example of the present teachings.
Figure 65:
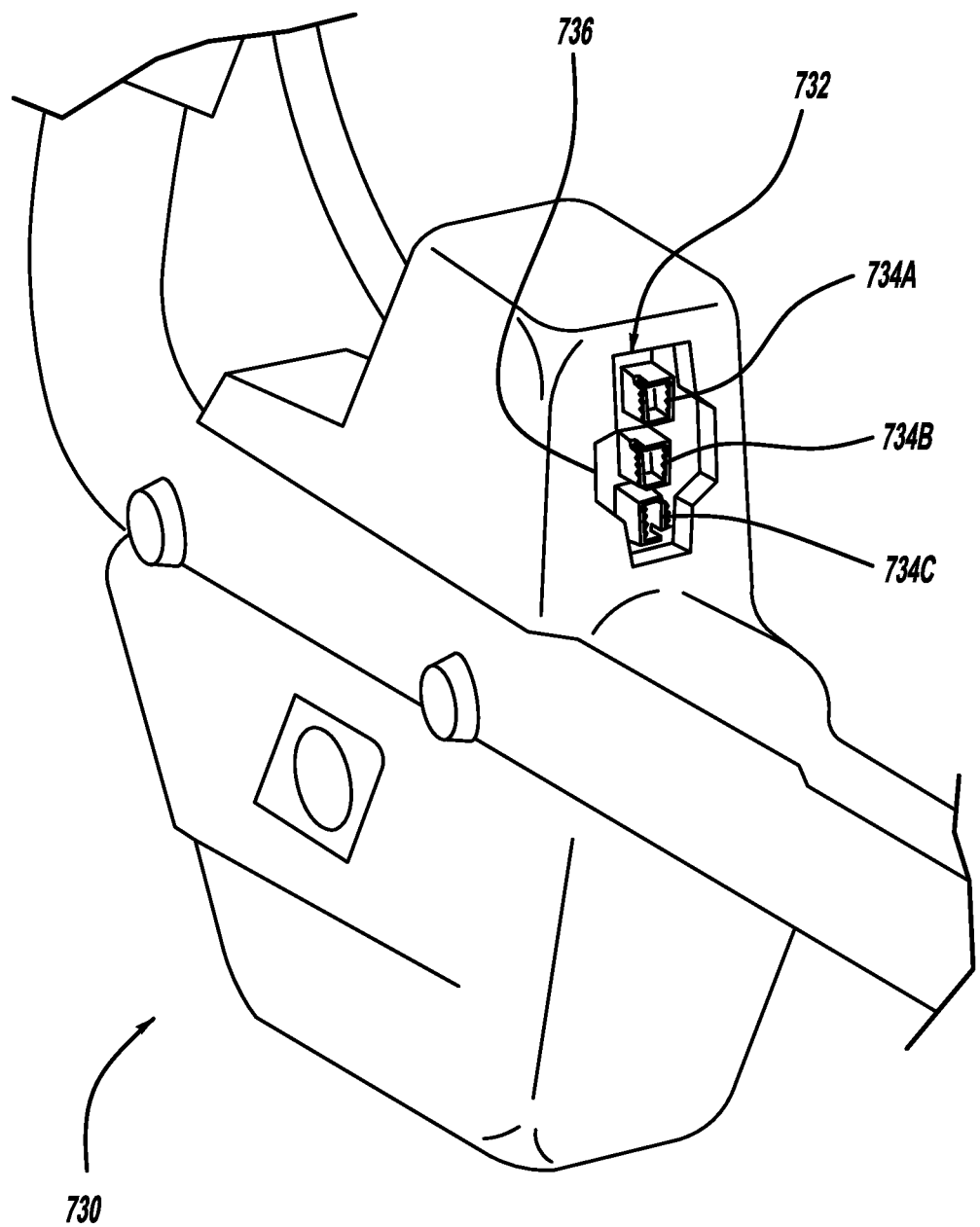
FIG. 65 is a partial perspective view of a user interface of the exemplary battery-powered lawn mower shown in FIG. 55.
Figure 66:
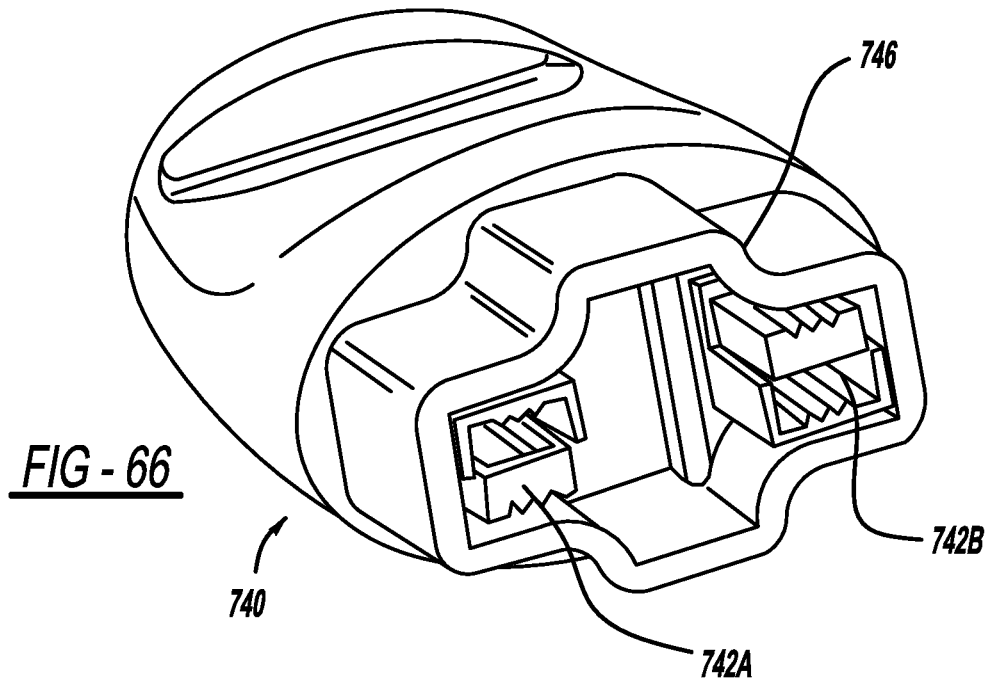
FIG. 66 is a perspective view of a safety key corresponding to the exemplary battery-powered lawn mower shown in FIG. 55.
Figure 67:
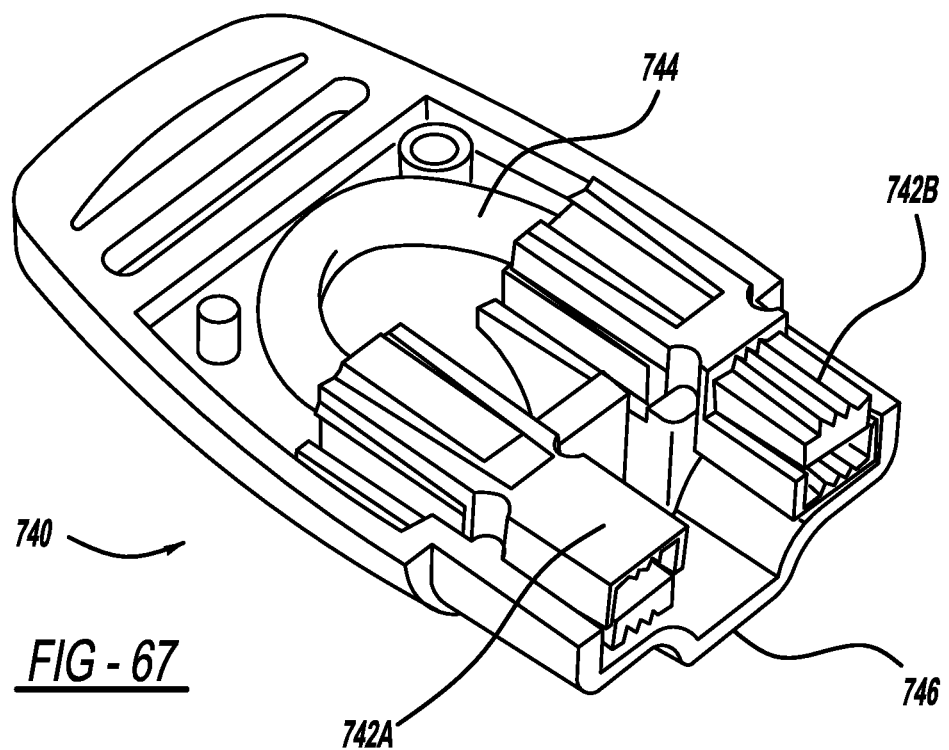
FIG. 67 is a sectional view of the safety key of FIG. 66.
Figure 69:
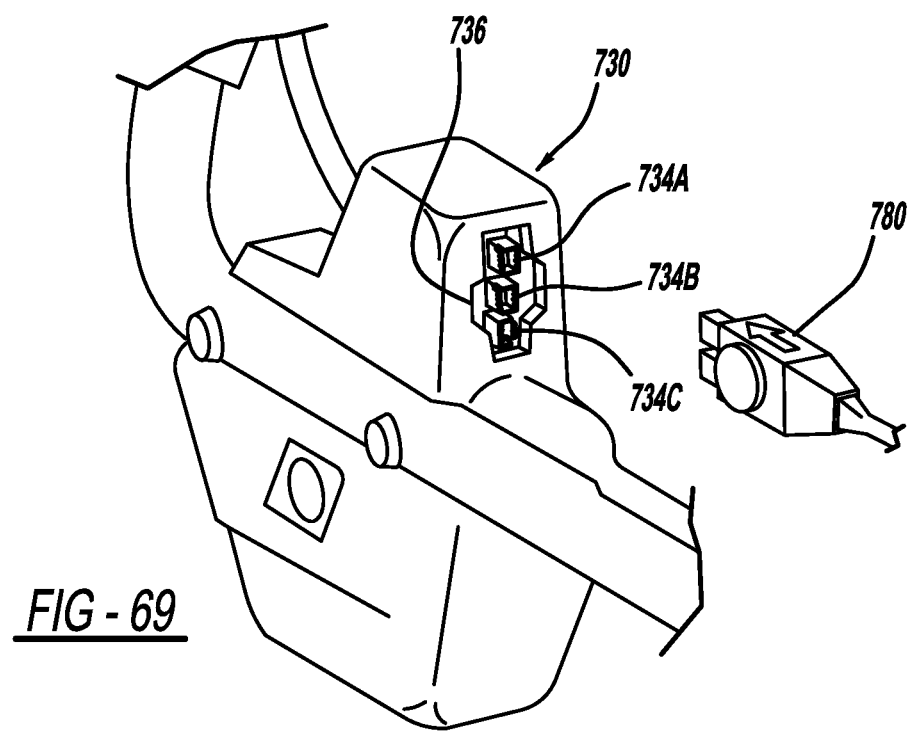
FIG. 69 is a partial perspective view of the exemplary user interface shown in FIG. 65 with an exemplary charger cable.

An exemplary user interface 730 is shown in FIGS. 65 and 69. User interface 730 includes an electrical connector portion 732 that has three electrical connectors 734A-C. Electrical connectors 734A-C can be any type of electrical connector, such as Anderson-type electrical connectors 112 (FIG. 10). Electrical connectors 734A and 734B are utilized to connect with charger cable 780 to charge the mower 10'. Electrical connectors 734A and 734C are utilized to connect with a safety key 740 (FIGS. 66-67), further described below. In order to inhibit improper connections, the electrical connectors 734A-C can be arranged such that the charger cable 780 can be engaged with electrical connector portion 732 in a single orientation, i.e., connected with electrical connectors 734A and 734B. Similarly, the electrical connectors 734A-C can be arranged such that the safety key 740 can be engaged with electrical connector portion 732 in a single orientation, i.e., connected with electrical connectors 734A and 734C.

Safety key 740 includes two electrical connectors 742A and 742B. Electrical connectors 742A and 742B are configured to mate with electrical connectors 734A and 734C of the user interface 730 in a single orientation. For example only, electrical connectors 742A and 742B may be coupled by a jumper 744 to electrically couple electrical connectors 734A and 734C when the safety key 740 is mated with electrical connector portion 732. Safety key 740 includes a keyed portion 746 that has a shape that corresponds and complements the shaped of keyed portion 736 of user interface 730. The keyed portions 736, 746 and electrical connectors 742A, 742B, 734A and 734C may be constructed and arranged symmetrically such that the safety key 740 can properly mate with electrical connector portion 734 in either of two orientations, i.e., 742A with 734A and 742B with 734C or 742A with 734C and 742B with 734A.

An exemplary battery 750 will be described with particular reference to FIGS. 61-64. Battery 750 includes at least one cell 770A-C arranged within a housing 760. For example only, three cells 770A-C can be connected in series and arranged within a housing 760. The housing 760 includes a first portion 762 mated with a second portion 764. The first battery connector 756 is arranged on the second portion 764 and the second battery connector 758 is arranged on the first portion 762.

The battery 750 further includes a first handle 766A and a second handle 766. The first and second handles 766A-B may be utilized by a user to insert or remove the battery 750 from the pocket 710. In a non-limiting example, the first and second handles 766A-B are monolithically formed with the first portion 762 of the housing 760. The first handle 766A is arranged on a first side 767 of the housing 760 and the second handle 766B is arranged on a second side 769 of the housing 760 that is opposite the first side.

With reference to FIGS. 60, 61 and 63, the battery 750 is inserted within pocket 710 as follows. A user positions the battery 750 within pocket 710. For example only, the user may grasp first and second handles 766A-B in order to lift and position the battery 750 within pocket 710. The battery 750 is properly positioned and fully inserted within pocket 710 such that the first battery connector 756 engages and mates with mower connector 716. In one embodiment, the first battery connector 756 engages and mates with mower connector 716 automatically as the battery 750 is fully inserted within pocket 710. As described above, various features of the battery 750 and/or pocket 710 assist in the proper positioning and insertion of the battery 750 (projections 752A-D, 714A-C, 717, recess(es) 754A-C, 712A-D, 757, etc.).

Once the battery 750 is fully inserted within pocket 710 and the first battery connector 756 is engaged and mated with mower connector 716, the user engages the latch 722 with the battery 750, for example, latch catch 755. The user then rotates the lever 724 to lock the latch 722 and fully secure the battery 750 within the pocket 710.

The battery 750 is removed from being fully secured within pocket 710 as follows. A user rotates lever 724 to unlock the latch 722 from engagement with the battery 750. In some embodiments, the latch 722 automatically disengages from the battery 750 upon being unlocked. Alternatively, the user manually disengages the latch 722 from battery 750. A user then grasps the battery (such as, first and second handles 766A-B) in order to remove the battery 750 from pocket 710. In various embodiments, the mower connector 716 automatically disengages from first battery connector 756 as the battery 750 is removed from pocket 710.

Battery—Folding Handle

With continued reference to FIG. 1 and additional reference to FIGS. 13-17, a battery 150 constructed according to additional features will be described. The battery 150 can generally include a battery housing 152 for retaining cells, such as cells 36A, 36B and 36C, shown in FIG. 4. In one example, the battery housing 152 can be formed of rigid plastic. The battery 150 can define a pair of ears 154 formed at an upper surface 156. The ears 154 can define bosses 160 formed therein. A pair of openings 162 can be formed through opposite sides 164 of the battery housing 152. While the battery 150 is shown generally cube-shaped, it can define other shapes such as the shape illustrated with the battery 12 (FIG. 2). The battery 150 can be configured to house cells for providing a desired voltage of direct current. In one example, the battery 150 can provide 36 volts DC like the battery described above.

Figure 15:
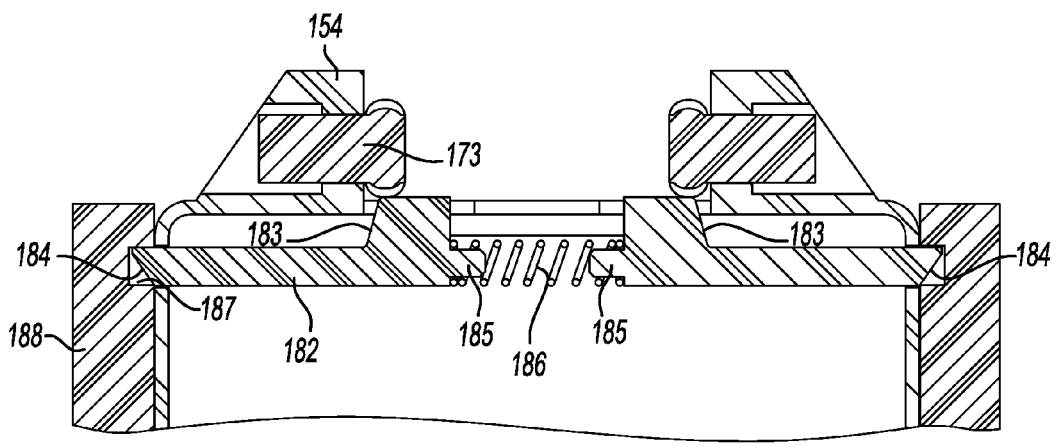
FIG. 15 is a sectional view taken along line 15-15 of FIG. 14 and shown with portions of the retention feature engaged to the structure on the mower in the locked position.
Figure 16:
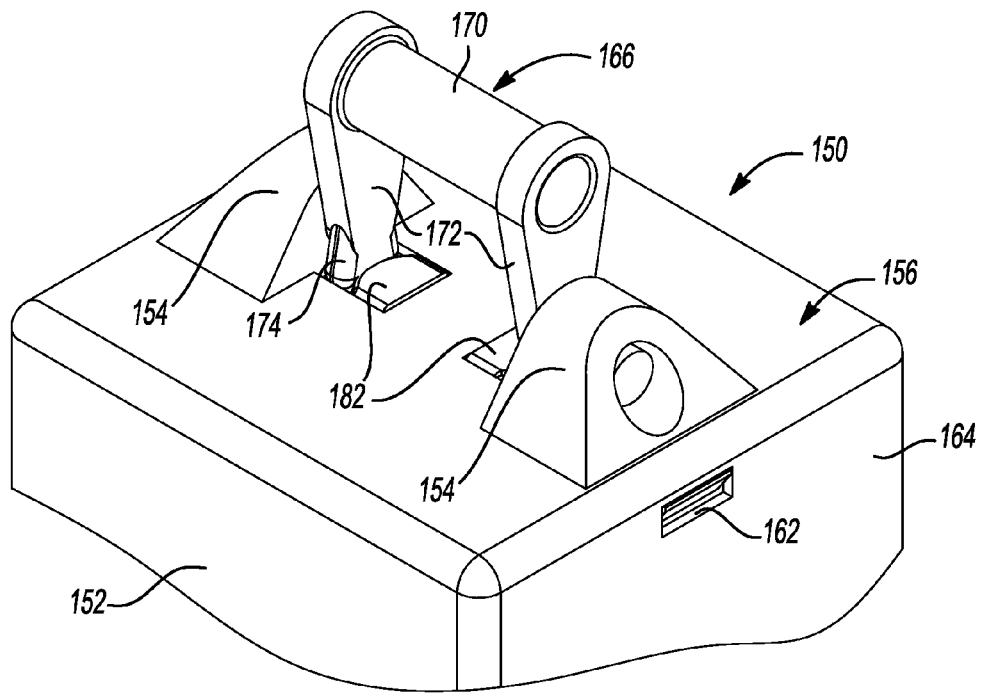
FIG. 16 is a front perspective view of the battery shown in FIG. 13 and shown with the handle in an upright position corresponding to the retention feature in an unlocked position.
Figure 17:
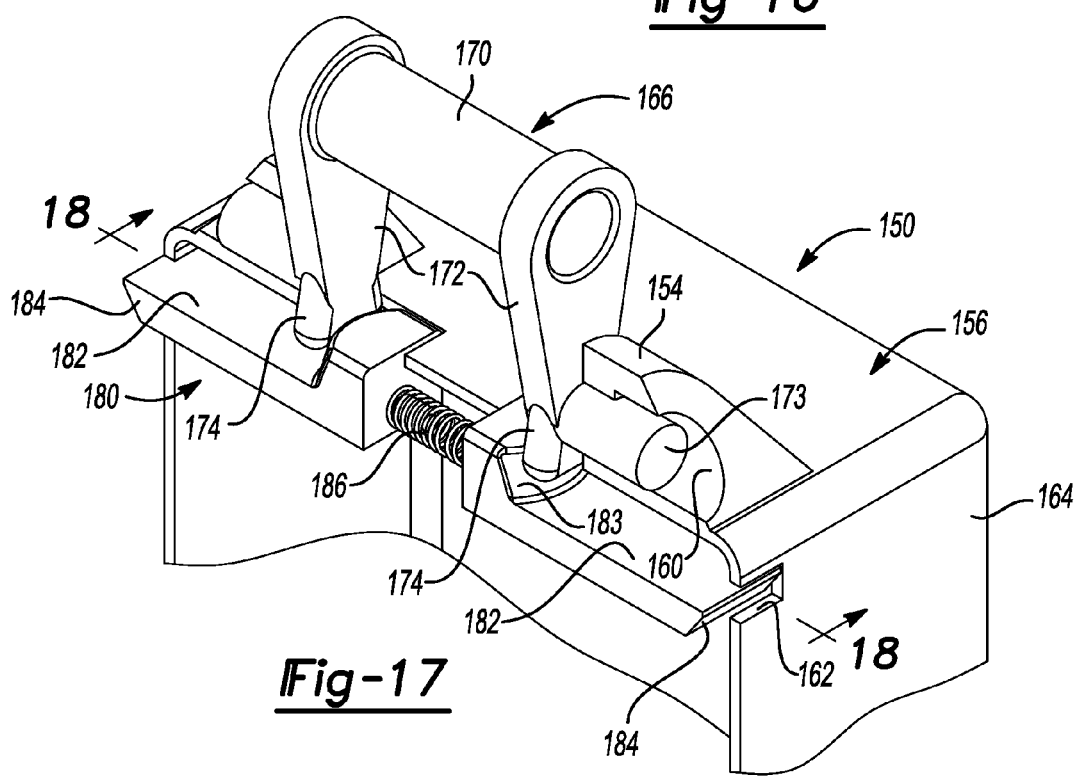
FIG. 17 is a cut away view of the battery of FIG. 16 showing the retention feature in the unlocked position.

The battery 150 can include a folding handle 166 defined at an upper end. The folding handle 166 can generally comprise a gripping bar 170, and a pair of arms 172 formed at opposite ends of the gripping bar 170. Fingers 173 can be formed at the ends of each arm 172. In one example, the fingers 173 can be generally parallel to the folding handle 166. The fingers 173 can be received by the bosses 160 in the ears 154 of the battery housing 152. The arms 172 of the folding handle 166 can define heels 174 (FIG. 17). As will be described in detail below, the folding handle 166 can be configured to rotate about a pivot axis 176 (FIG. 13) defined through the fingers 173 between a folded (locked) position (FIGS. 13-15) and an upright (unlocked) position (FIGS. 16 and 17).

Figure 18:
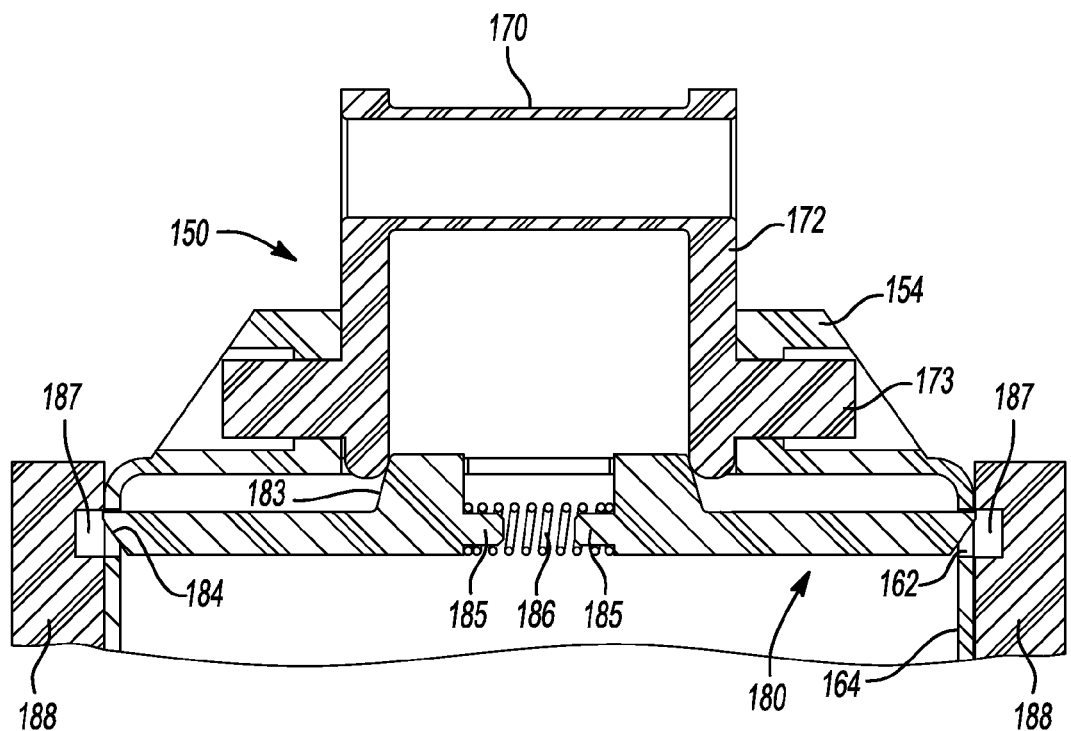
FIG. 18 is a sectional view taken along line 18-18 of FIG. 17 showing the handle in an upright position corresponding to the retention feature in the unlocked position.

With reference now to FIGS. 17 and 18, additional features of the battery 150 will be described. The folding handle 166 can be configured to communicate with a retention feature 180 having a pair of arms 182 extending generally parallel to the upper surface 156 of the battery housing 152. The arms 182 can define cams 183 on inner ends and locking teeth 184 on outer ends. Posts 185 can be formed at the inner ends of the arms 182 for cooperatively retaining a biasing member 186. The locking teeth 184 can be generally aligned for protruding through the respective openings 162 defined in the battery housing 152 in the locked position (FIGS. 13-15) and retracting away from the respective openings 162 in the unlocked position (FIGS. 16 and 17). As shown in FIG. 15, in the locked position, the locking teeth 184 can securely engage a cutaway or notch 187 formed in a battery receiving area 188 of the mower 10.

Movement of the folding handle 166 from a folded (locked) position to an upright (unlocked) position will now be described. At the outset, a user can grasp the gripping bar 170 of the folding handle 166 and rotate it from a position shown in FIG. 13 to a position shown in FIG. 16. As described, the folding handle 166 will rotate about the pivot axis 176 defined by the fingers 173. During such rotation, the heels 174 of the folding handle 166 can ride along the cams 183 defined on the arms 182. As the heels 174 ride along the cams 183, the arms 182 can be urged toward each other against the bias of the biasing member 186. Once the arms 182 have moved toward each other a sufficient amount, the locking teeth 184 retract through the openings 162 and to a position within the battery housing 152. At this point, the locking teeth 184 are not engaged with the notch 187 in the battery receiving area 188 of the mower 10 and the battery 150 can be removed. To return the battery 150 to a locked position, the process is reversed. Notably, the folding handle 166 is normally biased by the biasing member 186 to the folded or locked position. The handle configuration provides a simple, intuitive, one action requirement for a user to remove and install the battery 150. Other configurations are contemplated. In one example, a battery cover (not shown) can provide a means for actuating a locking mechanism.

Figure 19:
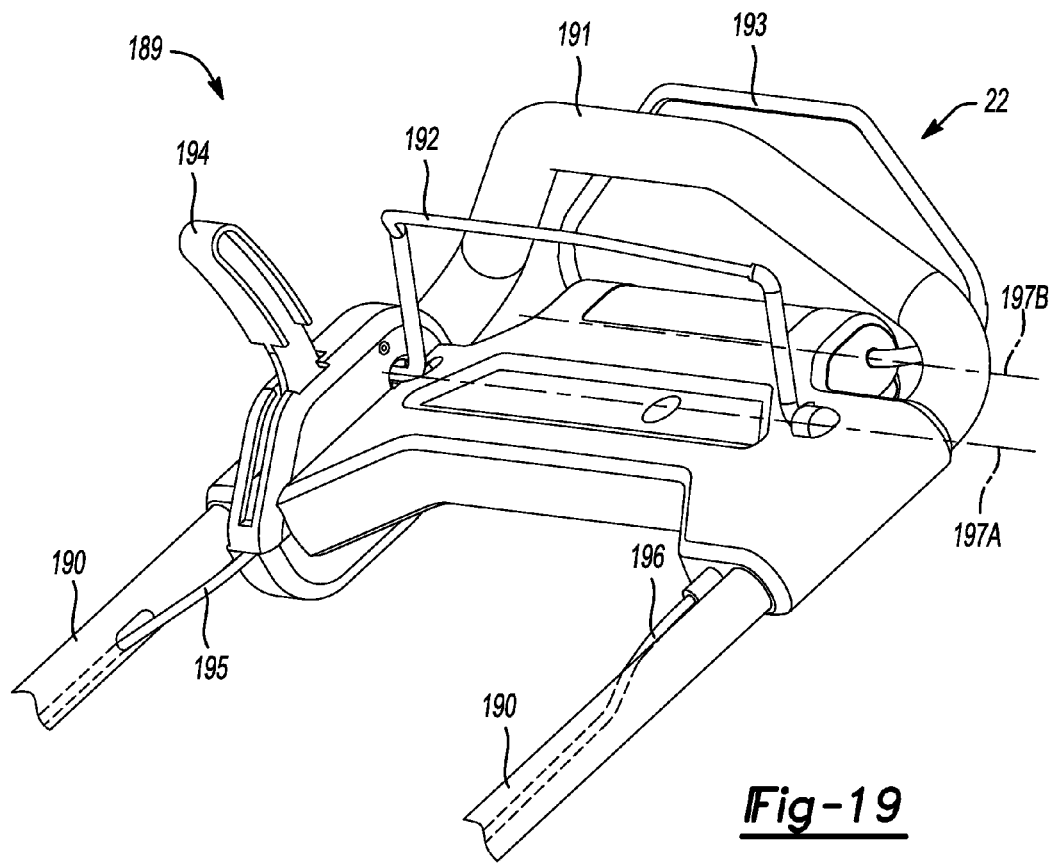
FIG. 19 is a perspective view of an exemplary handle assembly constructed in accordance to one example of the present teachings.

Turning now to FIG. 19, the user interface 22 will be described according to one example. The user interface 22 can include a handle assembly 189. The handle assembly 189 can include handle frames 190 that generally extend at an angle from the mower deck 70 to a handle grip 191. The handle assembly 189 can include a mower blade bail handle 192 and a self-drive bail handle 193. The mower blade bail handle 192 can cooperate with a mower blade start lever 194 and a mower blade control cable 195 to start the blades 16 as will be described The self-drive bail handle 193 can cooperate with a self-drive control cable 196 that communicates with the drive mechanism 18 as will be described. In one example, the mower blade bail handle 192 can be rotated toward the handle grip 191 about an axis 197A. The self-drive bail handle 193 can be rotated toward the handle grip 191 about an axis 197B. According to one example, to start the blades 16, a user can pull the mower blade bail handle 192 toward the handle grip 191 (rotate the mower blade bail handle 192 about the axis 197A) and hold the mower blade bail handle 192 generally against the handle grip 191, and then push forward (i.e., toward the mower deck 70) the mower blade start lever 194. This action can move the mower blade control cable 195. In one example, to start the drive mechanism 18, a user can urge the self-drive bail handle 193 toward the handle grip 191 (rotate the self-drive bail handle 193 about the axis 197B). As the self-drive bail handle 193 is rotated forward toward the handle grip 191, it moves the self-drive control cable 196 to actuate the drive mechanism 18 as will be described in greater detail herein. In one example, as the self-drive bail handle 193 is rotated forward, it progressively makes the drive mechanism 18 (and the lawn mower 10 as a whole) go faster.

Force Sensor Control-Handle

Figure 20:
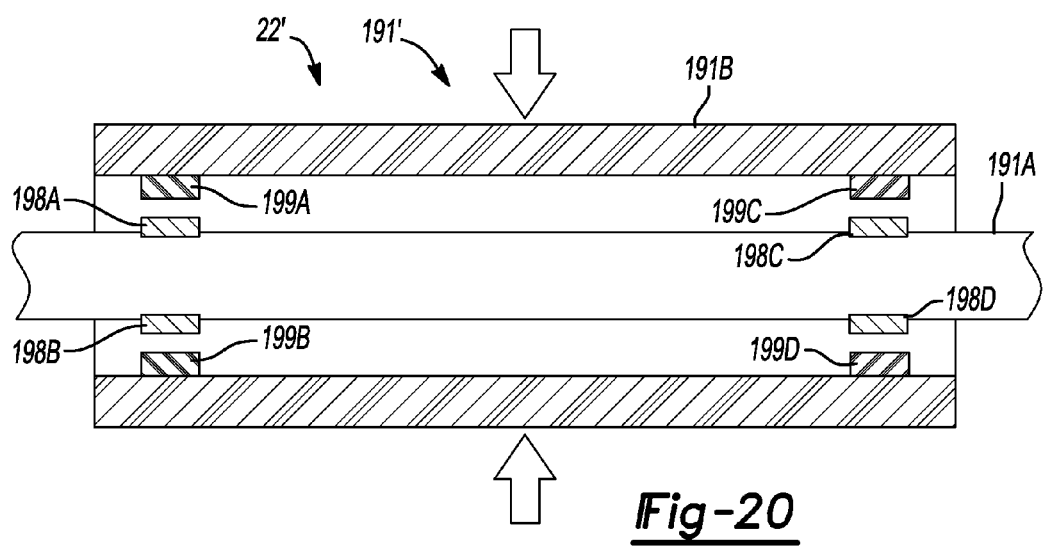
FIG. 20 is a cross-sectional view of an alternate handle grip according to other features of the present disclosure.
Figure 21:
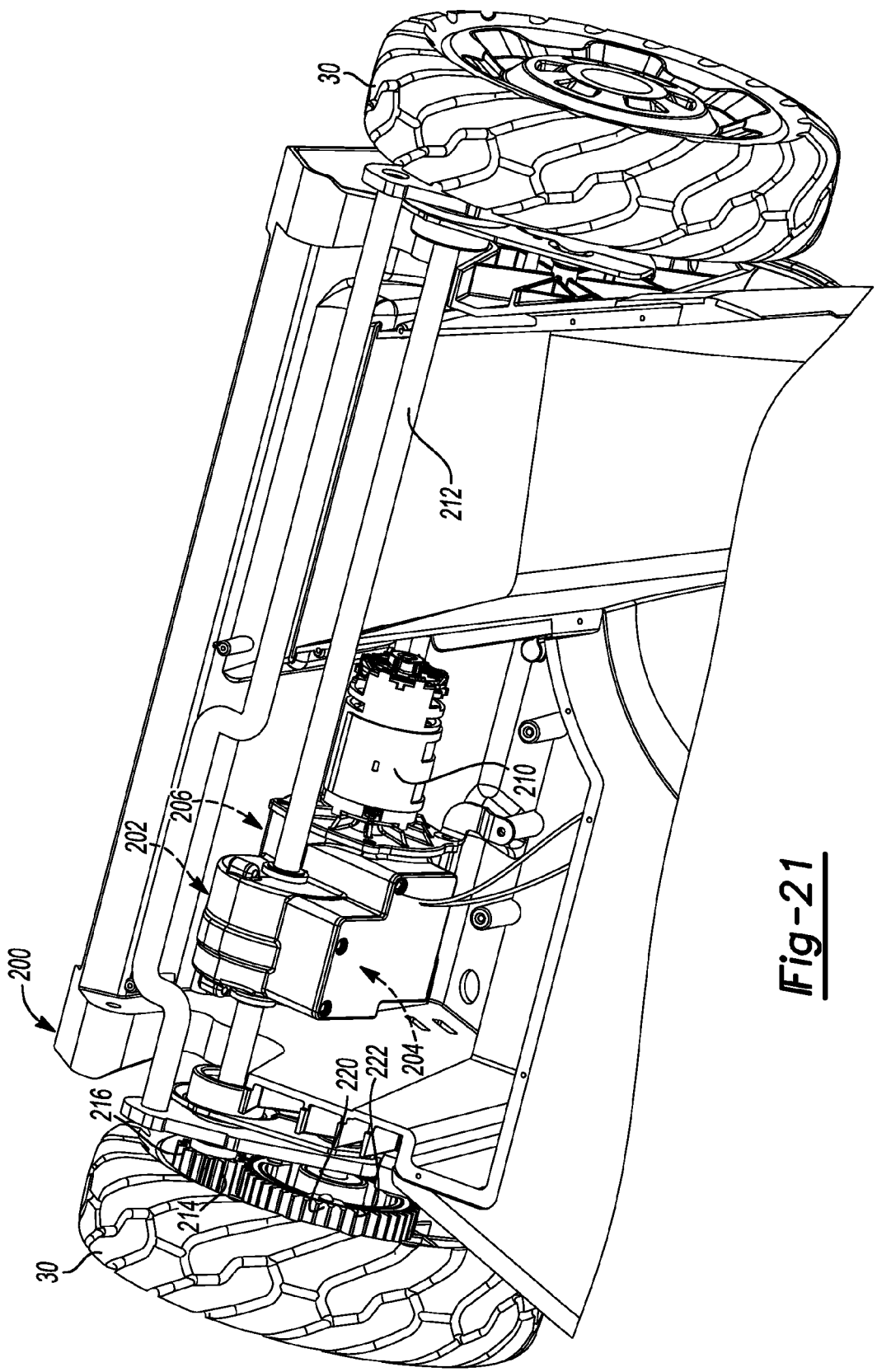
FIG. 21 is a perspective view of a self-drive transmission constructed in accordance to one example of the present teachings.

Turning now to FIG. 20, a user interface 22' will be described according to another example. The user interface 22' can include a handle grip 191'. The handle grip 191' can include a fixed handle bar portion 191A and a tubular handle bar portion 191B. According to one example, the fixed handle bar portion 191A is received within the tubular handle bar portion 191B. Force sensors 198A, 198B, 198C, and 198D can be arranged on the fixed handle bar portion 91A. The force sensors 198A-198D can include any force sensing device, such as force sensor resistors, piezoelectric sensors, strain gauges or any suitable force sensor. Compliant pads 199A, 199B, 199C, and 199D can be arranged generally adjacent to the force sensors 198A-198D and be mounted on an inner diameter of the tubular handle bar portion. During operation, a user can move the tubular handle bar portion 191B relative to the fixed handle bar portion 191A. Such movement can be sensed by the force sensors 198A-198D to determine a total pushing force or a total pulling force. In one example, the sum of the total force can be communicated to a controller, such as the main controller 24 (FIG. 1). The main controller 24 then can communicate a signal to the drive mechanism 18 (or more specifically the self-drive motor 210, as will be described in relation to FIG. 21 herein) corresponding to a desired output. In one example, the desired output can be a drive torque or an output speed that is proportional to the summed force sensed by the collective force sensors 198A-198D.

Self-Drive Transmission

Figure 22:
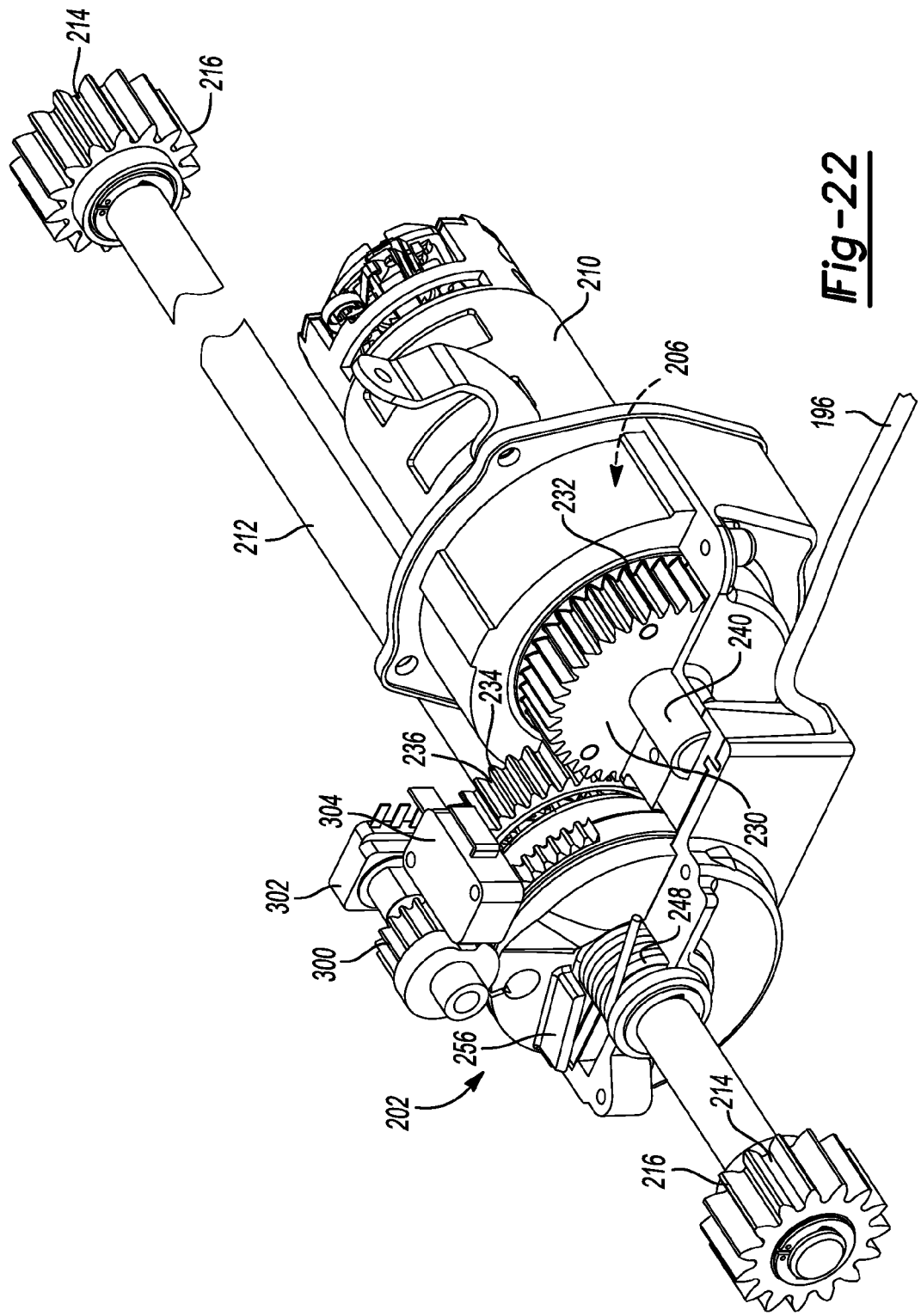
FIG. 22 is a perspective detailed view of a variable speed circuit assembly and clutch assembly of the self-drive transmission illustrated in FIG. 21.
Figure 23:
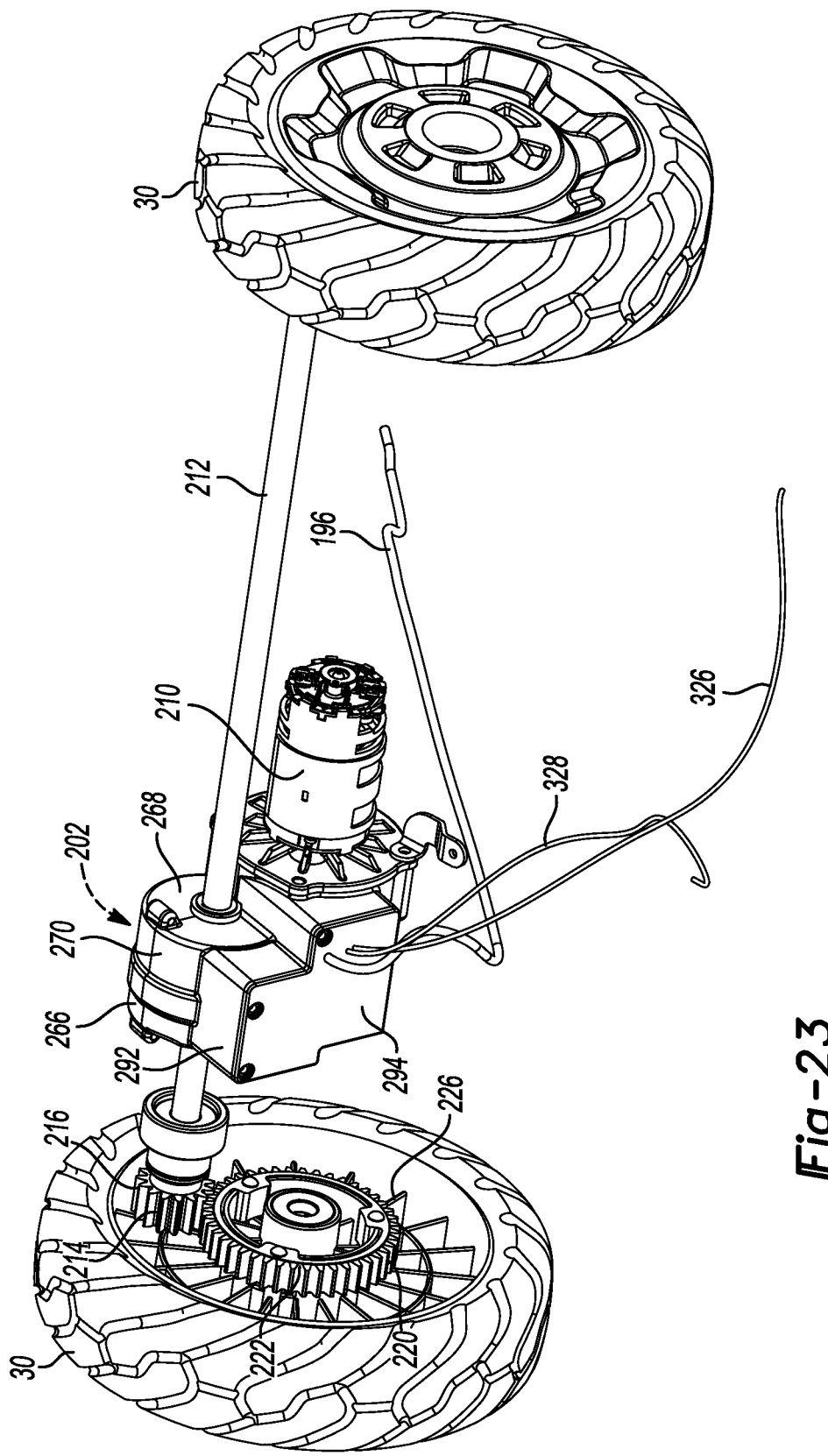
FIG. 23 is a detailed perspective view of the self-drive transmission and shown with a drive axle meshed for rotation with wheel gears disposed on a pair of drive wheels.
Figure 24:
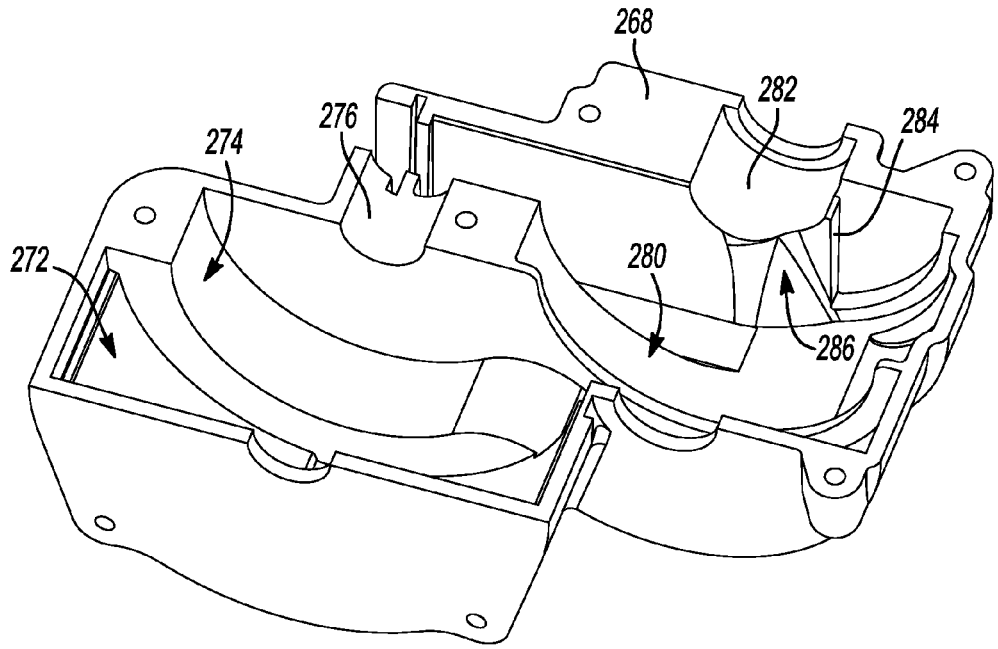
FIG. 24 is a perspective view of a first cover of the self-drive transmission.
Figure 25:
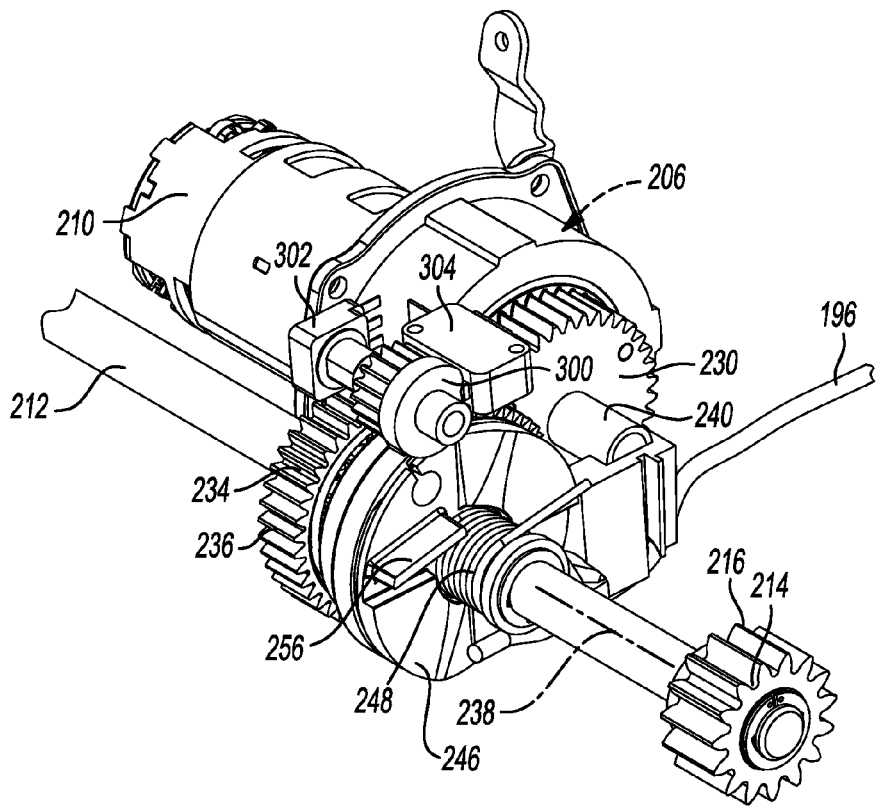
FIG. 25 is a detailed perspective view of the variable speed circuit assembly and clutch assembly shown in FIG. 22.

With continued reference to FIG. 1 and additional reference to FIGS. 21-32, the drive mechanism 18 will be described in greater detail. The drive mechanism 18 according to the present disclosure includes a self-drive transmission 200. In general, the self-drive transmission 200 includes a clutch assembly 202, a variable speed circuit assembly 204 and a planetary gear assembly 206. The self-drive transmission 200 translates a rotational output 208 of a self-drive motor 210 into a rotational output of a drive axle 212. The drive axle 212 can define pinion gears 214 on opposite ends. The pinion gears 214 can define pinion teeth 216. The pinion teeth 216 can be rotatably meshed with wheel gear teeth 220 defined around wheel gears 222. The wheel gears 222 as best shown in FIG. 23 can be disposed around an inboard hub 226 of the respective drive wheels 30. According to some prior art configurations, a belt tensioning drive system can be provided, whereby the tension on a set of variable stepped sheves control the speed of a drive axle from a continuous speed motor. Such a configuration can be inefficient for a small separate drive motor because the motor must run constantly at maximum speed, thereby constantly drawing maximum power. As will be described herein, the self-drive transmission 200 according to the present teachings, by way of the variable speed circuit assembly 204 can provide only enough voltage to allow the self-drive transmission 200 to achieve the desired speed. In this way, power losses can be minimized.

Figure 26:
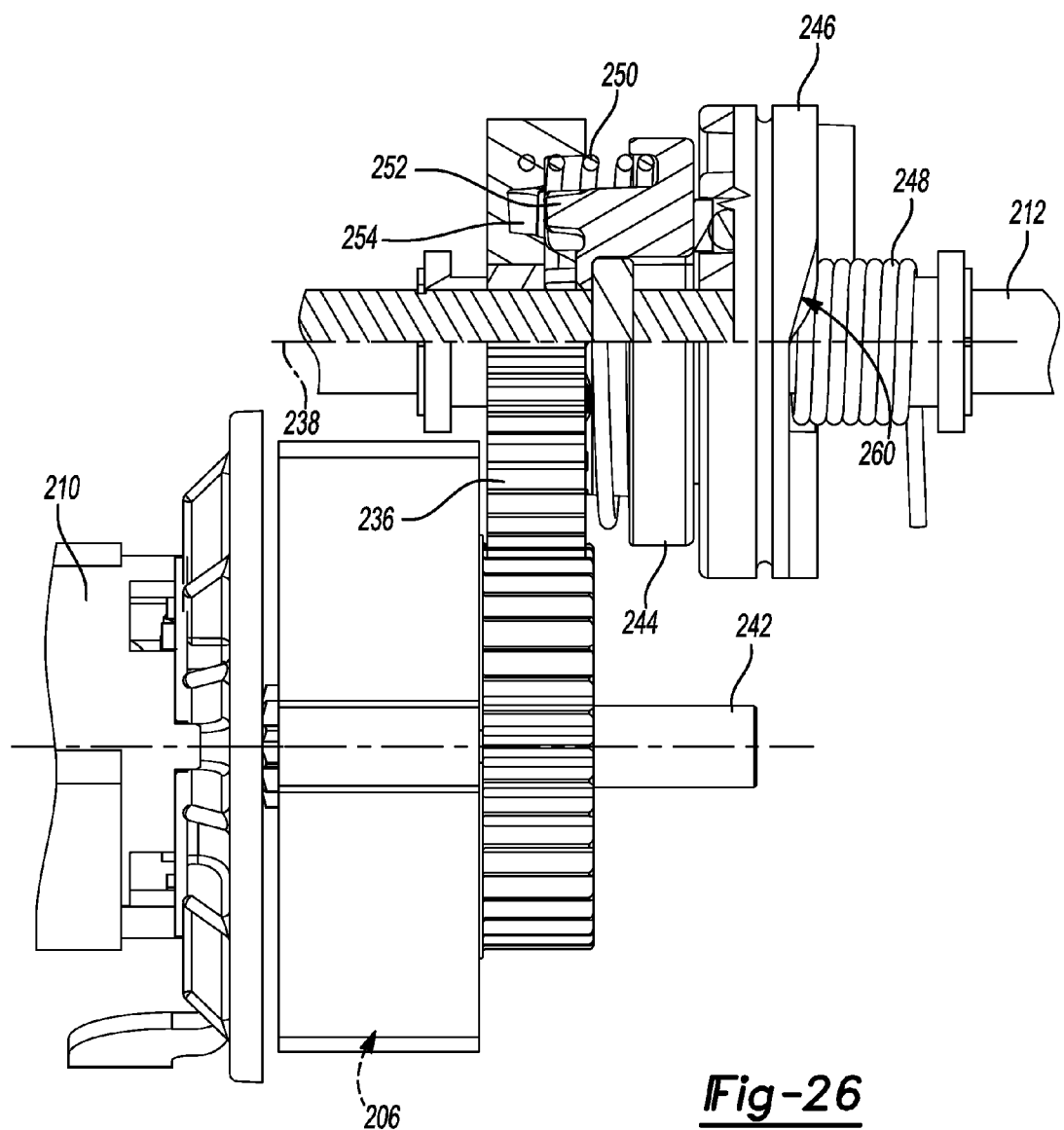
FIG. 26 is a partial sectional view of the clutch assembly and shown in an open or unlocked position.

With specific attention now to FIGS. 21-26, the clutch assembly 202 will be described in greater detail. The clutch assembly 202 can generally include a carrier transfer gear 230 having carrier teeth 232 that are rotatably meshed with driven teeth 234 formed around a driven transfer gear/clutch 236. The carrier transfer gear 230 can be rotatably disposed for concurrent rotation with a carrier transfer gear shaft 240. According to one example, the carrier transfer gear shaft 240 can be co-linear to a motor output axle 242 (see FIG. 26). With reference to FIG. 26, the clutch assembly 202 can further comprise a driven clutch 244, a clutch cam 246, a first biasing member 248, and a second biasing member 250.

According to the example shown in FIG. 26, the driven transfer gear/clutch 236 can be mounted for rotation about a drive axle axis 238 defined by the drive axle 212. As shown in FIG. 26, the driven clutch 244 can define a clutch tooth 252 that is selectively engageable with a notch 254 formed in the driven transfer gear/clutch 236. The clutch cam 246 can define a stop 256 (FIG. 25) and a first ramp 260 (FIG. 26). The self-drive control cable 196 (FIGS. 22, 23 and 25) can be fixedly attached to the clutch cam 246. As will be described in detail, translation of the self-drive control cable 196 (such as by way of actuation of the self-drive bail handle 193) can cause rotation of the clutch cam 246 about the drive axle axis 238. More specifically with reference to FIG. 25, translation of the self-drive control cable 196 in a generally rightward direction by a user, caused by urging the self-drive bail handle 193 toward the handle grip 191 (FIG. 19), can cause counter-clockwise rotation of the clutch cam 246 about the drive axle axis 238. A release of such a user input force can cause the biasing members 248 and 250 to urge the clutch cam 246 in a clockwise direction.

As shown in FIG. 23, the clutch assembly 202 can be generally contained in a clam shell housing 266 having a first cover 268 and a second cover 270. As shown in greater detail in FIG. 24, the first cover 268 can include a planetary gear assembly pocket 272, a carrier transfer gear pocket 274, a carrier transfer gear boss 276, a driven transfer gear pocket 280, and a drive axle boss 282. The first cover 268 can also define a stop surface 284 and a second ramp 286. As shown in FIG. 22, the stop 256 formed on the clutch cam 246 can engage the stop surface 284 defined on the first cover 268 to limit over-rotation of the clutch cam 246.

Operation of the clutch assembly 202 according to one example of the present teachings will now be described. In general, the clutch assembly 202 can be moved between a disengaged state and an engaged state. In the disengaged state, the driven clutch 244 is not fixed for rotation with the driven transfer gear/clutch 236. Therefore, rotatable motion of the driven transfer gear/clutch 236 is not communicated through the driven clutch 244 to the drive axle 212. In the engaged state, the driven transfer gear/clutch 236 is fixed for concurrent rotation with the driven clutch 244. The driven clutch 244 can ultimately be fixed for rotation with the drive axle 212. As can be appreciated, rotation on the driven clutch 244 can cause rotation of the drive axle 212 and rotation of the wheels 30.

The clutch assembly 202 is normally biased toward the disengaged state by way of the first and second biasing members 248 and 250 (FIG. 26). User actuation of an input device (such as the self-drive bail handle 193, etc.) can cause rotation of the clutch cam 246 in the counter-clockwise direction (as viewed in FIG. 25). During the counter-clockwise rotation of the clutch cam 246, the first ramp 260 defined on the clutch cam 246 slidably engages the second ramp 286 (FIG. 24) formed on the first cover 268 to turn a rotatable motion of the clutch cam 246 into a linear translation of the clutch cam 246 along the drive axle axis 238. Explaining further, with reference to FIG. 26, rotation of the clutch cam 246 in the counter-clockwise direction can cause the clutch cam 246 to translate in a direction leftward. Upon translation of the clutch cam 246 leftward, the clutch tooth 252 defined on the driven clutch 244 can nest within the notch 254 formed in the driven transfer gear/clutch 236, thereby coupling the driven clutch 244 for concurrent rotation with the driven transfer gear/clutch 236. When tension is released on the self-drive control cable 196, the first and second biasing members 248 and 250 can return the clutch cam 246 to the disengaged state (FIG. 26).

Figure 27:
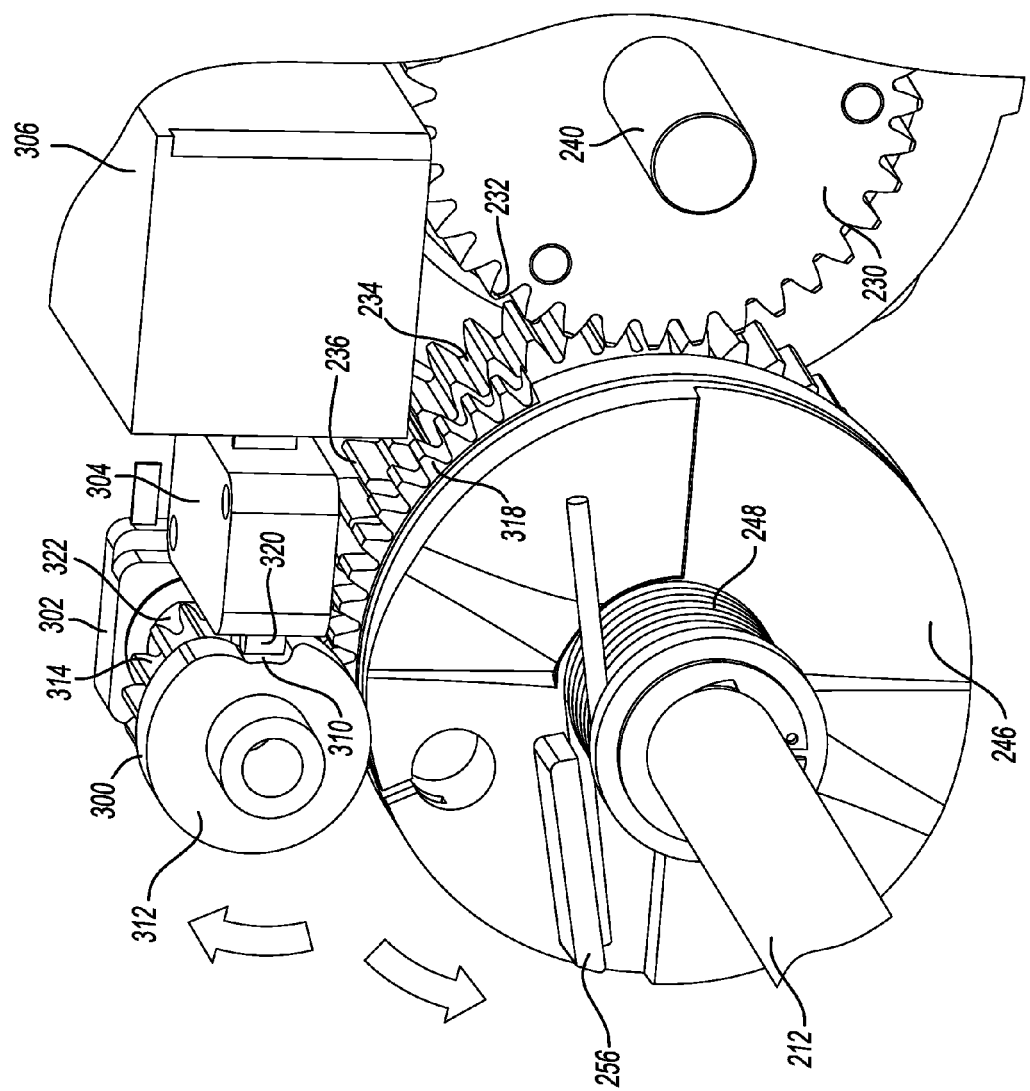
FIG. 27 is a detailed perspective view of the variable speed circuit assembly.
Figure 28:
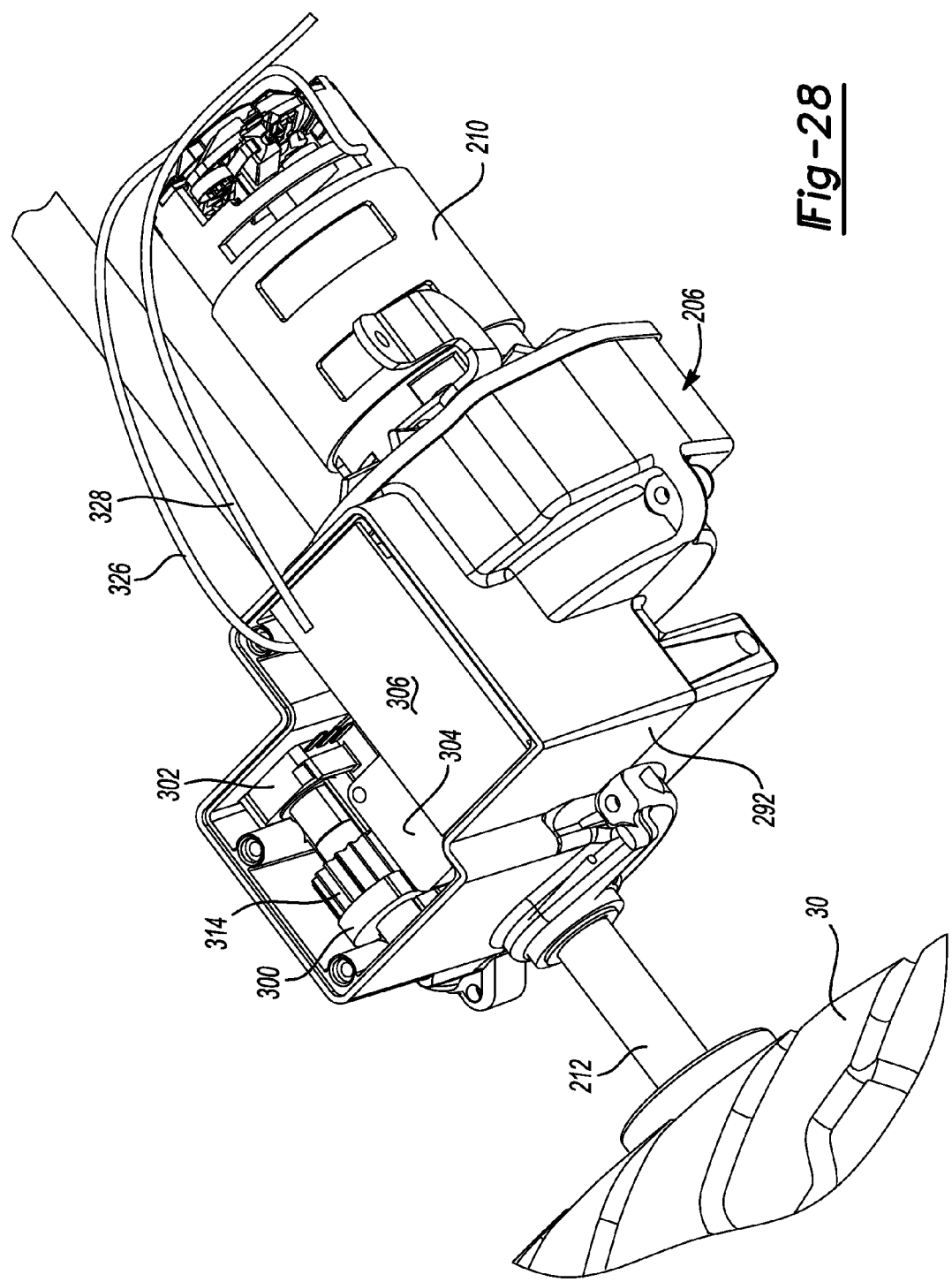
FIG. 28 is a perspective view of the self-drive transmission shown with a plate removed from an enclosure associated with the clutch assembly and variable speed circuit assembly.

With reference now to FIGS. 21, 22, 27, and 28, the variable speed circuit assembly 204 will be described in greater detail. The variable speed circuit assembly 204 can be generally contained within an enclosure 292 having a plate 294. In one example, the enclosure 292 can be integrally formed with the second cover 270 of the clutch assembly 202. Other configurations are contemplated. The variable speed circuit assembly 204 can generally define a variable speed cam 300, a potentiometer 302, a switch 304, and a variable speed circuit 306 (FIG. 27). The variable speed cam 300 of the variable speed circuit assembly 204 can generally define a recess 310 formed on an outer hub 312 and a plurality of gear teeth 314 arranged therearound. The cam gear teeth 314 can be rotatably meshed with clutch cam teeth 318 defined around the clutch cam 246. Rotation of the clutch cam 246 by way of the clutch cam teeth 318 and cam gear teeth 314 interaction can cause a button 320 extending from the switch 304 to be actuated. Explained in more detail, a camming surface formed on the hub 312 at a transition into the recess 310 can cause a camming action against the button 320 of the switch 304. When the switch 304 is closed (i.e., depression of the button 320), a shaft 322 of the potentiometer 302 is rotated. According to the present disclosure, no electricity is passed to the potentiometer 302 until the switch 304 is closed, thereby drawing no electricity from the battery 12. This configuration adds to the overall run time of the mower 10 by conserving electrical energy as much as possible. The rotation of the potentiometer 302 passes an increasing signal to the variable speed circuit 306. The greater the signal strength in, the greater the voltage out of the variable speed circuit 306 is communicated to the self-drive motor 210. A positive and negative wire 326 and 328 extend from the variable speed circuit 306 to the battery 12 and/or the main controller 24 (FIG. 1). In sum, according to one example, as the clutch cam 246 rotates, it first urges the driven clutch 244 and the transfer gear/clutch 236 into engagement. The switch 304 is then activated. The potentiometer 302 is then rotated to increase the speed of the self-drive motor 210. This allows an operator to activate the self-drive transmission 200 and vary the travel speed by urging the self-drive bail handle 193 forward.

Figure 29:
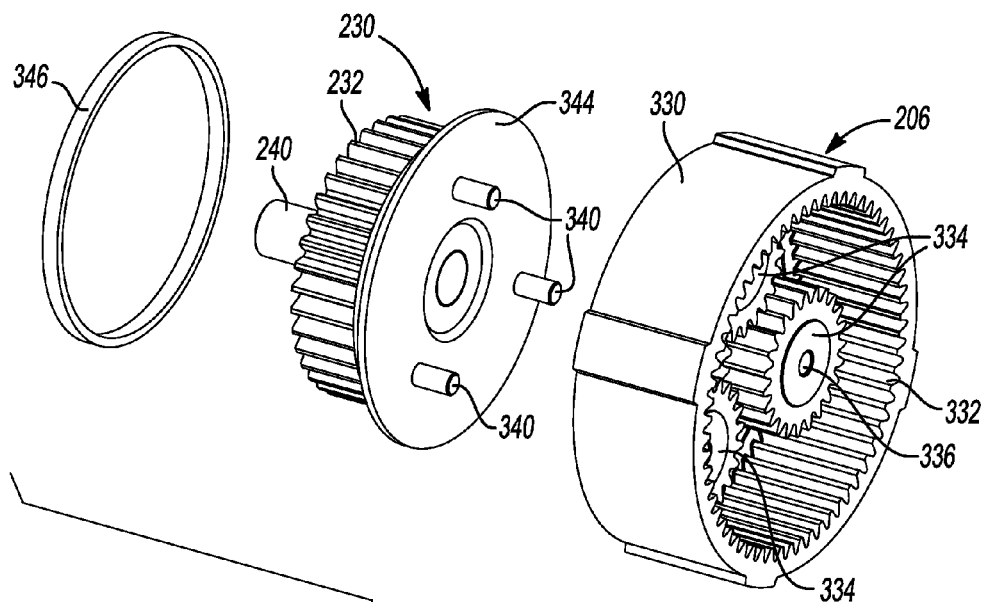
FIG. 29 is a partial exploded view of a planetary gear assembly housing and a carrier transfer gear according to one example of the present teachings.
Figure 30:
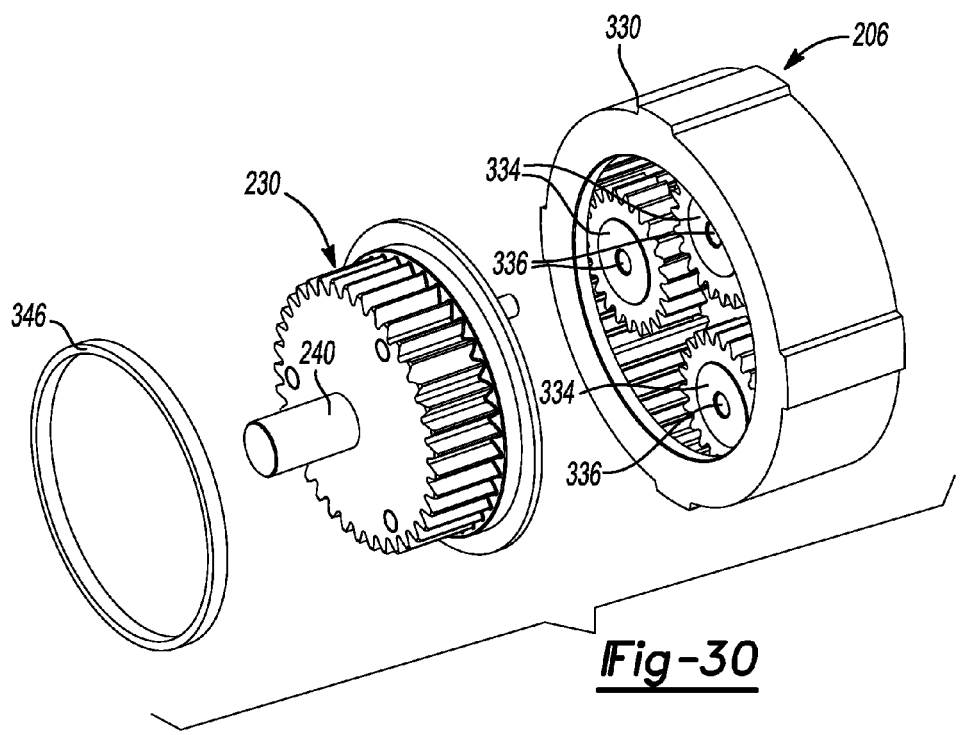
FIG. 30 is another exploded view of the planetary gear assembly housing and carrier transfer gear shown in FIG. 29.
Figure 31:
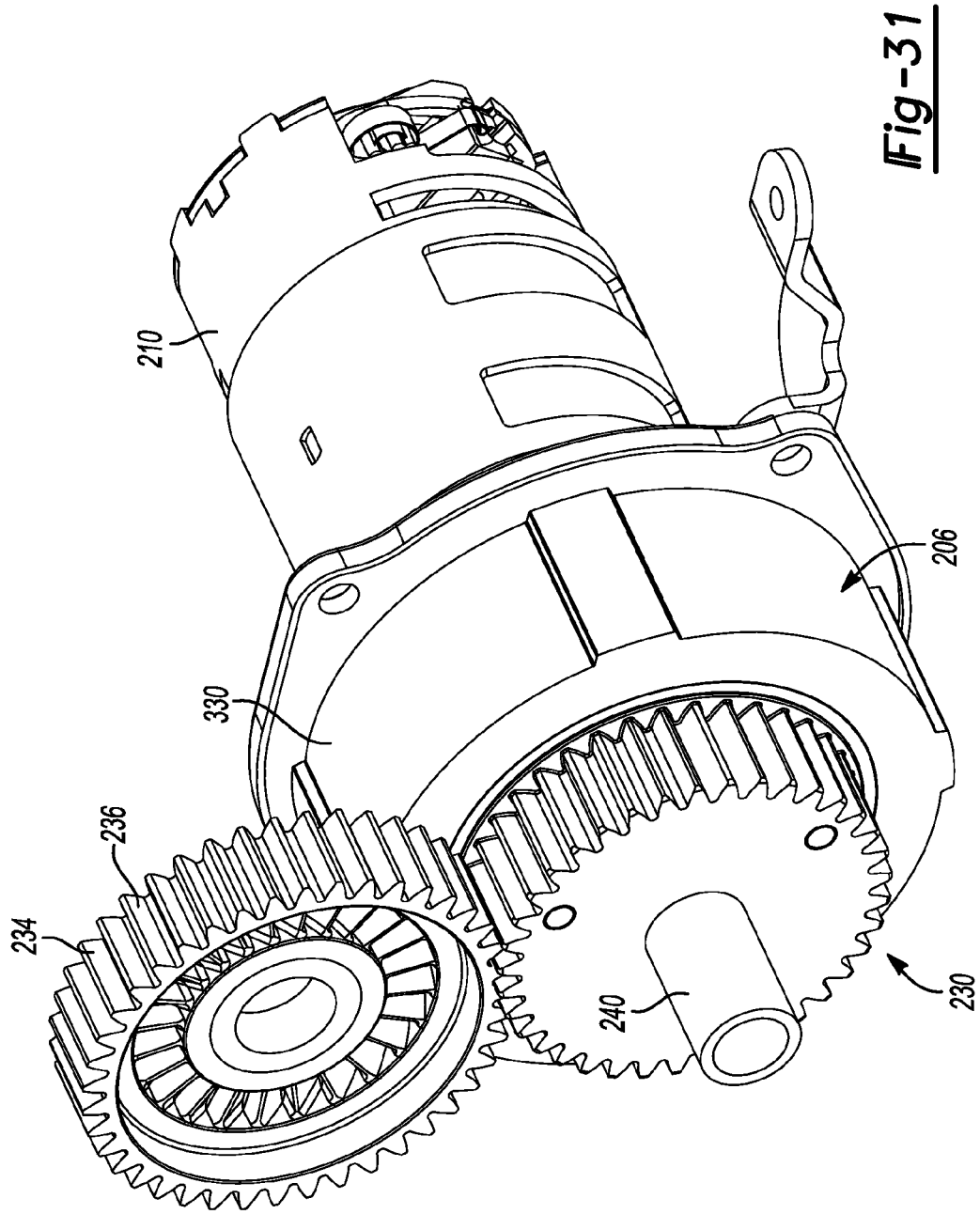
FIG. 31 is a perspective view of the motor and planetary gear assembly shown with the carrier transfer gear meshed for engagement with a driven transfer gear clutch.

With specific reference now to FIGS. 29-31, the planetary gear assembly 206 according to one example of the present teachings will be described in greater detail. The planetary gear assembly 206 can include a planetary gear assembly housing 330 that defines planetary teeth 332 formed around an inner diameter. A plurality of planetary gears 334 can be meshed for rotation around the planetary teeth 332. Each of the planetary gears 334 can define a central bore 336 that receives a respective pin 340 formed on the carrier transfer gear 230. The pins 340 can extend from a carrier transfer gear plate 344 formed on the carrier transfer gear 230. A ring 346 can rest against the carrier transfer gear plate 344. According to one advantage of the present teachings, the carrier transfer gear 230, carrier transfer gear shaft 240, carrier transfer gear plate 344, and pins 340 can be integrally formed as one unit. According to one example, these features of the carrier transfer gear 230 can be die-cast as a single part. The carrier transfer gear plate 344 therefore can act as a journal face that is in contact with the planetary gear assembly housing 330 in an assembled position. As can be appreciated, the configuration of the carrier transfer gear 230 can reduce parts count in managing inventory over a carrier transfer gear that is formed by several separate pieces. Furthermore, because the carrier transfer gear shaft 240 is integrally formed with the carrier transfer gear 230, there can be an elimination of tolerance concerns between an otherwise separately formed output shaft fitting into a hole provided on a transfer gear. Furthermore, sound quality can be improved with the elimination of potential gear-train looseness caused by separate interfitting components.

Figure 32:
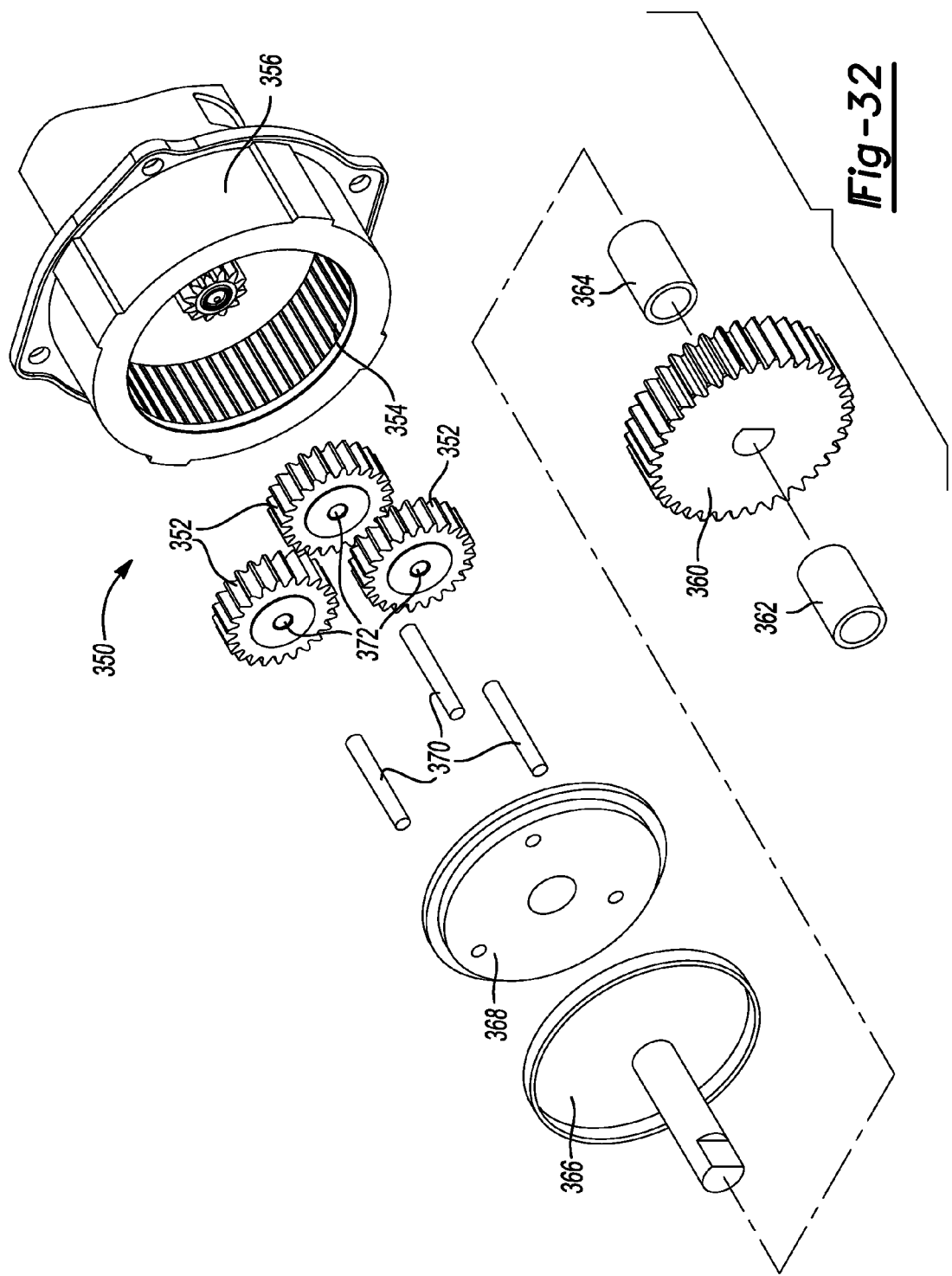
FIG. 32 is an exploded view of an exemplary planetary gear assembly and carrier transfer gear according to other features of the instant disclosure.

FIG. 32 illustrates a planetary gear box 350 according to other features. The planetary gear box 350 can define a plurality of planetary gears 352 that are rotatably engaged with teeth 354 formed around an inner diameter of a planetary gear box housing 356. In the example shown in FIG. 32, a carrier transfer gear 360 is shown formed of separately defined components. Specifically, the carrier transfer gear 360 is part of an assembly that includes first and second bushings 362 and 364, first and second drive hubs 366 and 368, and a plurality of axles 370 that are correspondingly received within the central hubs 372 of the planetary gears 352.

Force Feedback Speed Control

According to one implementation of the present teachings, the cutting mechanism 14 can define one or more cutting motors (such as cutting motor(s) 86 and 88, FIG. 3) for rotating a corresponding one or more blades. In some instances, it may be necessary for the mower 10 to cut heavy and/or long grass. In some examples, as a result of cutting such heavy and/or long grass, the cutting motor(s) can be slowed down by the increased effort and drag. As can be appreciated, if the motor (such as the self-drive motor 210) associated with the drive mechanism 18 continues operating at the same speed without accounting for the heavy grass being cut, a decrease in cut quality may result. In conventional gas-driven mowers, typically there exists a single motor that provides a rotational output to the blade and a rotational output to a self propulsion system. As a result, cutting through heavy grass can slow down the single motor, thereby slowing down the speed of the self propulsion system. The mower 10 according to the present teachings provides a force feedback controller 20 according to various examples that can sense or measure a load on the cutting motor(s) and if necessary, slow down the self-drive speed (i.e., such as the self-drive motor 210) as a result to optimize the grass cutting quality of the mower 10.

Figure 33:
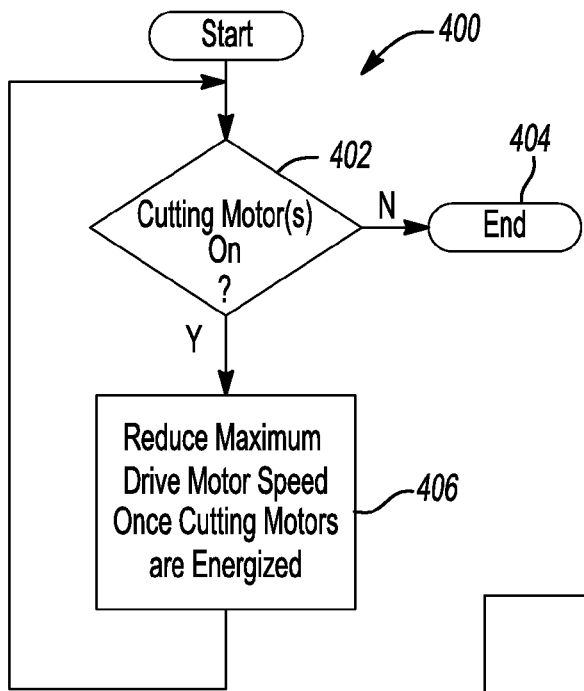
FIG. 33 is a flow diagram of a forced feedback speed control according to one example of the present disclosure.

With reference now to FIG. 33, a flow diagram 400 illustrating exemplary steps according to a first example is shown. In step 402, control determines if the cutting motor(s) 86, 88 are on. If the cutting motor(s) 86, 88 are not on, control ends in step 404. If the cutting motor(s) 86, 88 are on, control reduces a maximum speed of the self-drive motor 210 once the cutting motor(s) 86, 88 are energized in step 406. Control then loops to step 402. In the method according to the first example, the maximum self-drive speed is lowered to a predetermined "optimum" maximum cutting speed once the cutting motor(s) 86, 88 are energized. When a cutting motor circuit is energized, it can provide a signal to a self-drive variable speed control to simply lower a maximum range of voltage to the drive self-drive motor 210. In one example, such a cutting motor circuit can include a pulse width modulation (PWM) circuit.

Figure 34:
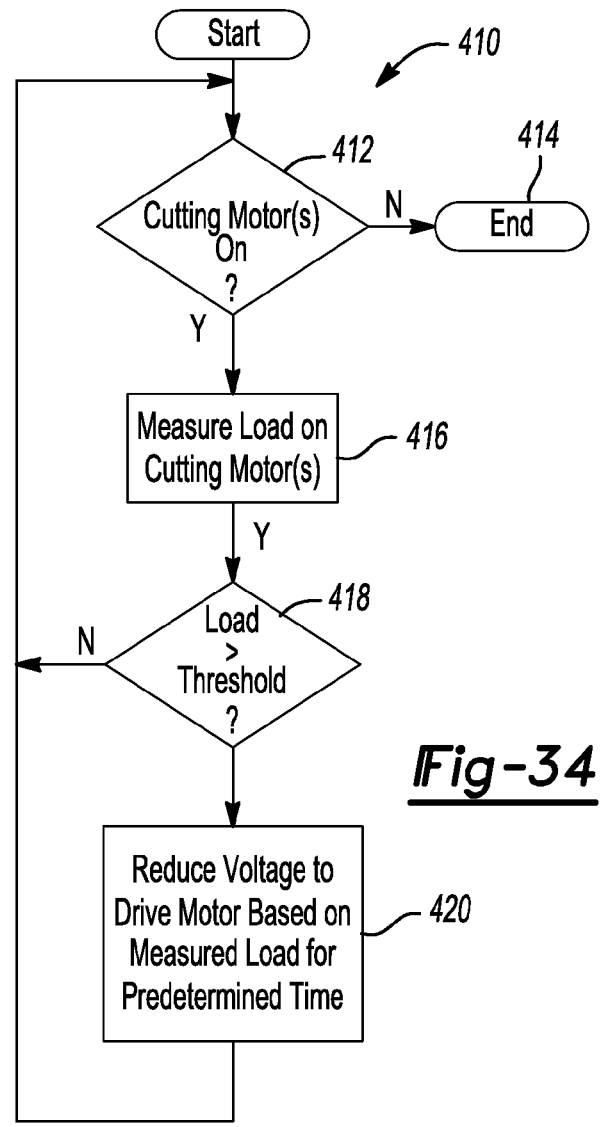
FIG. 34 is a flow diagram of a forced feedback speed control according to a second example of the present disclosure.

Turning now to FIG. 34, a method according to a second example of the present teachings is shown at reference 410. In step 412, control determines if the cutting motor(s) 86, 88 are on. If the cutting motor(s) 86, 88 are not on, control ends in step 414. If the cutting motor(s) 86, 88 are on, control measures a load on the cutting motor(s) 86, 88 in step 416. In step 418, control determines if the measured load is greater than a threshold. If the load is not greater than a threshold, control loops to step 412. If the load is greater than a threshold, control reduces a voltage to the self-drive motor 210 based on the measured load for a predetermined time in step 420. Control then loops to step 412. In one example, a hysteresis algorithm can be provided to delay the reapplication of the full voltage to prevent the mower 10 oscillating between a slow and a fast condition. In one example, the load can be measured by detecting a load current through a shunt associated with the cutting motor(s) 86, 88. The voltage on this shunt (known resistance) could then be compared to a threshold voltage through an analog or digital component. This component can then have the ability to change a resistor divider value in the motor drive/speed control electronics by a high or a low signal. For example, if the cutting motor(s) 86, 88 pulled a maximum measured amplitude value at or above a threshold, then the self-drive motor 210 would slow down to a predetermined speed. If, however, the cutting motor(s) 86, 88 pulled less than a given amplitude, then the drive self-drive motor 210 would speed up to a specific value.

Figure 35:
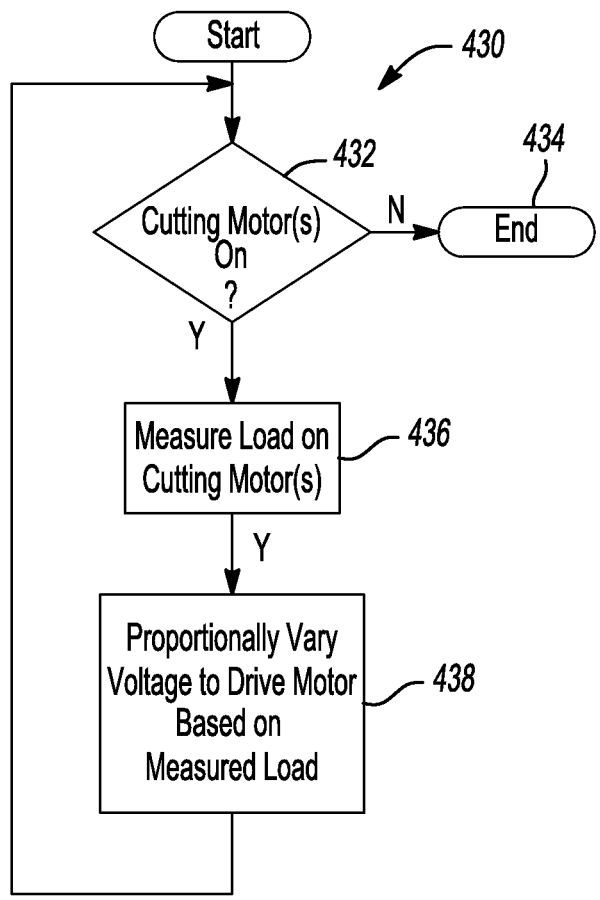
FIG. 35 is a flow diagram of a forced feedback speed control according to a third example of the present disclosure.
Figure 36:
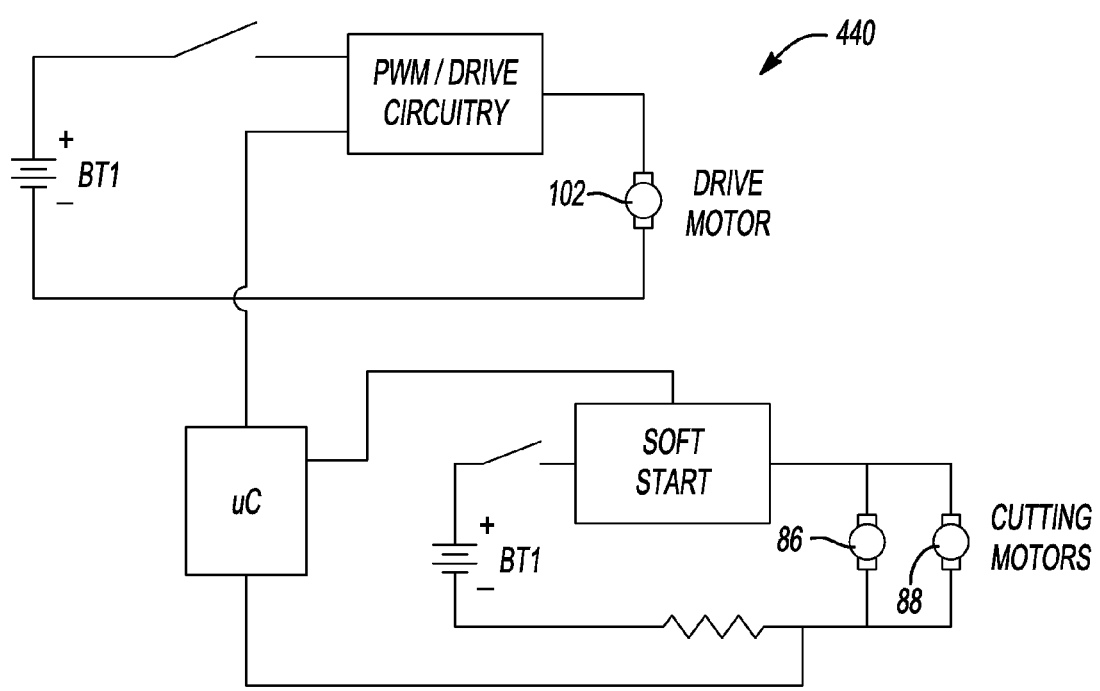
FIG. 36 is an exemplary circuit diagram associated with the flow diagram according to the third example in FIG. 35.

Turning now to FIG. 35, a method according to a third example of the present teachings is shown at reference 430 and will be described. In step 432, control determines if the cutting motor(s) 86, 88 are on. If the cutting motor(s) 86, 88 are not on, control ends in step 434. If the cutting motor(s) 86, 88 are on, control measures a load on the cutting motor(s) 86, 88 in step 436. In step 438, control proportionally varies the voltage to the self-drive motor 210 based on the measured load. Control then loops to step 432. According to one implementation of the third example, for every amp of current withdrawn by the cutting motor(s) 86, 88, the force feedback controller 20 would be able to pulse width modulate the self-drive motor 210 by a varying duty cycle. As a result, the self-drive motor 210 can be slowed down proportionately with increased current draw with the cutting motor(s) 86, 88. Likewise, the speed of the self-drive motor 210 can be increased proportionately with decreased current withdrawn by the cutting motor(s) 86, 88. With reference to FIG. 36, an exemplary circuit 440 for the third method is shown.

Mechanically Timed Switching

Figure 37:
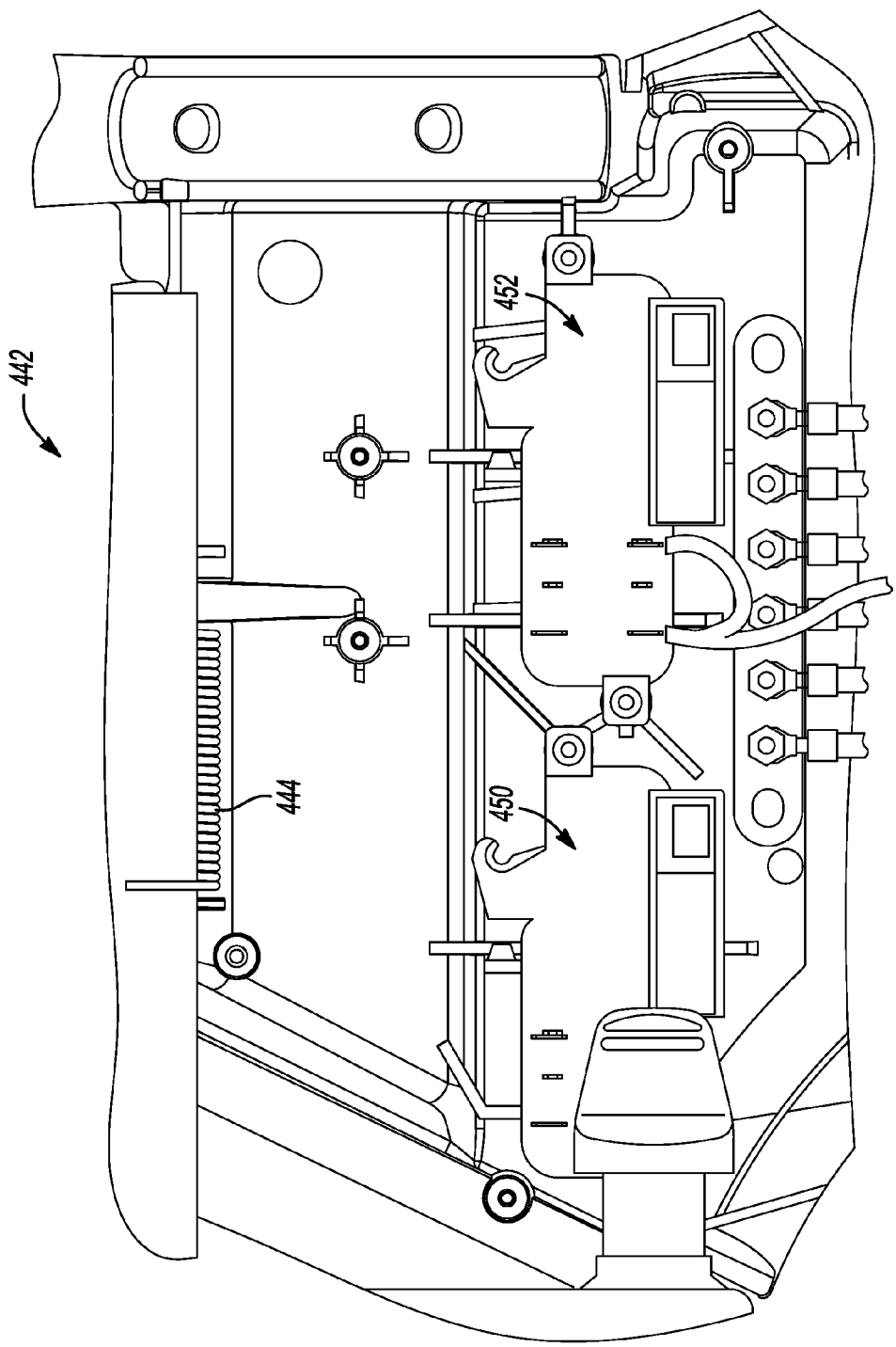
FIG. 37 is a plan view of a motor start delay assembly according to one example of the present teachings.
Figure 38:
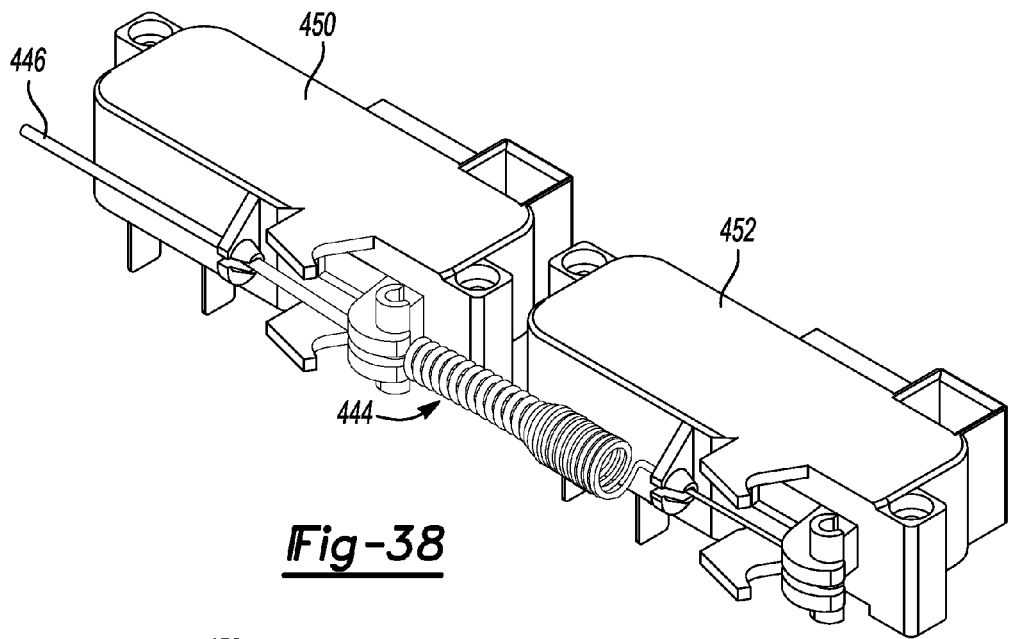
FIG. 38 is a perspective view of a first and second switch of the motor start delay assembly of FIG. 37 and shown in an initial position.
Figure 39:
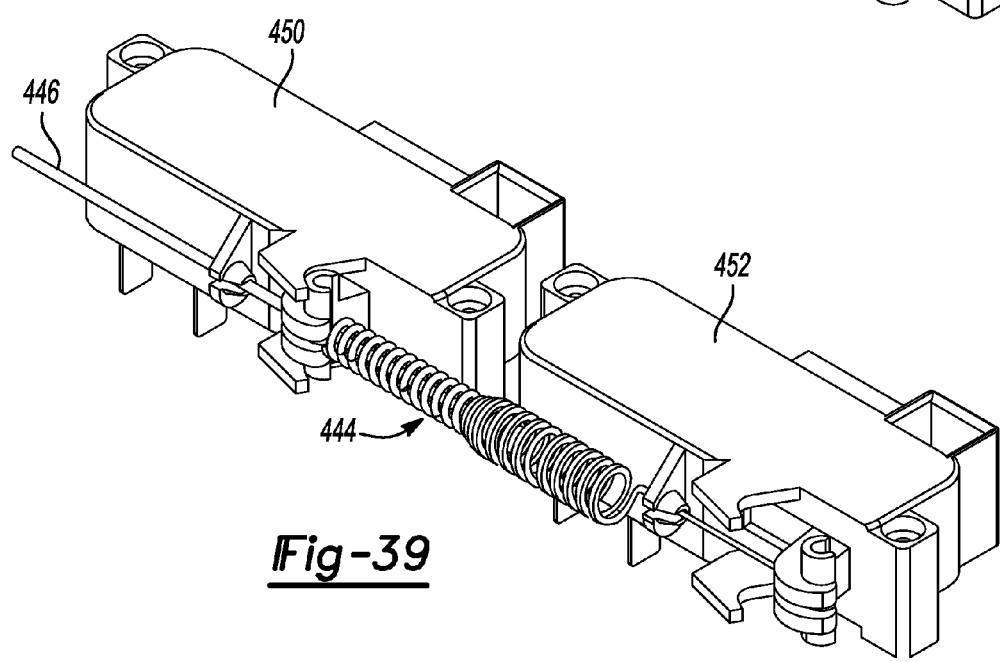
FIG. 39 is a perspective view of the first and second switch shown in FIG. 38 and shown with a biasing member partially expanded corresponding to a time delay incorporated between activation of the first switch and the second switch.

According to one example of the present teachings, the cutting mechanism 14 can include two cutting motor(s) (see for example cutting motor(s) 86 and 88 as illustrated in FIG. 36). As can be appreciated, it may be desirable to prevent an immediate voltage draw on the electrical system during initial start up of the cutting motor(s) 86 and 88. According to one example of the present teachings, shown in FIGS. 37-39, a motor start delay assembly 442 is provided. In one example, the motor start delay assembly 442 can be incorporated as part of the cutting mechanism 14 (FIG. 1). In general, the motor start delay assembly 442 can include a collection of mechanical springs 444, cables 446, and a first and second switch 450 and 452, respectively. According to one implementation, a first cutting motor (i.e., 86) can be started upon closing of the first switch 450. Similarly, a second cutting motor (i.e., 88) can be started upon closing of the second switch 452. According to one example, the first switch 450 can be activated upon initial user request. Once the first switch 450 is activated, the first motor (i.e., 86) can be started. The spring 444 can be operable to offset the starting time of the second motor (i.e., 88) by delaying the activation of the second switch 452 by a predetermined amount of time after the first switch 450 has been activated. In one example shown in FIGS. 38 and 39, the spring 444 is shown in an extended position (FIG. 39) after activation of the first switch 450 and prior to activation of the second switch 452.

LCD Display for Battery & Charger Information

Figure 40:
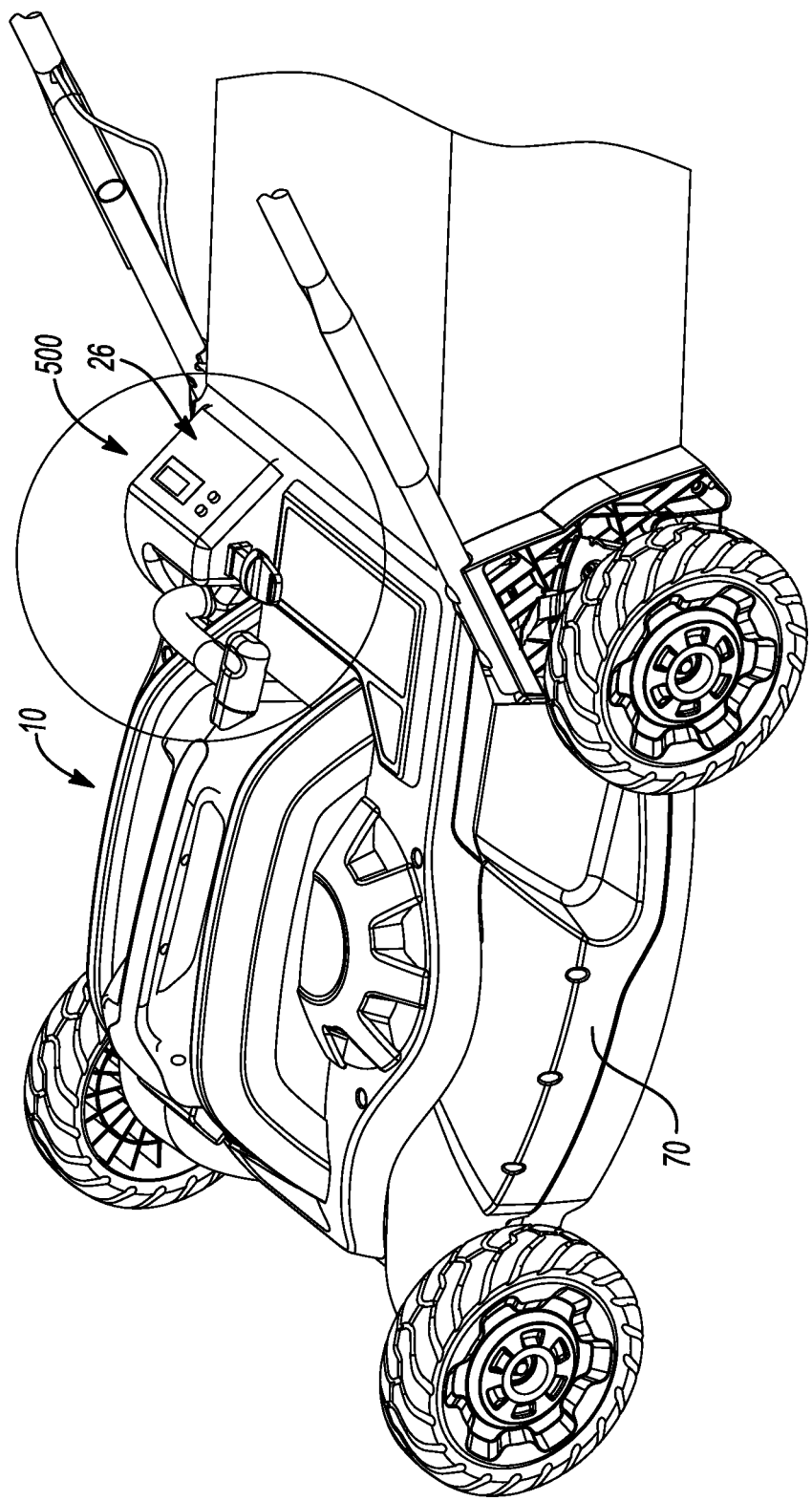
FIG. 40 is a rear perspective view of a battery-powered mower according to additional features of the present disclosure and including a user display.
Figure 41:
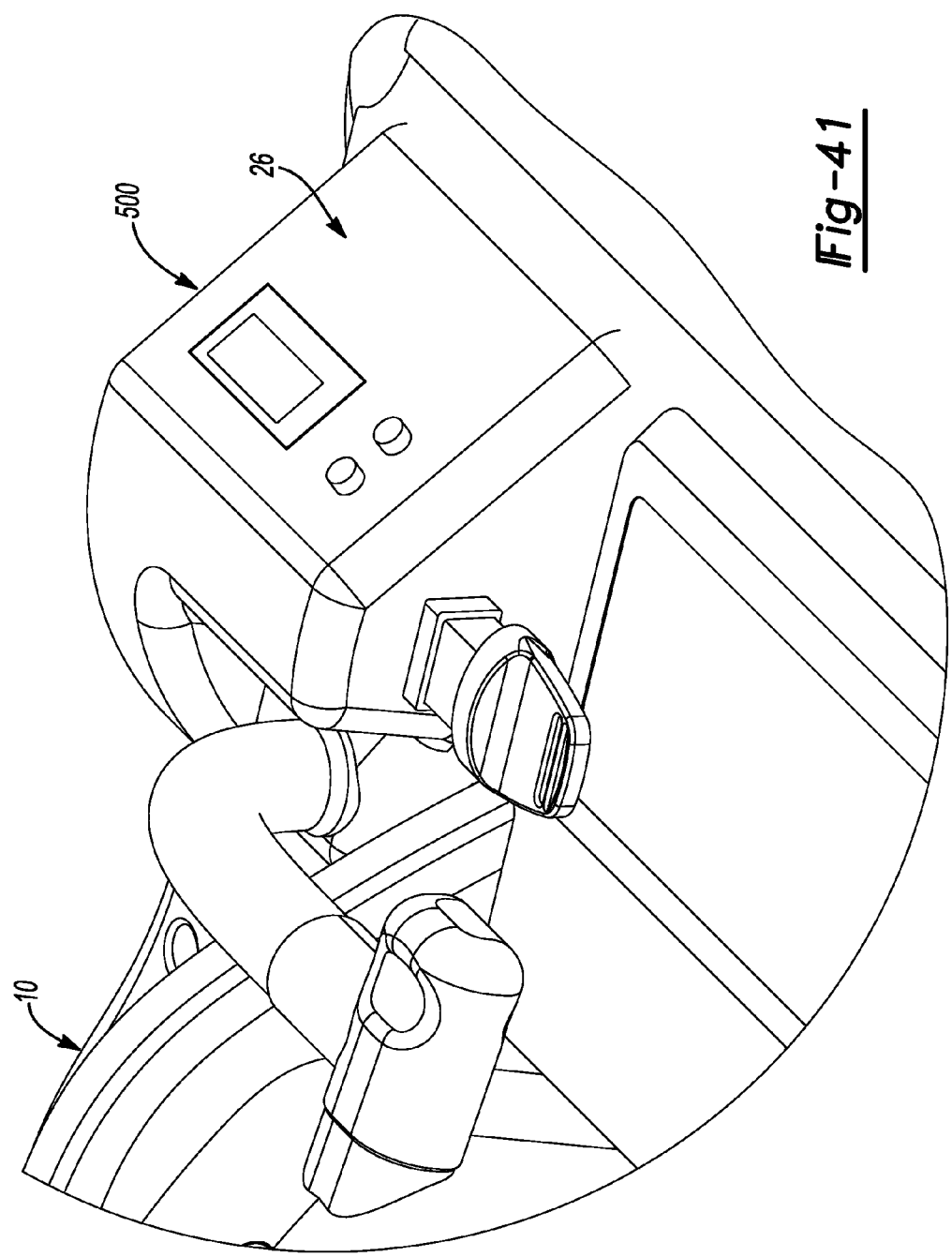
FIG. 41 is a detailed perspective view of the user display shown in FIG. 40.
Figure 42:
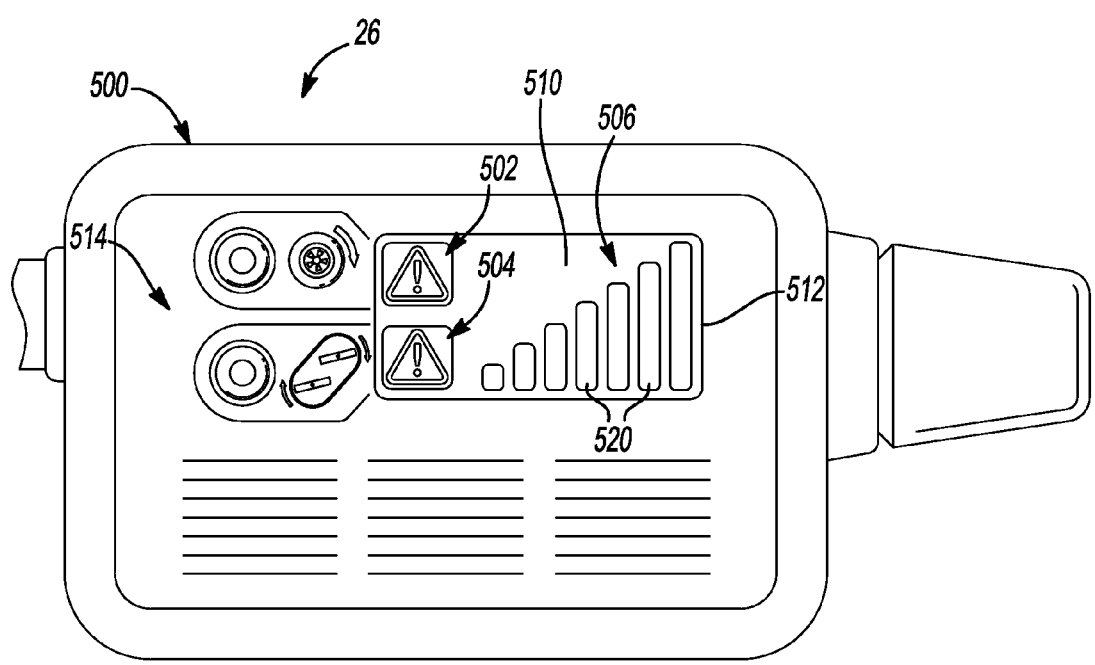
FIG. 42 is a plan view of an LCD display according to additional features.
Figure 43:
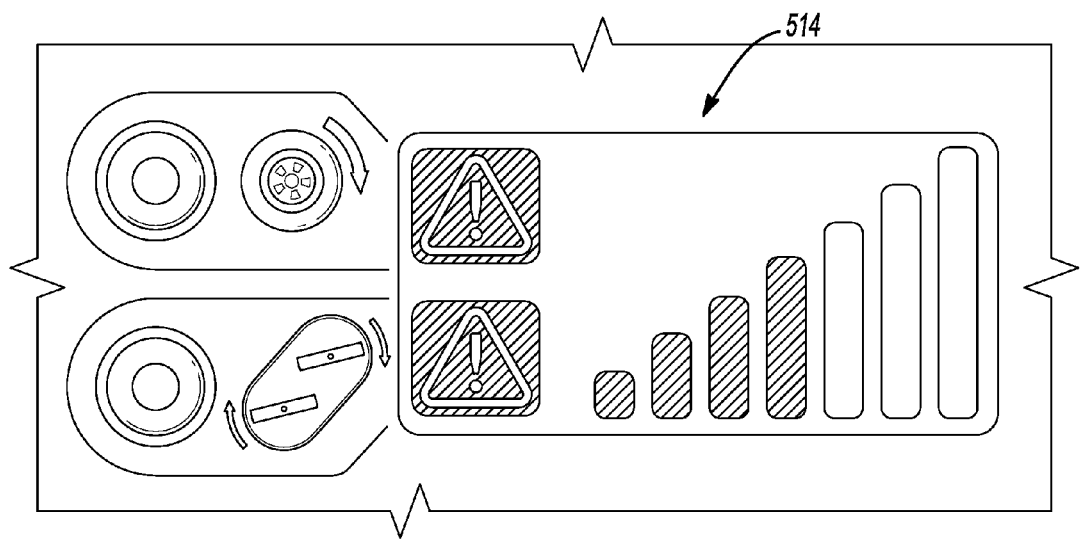
FIGS. 43 and 44 are detailed views of a self-drive indicator, a mower blade indicator, and a battery-power indicator of the LCD display shown in FIG. 42 according to one example.
Figure 44:
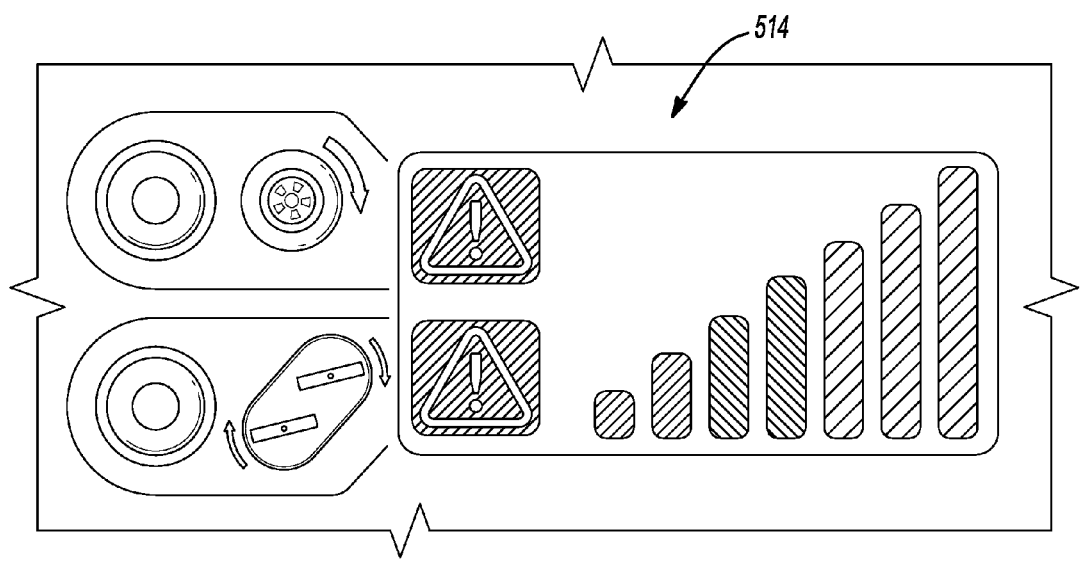
Figure 45:
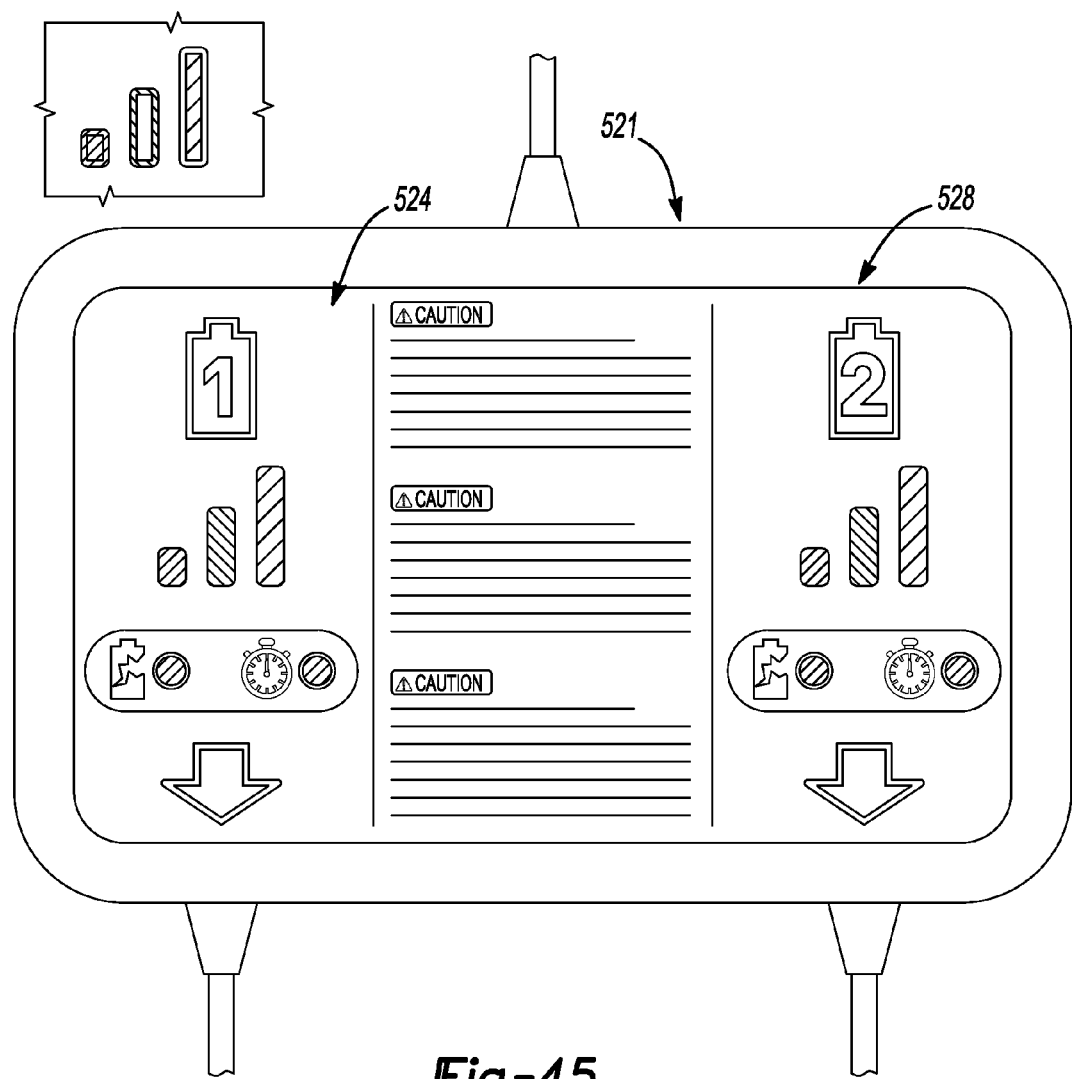
FIG. 45 is a plan view of an exemplary charger display having a first battery-power indicator and a second battery-power indicator.

Turning now to FIG. 40, according to one example of the present teachings, the display 26 (FIG. 1) of the mower 10 can include a liquid crystal display (LCD) display 500 according to one example of the present teachings is shown. FIGS. 40-44 illustrate various implementations of the LCD display 500. In general, the LCD display 500 can show information about the mower 10 and battery 12. With specific reference to FIG. 42, the LCD display 500 can include a self-drive indicator 502, a mower blade indicator 504, and a battery-power indicator 506. The LCD display 500 therefore, can provide information indicative of the battery-power level and status indicators for the mowing blade motor(s) (i.e., 86 and 88) and self-drive motor 210.

The LCD display 500 can include a one color LCD or alternatively a multi-color LCD. In one example, reflective background 510 can be provided behind an LCD display surface 512. As can be appreciated, an LCD can have the advantage of being easy to read in sunlight. In another example not specifically shown, the display can incorporate a series of LED lights to communicate the same information. Additionally or alternatively, the mower 10 can use audible beeps or other sounds to communicate information, such as battery level or other status or faults. A display screen 514 of the LCD display 500 can include a series of bars 520 or lines to show a power level of the battery 12. The number of bars 520 to display can be determined by a measurement of the battery voltage. As is known, the battery voltage progressively decreases as the motor(s) (i.e., 86, 88, 210) or other devices on the mower 10 are operating. The display 26 can compensate for changes in the battery voltage due to operation of motor(s) (i.e., 86, 88, 210) or other devices, so that the indication of battery-power level is more accurate. In one example, the system can use different voltage ranges to determine the number of bars to display depending on whether any motor(s) (i.e., 86, 88, 210) or devices are operating.

As described, the display 26 can include the mower blade indicator 504 and the self-drive indicator 502. When a fault, such as an open circuit is detected at the mower blade motor(s) (i.e., 86 and 88) or the self-drive motor 210, the appropriate indicator on the display screen 514 can flash or turn on or off to communicate to the user that a fault has occurred. A fault such as a circuit breaker being tripped can be determined by comparing the voltage in such a circuit on either side of the circuit breaker. The display screen 514 can include other indicators to show other faults or changes in status in the mower 10.

As shown in FIG. 40, the LCD display 500 can be positioned near the rear of the mower deck 70 and/or in toward the user operating position, so that the user can read the display screen 514, while operating the mower 10. In one example, the graphics on the display screen 514 are large enough to be read from several feet away. The LCD display 500 can be grouped together with such features as a safety key, instruction labels, battery connection cables to make user interaction with these features more convenient and efficient, and to make the manufacturer and assembly of these features more convenient and efficient.

Figure 46:
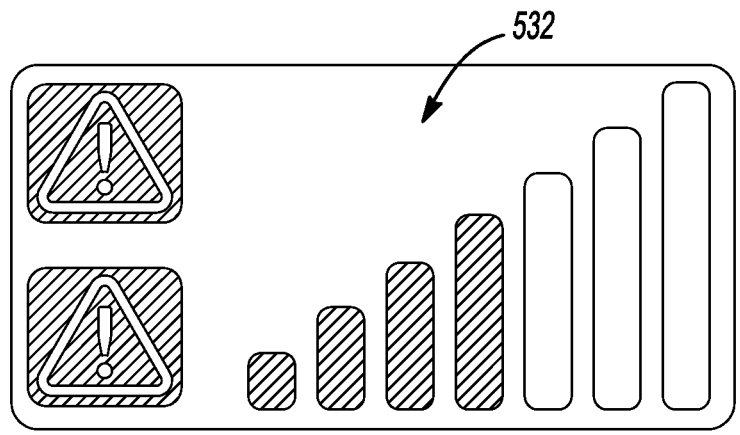
FIGS. 46 and 47 are detailed views of a battery-power indicator according to additional features.
Figure 47:
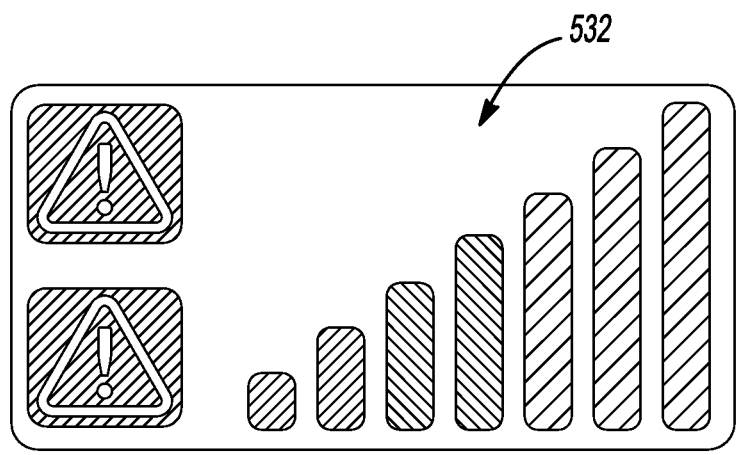
Figure 48:
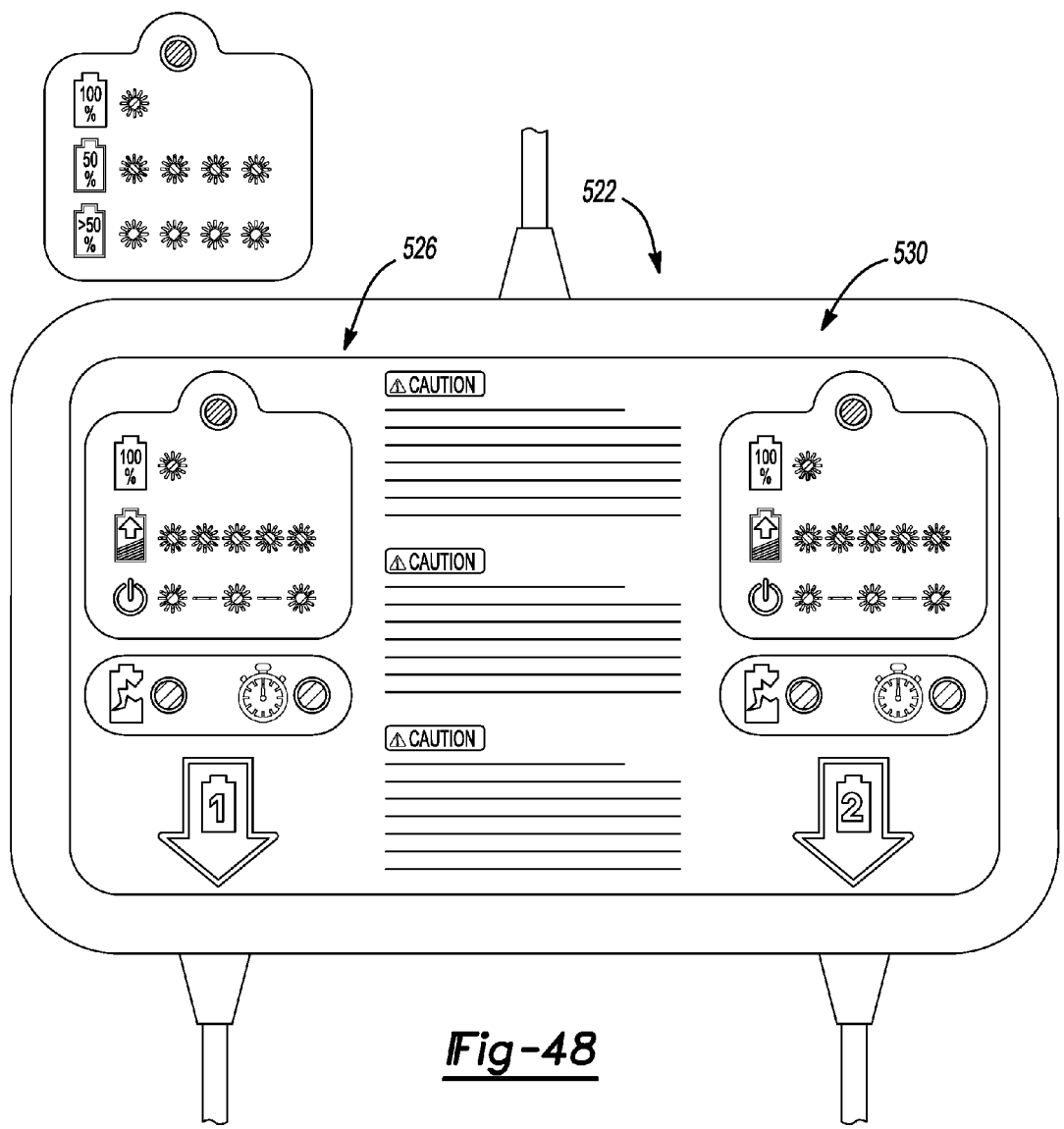
FIG. 48 is a plan view of a battery charger display according to additional features.

With reference to FIGS. 45-48 a battery charger LCD display 521 (FIG. 45) and 522 (FIG. 48) are shown according to various examples. The battery charger LCD display 521 can be configured to provide various information, such as, but not limited to, a charge level of a battery 12 being charged, an indicator indicative of a fully charged battery, an indicator that charging is in progress, various battery faults, such as an open circuit, damaged battery pack, overheated battery pack, or over-discharged battery pack. As shown in these examples, the battery charger can be adapted to charge two batteries concurrently. As a result, the charger LCD display 521 or 522 can convey separately information 524, 526 associated with a first battery being charged and information 528, 530 associated with a second battery being charged. As shown in FIGS. 46 and 47, an exemplary display screen 532 is shown. It is appreciated that the LCD display 521 can additionally or alternatively comprise one or a plurality of light emitting diodes (LED's) for communicating battery charger information.

Twin Blade Mower with Different Sized Blades

Figure 49:
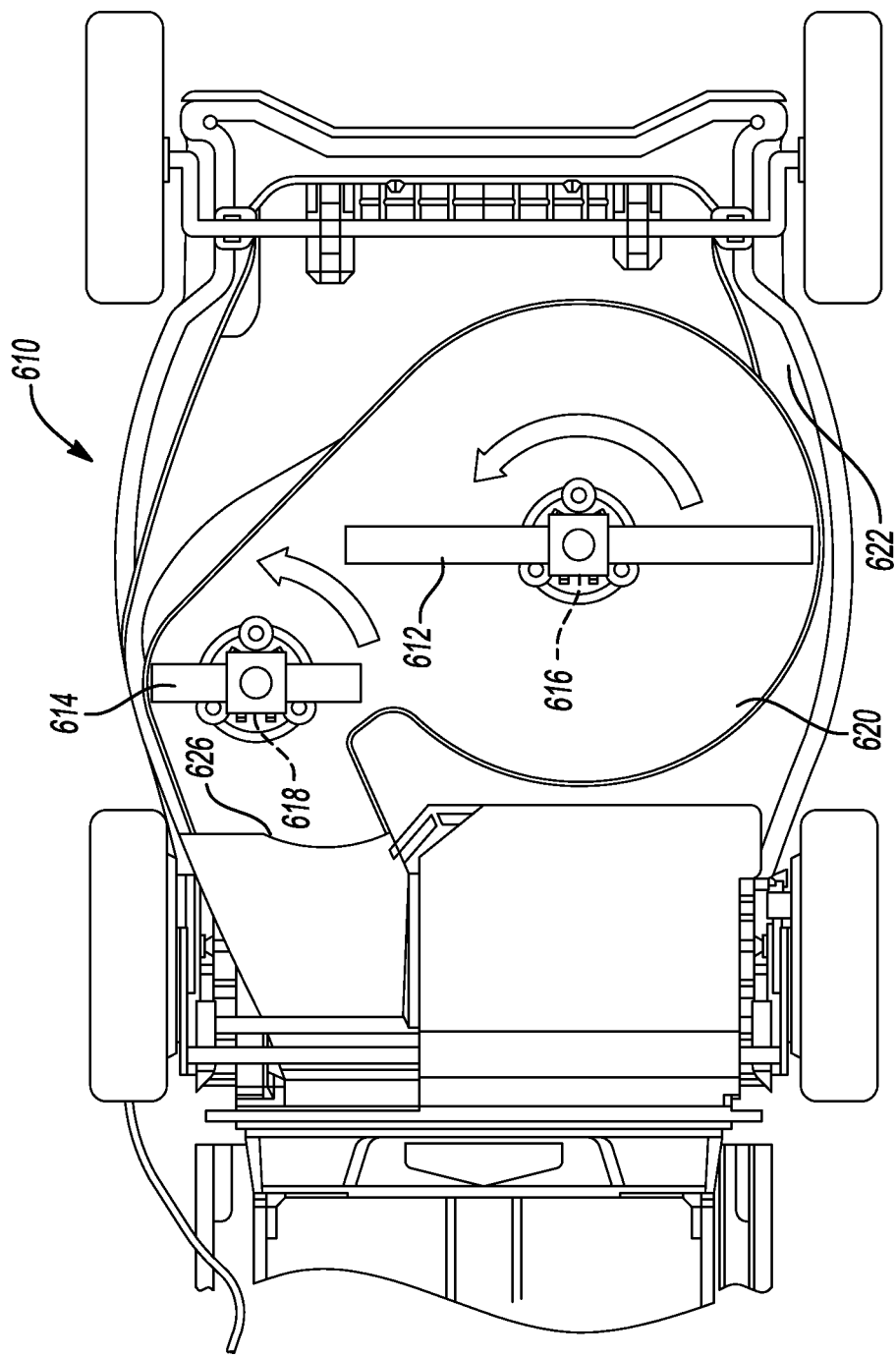
FIG. 49 is a bottom plan view of a deck of a mower according to one example of the present disclosure and having first and second cutting blades.
Figure 50:
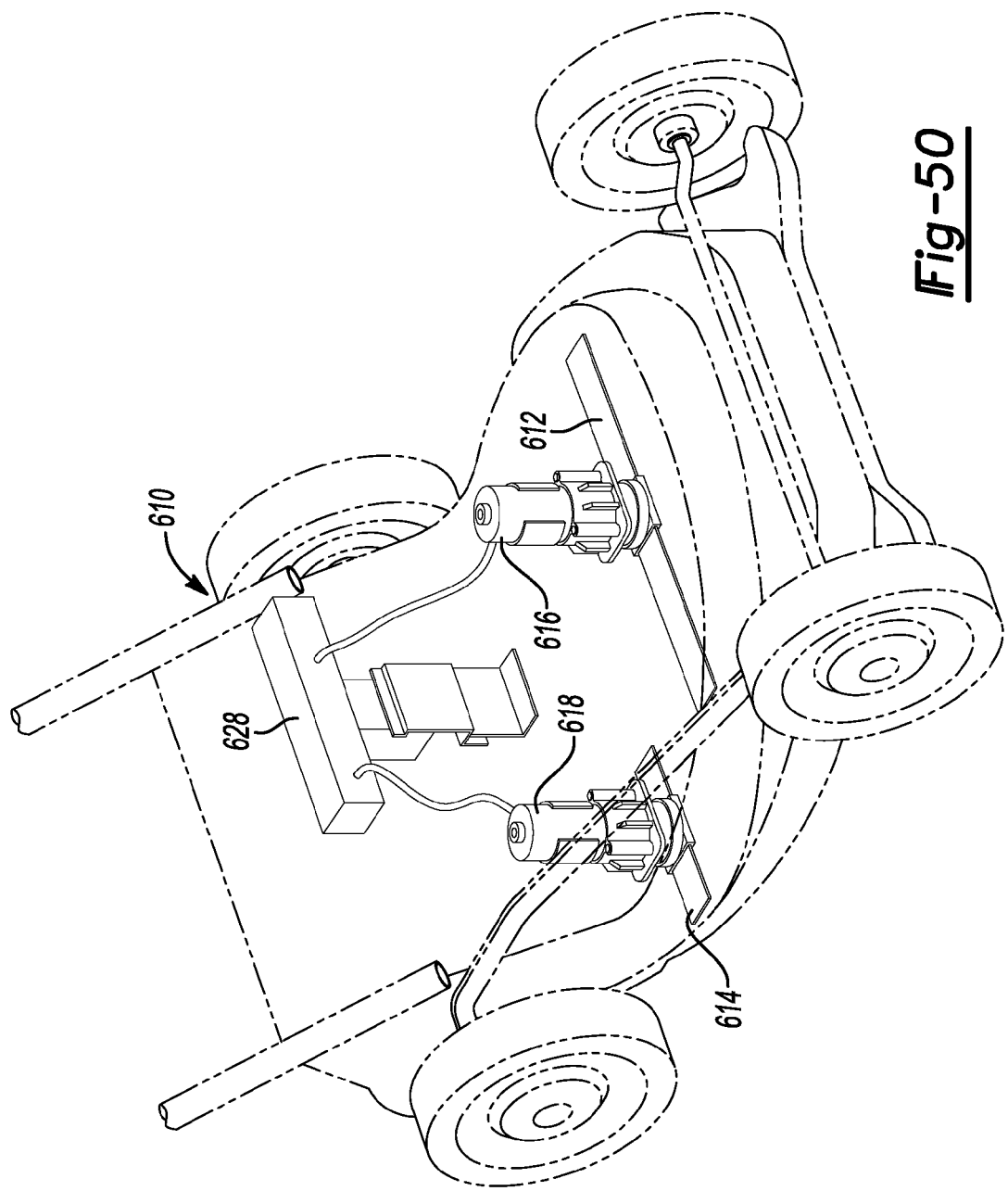
FIG. 50 is a front perspective view of the exemplary mower shown in FIG. 49 and shown with portions of the mower in phantom to illustrate a first and second motor associated with the first and second cutting blades.
Figure 51:
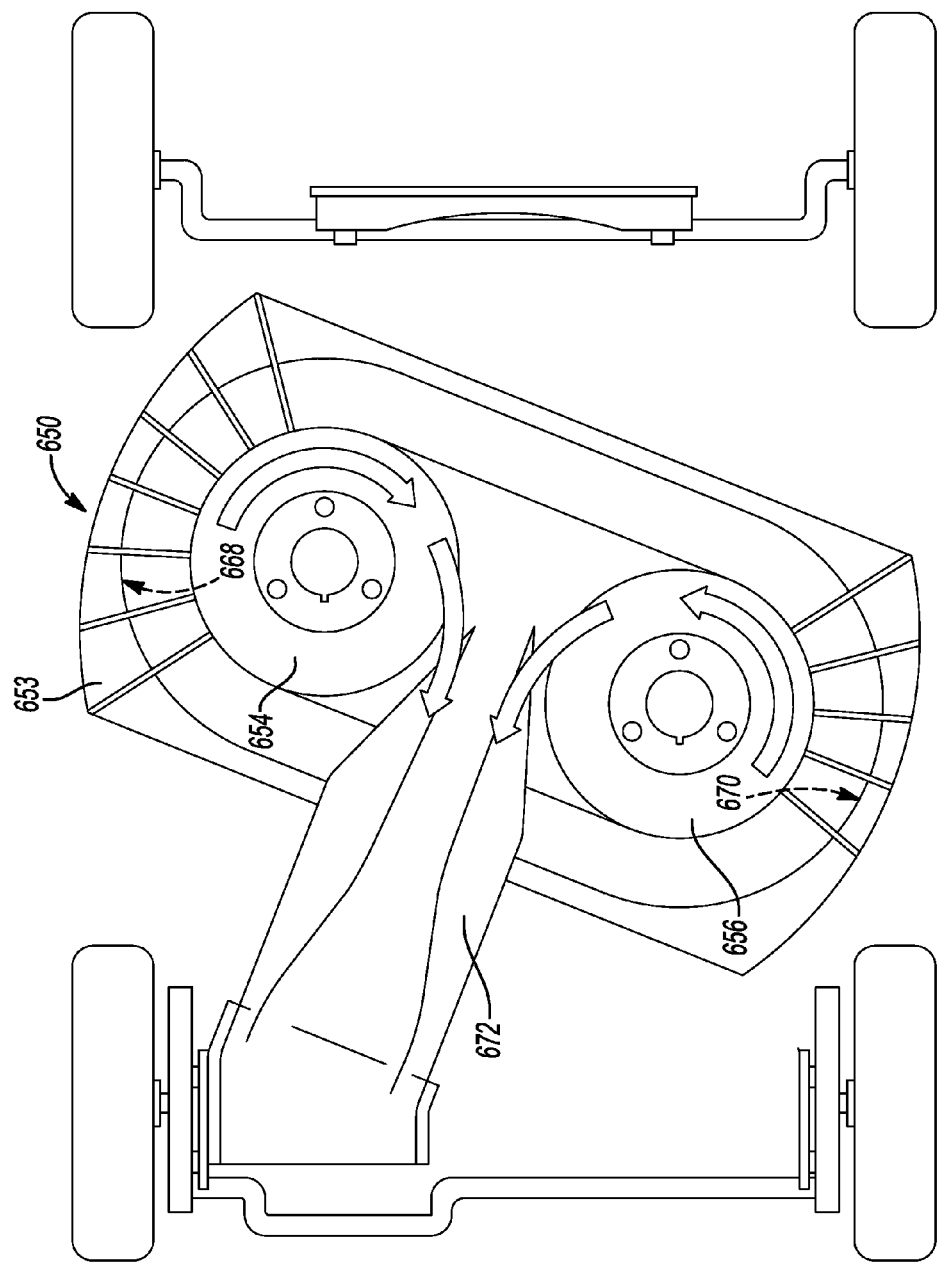
FIG. 51 is a partial bottom plan view of a mower according to another example of the present teachings and including a deck having a first and second volute.
Figure 52:
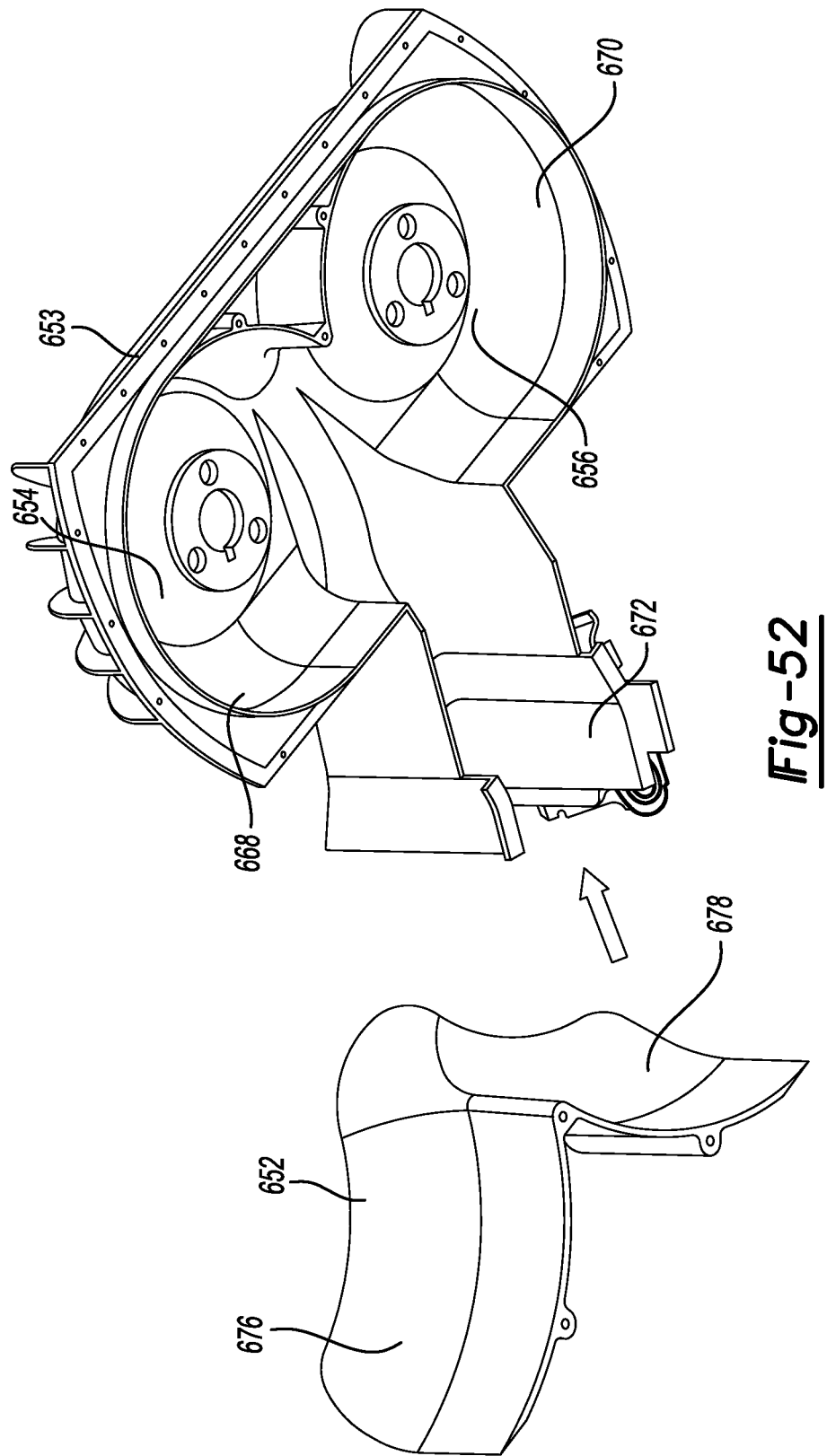
FIG. 52 is an exploded perspective view of the mower deck illustrated in FIG. 51 and a mulch plug according to one example of the present disclosure.
Figure 53:
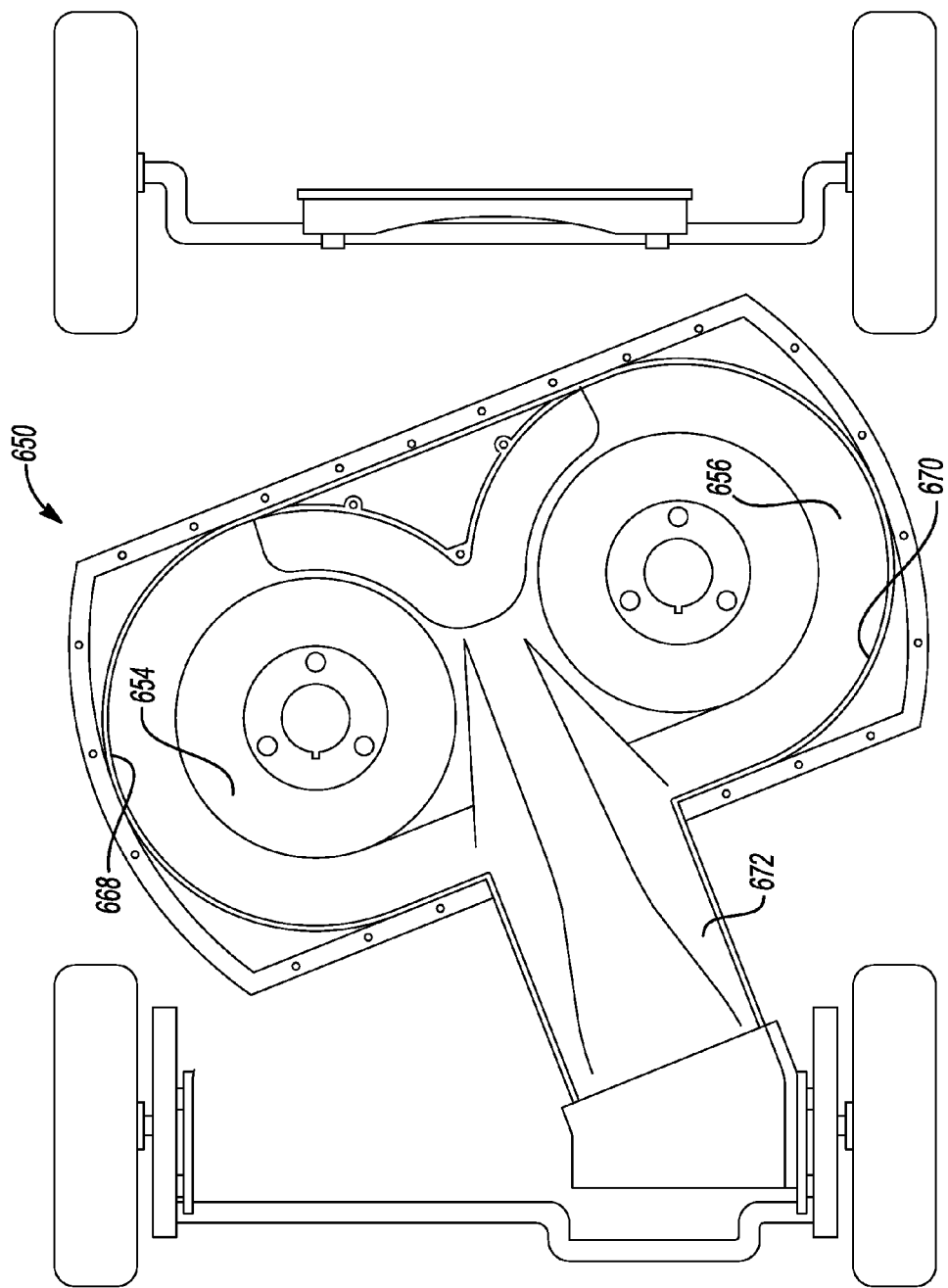
FIG. 53 is a partial bottom plan view of a mower according to additional features.

With reference to FIGS. 49 and 50, a mower 610 having first and second blades 612 and 614 according to one example of the present teachings is shown. The first and second blades 612 and 614 can be powered by a first and second motor 616 and 618, respectively (FIG. 49). As illustrated, the first blade 612 can be larger than the second blade 614. As can be appreciated, a cutting diameter of the first blade therefore can be larger than a cutting diameter of the second blade.

In one example, the second blade 614 can be positioned generally downstream of the first blade. The first and second blades 612 and 614 can be positioned for cooperation with a volute 620 of a deck 622. A discharge chute 626 can be defined generally downstream of the second blade 614. According to some examples of conventional mulching mowers, each blade of grass can ideally be cut multiple times. In some examples, cutting a given blade of grass multiple times can compromise the performance of the grass discharging feature of a given mower. A grass discharging feature can be defined as either returning a cut piece of grass downwardly to the ground or alternatively into a grass bag mounted on the mower. The twin rotating blade system according to the present teachings, where the first blade 612 is larger than the second blade 614 can present an overall more efficient mower. According to one example, the first blade 612 and the second blade 614 can be arranged at about 45 degrees relative to each other. The cut swaths of the first and second blades 612 and 614 can therefore be overlapping to ensure no grass is left uncut between the two blade cut swaths. In one example, the first and second blades 612 and 614 can be counter-rotating. Counter-rotating can allow both blades 612, 614 to discharge out of the rear of the mower 10. In another example, the first and second blades 612 and 614 can be synchronous rotating blades. Synchronous rotation can cause the first blade 612 to discharge into the path of the second blade 614. The second blade 614 can discharge the grass out of the mower 10. The larger blade 612 can be responsible for mulching most of the grass, and the smaller blade 614, although may mulch some of the grass, can primarily be used to discharge the grass from the volute 620 to the discharge chute 626. In various examples, the smaller blade (second blade) 614 may or may not cut grass, and may be in the same plane as the larger blade (first blade) 612, or may operate in a different plane. In the example of both blades 612 and 614 being arranged on a common plane, they can both be configured to cut grass and provide an even cut. The blades 612 and 614 can be configured to mulch and/or discharge the grass at the same time as cutting it. If the blades 612 and 614 are arranged in different planes, the first blade 612 can be optimized for cutting and possibly mulching. The second blade 614 can be optimized for discharging and possibly mulching. In one example, the first and second blades 612 and 614 can be operated separately from each other, so that energy is not being used in a mulching mode. The smaller blade (second blade) 614 can be configured to turn at a higher RPM than the larger blade (first blade) 612 for optimal discharging. In one example, when discharging is not required, a controller 628 can turn off the second motor 618.

Twin Blade Mower Mulch Plug

With reference now to FIGS. 51-54, a twin blade battery-powered mower 650 incorporating a mulch plug 652 (FIG. 52) according to the present teachings will now be described. The twin blade battery-powered mower 650 can generally define a deck 653 that defines a first volute 654 and a second volute 656. The first volute 654 can be configured to define a cutting area of a first blade (not specifically shown). Similarly, the second volute 656 can define a cutting area of a second blade (not specifically shown). The first volute 654 can define a first radial wall 668. The second volute 656 can define a second radial wall 670.

Figure 54:
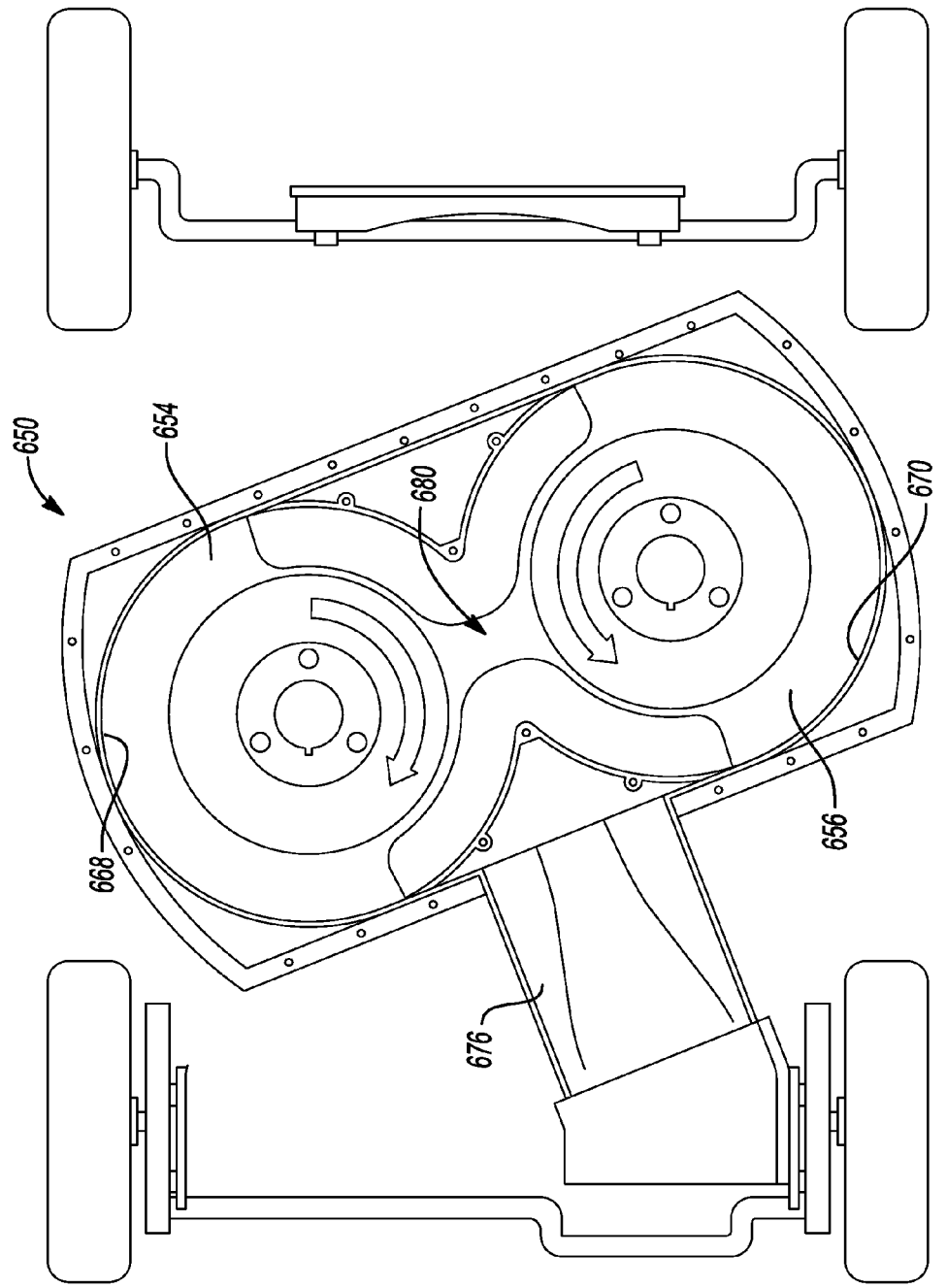
FIG. 54 is a bottom plan view of the mower of FIG. 53 and shown with the mulch plug in an installed position.

A discharge chute 672 can be formed generally between the first and second volutes 654 and 656. With specific reference to FIG. 52, the mulch plug 652 defines a first annular surface 676 and a second annular surface 678. As shown, the first annular surface 676 can be configured in a geometry that is complementary to the first volute 654. Likewise, the second annular surface 678 can be configured in a geometry that is complementary to the second volute 656. With reference to FIG. 54, the mulch plug 652 is shown in an installed position inserted through the discharge chute 672. In general, the mulch plug 652 can reach all the way to the middle of the first and second volutes 654 and 656 and have a geometry in the area that meets the first and second volutes 654 and 656 to effectively create a smooth continuous surface. As a result, the mulch plug 652 can create two distinctive volutes with a crossover area 680 between them on the twin blade battery-powered mower 650 described herein energy savings is important. The smooth and continuous volute configuration the mulch plug 652 creates in the installed position (FIG. 54) can create a continuous surface that discourages grass build up and increases overall efficiency of the twin blade battery-powered mower 650.

While the disclosure has been described in the specification and illustrated in the drawings with reference to various embodiments, it will be understood by those skilled in the art that various changes may be made and equivalents may be substituted for elements thereof without departing from the scope of the disclosure as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the disclosure without departing from the essential scope thereof. Therefore, it is intended that the disclosure not be limited to the particular embodiments illustrated by the drawings and described in the specification as the best mode presently contemplated for carrying out this disclosure, but that the disclosure will include any embodiments falling within the foregoing description and the appended claims.

What is claimed is:

1. A battery-powered lawn mower comprising:
  a mower deck defining a battery pocket;
  a plurality of wheels supporting the mower deck;
  a motor coupled to the mower deck;
  a blade received under the mower deck, the blade being driven by the motor;
  a battery having a battery housing, at least one battery cell, a first battery connector and a second battery connector, the at least one battery cell being disposed in the battery housing, the first battery connector being disposed on a first surface of the battery housing, the second battery connector being disposed on a second, different surface of the battery housing, the battery being removably received in the battery pocket such that the first surface of the battery housing is abutted against the mower deck, the second battery connector being adapted to be coupled to a charging cable when the battery is removed from the battery pocket to facilitate charging of the at least one battery cell;
  a latch assembly having a latch lever that is coupled to the mower deck and movable between a locked position and a fully opened position, the latch lever securing the battery to the mower deck when the latch lever is in the locked position, the latch lever clearing the battery pocket when positioned in the fully opened position to permit the battery to be removed from and inserted into the battery pocket; and
  an electrical system that is electrically coupled to the motor, the electrical system comprising a mower connector that is coupled to the mower deck, the first battery connector being configured to electrically mate with the mower connector when the battery is received into the battery pocket and the first surface of the battery housing is abutted against the mower deck;
  wherein the latch lever shrouds the second battery connector when the latch lever is in the locked position.

2. The battery-powered lawn mower of claim 1, wherein the second battery connector is disposed in a location where it is shrouded by another element of the battery-powered lawn mower when the battery is received in the battery pocket and secured to the mower deck such that the first surface of the battery housing is abutted against the mower deck so that the second battery connector cannot be directly mated to the charging cable.

3. The battery-powered lawn mower of claim 1, wherein the latch assembly comprises an over-center latch.

4. The battery-powered lawn mower of claim 1, wherein the battery pocket has a first shape and the battery has a second shape that complements the first shape such that the battery can be inserted within the pocket in only a single orientation.

5. The battery-powered lawn mower of claim 1, wherein the battery includes a handle.

6. The battery-powered lawn mower of claim 5, wherein the handle is defined by the battery housing.

7. The battery-powered lawn mower of claim 1, further comprising a drive mechanism electrically coupled to the mower connector, the drive mechanism receiving power from the battery such to cause the drive mechanism to propel at least one of the wheels.

8. The battery-powered lawn mower of claim 1, wherein the first battery connector is different from the second battery connector.

9. The battery-powered lawn mower of claim 1, further comprising a handle coupled to the mower deck, the handle having a hand grip.

10. The battery-powered lawn mower of claim 9, wherein a portion of the mower deck against which the first surface of the battery housing abuts when the battery is received in the battery pocket is disposed between a rotational axis of the blade and a rotational axis about which a rear pair of the wheels rotate, the rear pair of wheels being two of the wheels that are closest to the hand grip.

11. The battery-powered lawn mower of claim 10, wherein a center of the battery is disposed closer to the rotational axis of the rear pair of the wheels than the rotational axis of the blade.

12. The battery-powered lawn mower of claim 11, wherein a dimension between the center of the battery and the rotational axis of the blade is at least twice as large as a dimension between the center of the battery and the rotational axis of the rear pair of the wheels.

13. A battery-powered lawn mower comprising:
a mower deck defining a battery pocket;
a plurality of wheels supporting the mower deck;
a motor coupled to the mower deck;
a blade received under the mower deck, the blade being driven by the motor;
a battery having a battery housing, at least one battery cell, a first battery connector and a second battery connector, the at least one battery cell being disposed in the battery housing, the first battery connector being disposed on a first surface of the battery housing, the second battery connector being disposed on a second, different surface of the battery housing, the second battery connector being adapted to be coupled to a charging cable when the battery is removed from the battery pocket to facilitate charging of the at least one battery cell;
a latch assembly having a latch lever that is coupled to the mower deck and movable between a locked position and a fully opened position, the latch lever securing the battery to the mower deck when the latch lever is in the locked position, the latch lever clearing the battery pocket when positioned in the fully opened position to permit the battery to be removed from and inserted into the battery pocket; and
a mower connector electrically coupled to the motor and the first battery connector:
wherein the second battery connector is disposed in a location where it is shrouded by another element of the battery-powered lawn mower when the battery is received in the battery pocket and coupled to the mower deck so that the second battery connector cannot be accessed to charge the at least one battery cell
wherein the latch lever is the another element of the battery-powered lawn mower that shrouds the second battery connector when the latch lever is in the locked position.

14. The battery-powered mower of claim 13, wherein the first battery connector physically and electrically mates to the mower connector when the battery is received in the battery pocket and seated to the mower deck.

15. The battery-powered lawn mower of claim 13, wherein the latch assembly comprises an over-center latch.

16. The battery-powered lawn mower of claim 13, wherein the battery pocket has a first shape and the battery has a second shape that complements the first shape such that the battery is insertable into the pocket in only a single orientation.

17. The battery-powered lawn mower of claim 13, wherein the battery includes a handle.

18. The battery-powered lawn mower of claim 17, wherein the handle is defined by the battery housing.

19. The battery-powered lawn mower of claim 13, further comprising a drive mechanism electrically coupled to the mower connector, the drive mechanism receiving power from the battery such to cause the drive mechanism to propel at least one of the wheels.

20. The battery-powered lawn mower of claim 13, wherein the first battery connector is different from the second battery connector.

21. The battery-powered lawn mower of claim 13, further comprising a handle coupled to the mower deck, the handle having a hand grip.

22. The battery-powered lawn mower of claim 21, wherein a portion of the mower deck against which the first surface of the battery housing abuts when the battery is received in the battery pocket is disposed between a rotational axis of the blade and a rotational axis about which a rear pair of the wheels rotate, the rear pair of wheels being two of the wheels that are closest to the hand grip.

23. The battery-powered lawn mower of claim 22, wherein a center of the battery is disposed closer to the rotational axis of the rear pair of the wheels than the rotational axis of the blade.

24. The battery-powered lawn mower of claim 23, wherein a dimension between the center of the battery and the rotational axis of the blade is at least twice as large as a dimension between the center of the battery and the rotational axis of the rear pair of the wheels.

* * * * *